United States Patent
Cidon et al.

(10) Patent No.: US 11,258,728 B2
(45) Date of Patent: Feb. 22, 2022

(54) PROVIDING MEASUREMENTS OF PUBLIC CLOUD CONNECTIONS

(71) Applicant: VMware, Inc., Palo Alto, CA (US)

(72) Inventors: Israel Cidon, San Francisco, CA (US); Prashanth Venugopal, San Francisco, CA (US); Aran Bergman, Givatayim (IL); Chen Dar, Magshimim (IL); Alex Markuze, Ramat Gan (IL); Eyal Zohar, Shimshit (IL)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/662,591

(22) Filed: Oct. 24, 2019

(65) Prior Publication Data

US 2021/0067461 A1    Mar. 4, 2021

Related U.S. Application Data

(60) Provisional application No. 62/892,473, filed on Aug. 27, 2019.

(51) Int. Cl.
*G06F 15/16* (2006.01)
*H04L 49/354* (2022.01)
(Continued)

(52) U.S. Cl.
CPC ........ *H04L 49/354* (2013.01); *H04L 12/4633* (2013.01); *H04L 12/4641* (2013.01);
(Continued)

(58) Field of Classification Search
CPC .............. H04L 47/827; H04L 41/0803; H04L 12/4641; H04L 43/0811
(Continued)

(56) References Cited

U.S. PATENT DOCUMENTS

| 5,652,751 A | 7/1997 | Sharony |
| 5,909,553 A | 6/1999 | Campbell et al. |

(Continued)

FOREIGN PATENT DOCUMENTS

| EP | 1912381 A1 | 4/2008 |
| EP | 3041178 A1 | 7/2016 |

(Continued)

OTHER PUBLICATIONS

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

(Continued)

*Primary Examiner* — Emmanuel L Moise
*Assistant Examiner* — Mariegeorges A Henry
(74) *Attorney, Agent, or Firm* — Adeli LLP

(57) ABSTRACT

Some embodiments provide a novel method for deploying different virtual networks over several public cloud datacenters for different entities. For each entity, the method (1) identifies a set of public cloud datacenters of one or more public cloud providers to connect a set of machines of the entity, (2) deploys managed forwarding nodes (MFNs) for the entity in the identified set of public cloud datacenters, and then (3) configures the MFNs to implement a virtual network that connects the entity's set of machines across its identified set of public cloud datacenters. In some embodiments, the method identifies the set of public cloud datacenters for an entity by receiving input from the entity's network administrator. In some embodiments, this input specifies the public cloud providers to use and/or the public cloud regions in which the virtual network should be defined. Conjunctively, or alternatively, this input in some embodiments specifies actual public cloud datacenters to use.

16 Claims, 31 Drawing Sheets

(51) Int. Cl.

| | |
|---|---|
| *H04L 49/25* | (2022.01) |
| *H04L 45/00* | (2022.01) |
| *H04L 45/42* | (2022.01) |
| *H04L 67/1097* | (2022.01) |
| *H04L 43/06* | (2022.01) |
| *H04L 43/08* | (2022.01) |
| *H04L 12/46* | (2006.01) |
| *H04L 12/66* | (2006.01) |
| *H04L 41/046* | (2022.01) |
| *H04L 41/0806* | (2022.01) |
| *H04L 43/045* | (2022.01) |
| *H04L 43/0811* | (2022.01) |
| *H04L 45/50* | (2022.01) |
| *H04L 67/10* | (2022.01) |
| *H04L 41/0813* | (2022.01) |
| *H04L 41/142* | (2022.01) |
| *H04L 45/24* | (2022.01) |
| *H04L 49/20* | (2022.01) |
| *H04L 61/4511* | (2022.01) |
| *H04L 43/026* | (2022.01) |
| *H04L 67/101* | (2022.01) |
| *H04L 41/0803* | (2022.01) |
| *H04L 47/70* | (2022.01) |
| *H04L 12/70* | (2013.01) |

(52) U.S. Cl.
CPC ............ *H04L 12/66* (2013.01); *H04L 41/046* (2013.01); *H04L 41/0803* (2013.01); *H04L 41/0806* (2013.01); *H04L 41/0813* (2013.01); *H04L 41/142* (2013.01); *H04L 43/026* (2013.01); *H04L 43/045* (2013.01); *H04L 43/06* (2013.01); *H04L 43/08* (2013.01); *H04L 43/0811* (2013.01); *H04L 45/24* (2013.01); *H04L 45/38* (2013.01); *H04L 45/42* (2013.01); *H04L 45/50* (2013.01); *H04L 47/827* (2013.01); *H04L 49/20* (2013.01); *H04L 49/252* (2013.01); *H04L 61/1511* (2013.01); *H04L 67/10* (2013.01); *H04L 67/101* (2013.01); *H04L 67/1097* (2013.01); *H04L 2012/562* (2013.01); *H04L 2012/5612* (2013.01); *H04L 2012/5623* (2013.01)

(58) Field of Classification Search
USPC .................................................. 709/222, 220
See application file for complete search history.

(56) References Cited

U.S. PATENT DOCUMENTS

| | | | |
|---|---|---|---|
| 6,154,465 A | 11/2000 | Pickett | |
| 6,157,648 A | 12/2000 | Voit et al. | |
| 6,201,810 B1 | 3/2001 | Masuda et al. | |
| 6,363,378 B1 | 3/2002 | Conklin et al. | |
| 6,445,682 B1 | 9/2002 | Weitz | |
| 6,744,775 B1 | 6/2004 | Beshai et al. | |
| 6,976,087 B1 | 12/2005 | Westfall et al. | |
| 7,003,481 B2 | 2/2006 | Banka et al. | |
| 7,280,476 B2 | 10/2007 | Anderson | |
| 7,313,629 B1 | 12/2007 | Nucci et al. | |
| 7,320,017 B1 | 1/2008 | Kurapati et al. | |
| 7,581,022 B1 | 8/2009 | Griffin et al. | |
| 7,680,925 B2 | 3/2010 | Sathyanarayana et al. | |
| 7,681,236 B2 | 3/2010 | Tamura et al. | |
| 7,962,458 B2 | 6/2011 | Holenstein et al. | |
| 8,094,575 B1 | 1/2012 | Vadlakonda et al. | |
| 8,094,659 B1 | 1/2012 | Arad | |
| 8,111,692 B2 | 2/2012 | Ray | |
| 8,141,156 B1 | 3/2012 | Mao et al. | |
| 8,224,971 B1 | 7/2012 | Miller et al. | |
| 8,228,928 B2 | 7/2012 | Parandekar et al. | |
| 8,243,589 B1 | 8/2012 | Trost et al. | |
| 8,259,566 B2 | 9/2012 | Chen et al. | |
| 8,274,891 B2 | 9/2012 | Averi et al. | |
| 8,301,749 B1 | 10/2012 | Finklestein et al. | |
| 8,385,227 B1 | 2/2013 | Downey | |
| 8,566,452 B1 | 10/2013 | Goodwin et al. | |
| 8,630,291 B2 | 1/2014 | Shaffer et al. | |
| 8,661,295 B1 | 2/2014 | Khanna et al. | |
| 8,724,456 B1 | 5/2014 | Hong et al. | |
| 8,724,503 B2 | 5/2014 | Johnsson et al. | |
| 8,745,177 B1 | 6/2014 | Kazerani et al. | |
| 8,799,504 B2 | 8/2014 | Capone et al. | |
| 8,804,745 B1 | 8/2014 | Sinn | |
| 8,806,482 B1 | 8/2014 | Nagargadde et al. | |
| 8,856,339 B2 | 10/2014 | Mestery et al. | |
| 8,964,548 B1 | 2/2015 | Keralapura et al. | |
| 8,989,199 B1 | 3/2015 | Sella et al. | |
| 9,009,217 B1 | 4/2015 | Nagargadde et al. | |
| 9,055,000 B1 | 6/2015 | Ghosh et al. | |
| 9,060,025 B2 | 6/2015 | Xu | |
| 9,071,607 B2 | 6/2015 | Twitchell, Jr. | |
| 9,075,771 B1 | 7/2015 | Gawali et al. | |
| 9,135,037 B1 | 9/2015 | Petrescu-Prahova et al. | |
| 9,137,334 B2 | 9/2015 | Zhou | |
| 9,154,327 B1 | 10/2015 | Marino et al. | |
| 9,203,764 B2 | 12/2015 | Shirazipour et al. | |
| 9,306,949 B1 * | 4/2016 | Richard | H04L 63/0272 |
| 9,323,561 B2 | 4/2016 | Ayala et al. | |
| 9,336,040 B2 | 5/2016 | Dong et al. | |
| 9,354,983 B1 | 5/2016 | Yenamandra et al. | |
| 9,356,943 B1 | 5/2016 | Lopilato et al. | |
| 9,379,981 B1 | 6/2016 | Zhou et al. | |
| 9,413,724 B2 | 8/2016 | Xu | |
| 9,419,878 B2 | 8/2016 | Hsiao et al. | |
| 9,432,245 B1 | 8/2016 | Sorenson et al. | |
| 9,438,566 B2 | 9/2016 | Zhang et al. | |
| 9,450,817 B1 | 9/2016 | Bahadur et al. | |
| 9,450,852 B1 | 9/2016 | Chen et al. | |
| 9,462,010 B1 | 10/2016 | Stevenson | |
| 9,467,478 B1 | 10/2016 | Khan et al. | |
| 9,485,163 B1 | 11/2016 | Fries et al. | |
| 9,521,067 B2 | 12/2016 | Michael et al. | |
| 9,525,564 B2 | 12/2016 | Lee | |
| 9,559,951 B1 | 1/2017 | Sajassi et al. | |
| 9,563,423 B1 | 2/2017 | Pittman | |
| 9,602,389 B1 | 3/2017 | Maveli et al. | |
| 9,608,917 B1 | 3/2017 | Anderson et al. | |
| 9,608,962 B1 | 3/2017 | Chang | |
| 9,621,460 B2 | 4/2017 | Mehta et al. | |
| 9,641,551 B1 | 5/2017 | Kariyanahalli | |
| 9,665,432 B2 | 5/2017 | Kruse et al. | |
| 9,686,127 B2 | 6/2017 | Ramachandran et al. | |
| 9,715,401 B2 | 7/2017 | Devine et al. | |
| 9,717,021 B2 | 7/2017 | Hughes et al. | |
| 9,722,815 B2 | 8/2017 | Mukundan et al. | |
| 9,747,249 B2 | 8/2017 | Cherian et al. | |
| 9,755,965 B1 | 9/2017 | Yadav et al. | |
| 9,787,559 B1 | 10/2017 | Schroeder | |
| 9,807,004 B2 | 10/2017 | Koley et al. | |
| 9,819,565 B2 | 11/2017 | Djukic et al. | |
| 9,825,822 B1 | 11/2017 | Holland | |
| 9,825,911 B1 | 11/2017 | Brandwine | |
| 9,825,992 B2 | 11/2017 | Xu | |
| 9,832,128 B1 | 11/2017 | Ashner et al. | |
| 9,832,205 B2 | 11/2017 | Santhi et al. | |
| 9,875,355 B1 | 1/2018 | Williams | |
| 9,906,401 B1 | 2/2018 | Rao | |
| 9,930,011 B1 | 3/2018 | Clemons, Jr. et al. | |
| 9,935,829 B1 | 4/2018 | Miller et al. | |
| 9,942,787 B1 | 4/2018 | Tillotson | |
| 10,038,601 B1 | 7/2018 | Becker et al. | |
| 10,057,183 B2 | 8/2018 | Salle et al. | |
| 10,057,294 B2 | 8/2018 | Xu | |
| 10,135,789 B2 | 11/2018 | Mayya et al. | |
| 10,142,226 B1 | 11/2018 | Wu et al. | |
| 10,178,032 B1 | 1/2019 | Freitas | |
| 10,187,289 B1 | 1/2019 | Chen et al. | |
| 10,229,017 B1 | 3/2019 | Zou et al. | |

(56) References Cited

U.S. PATENT DOCUMENTS

| | | |
|---|---|---|
| 10,237,123 B2 | 3/2019 | Dubey et al. |
| 10,250,498 B1 | 4/2019 | Bales et al. |
| 10,263,832 B1 | 4/2019 | Ghosh |
| 10,320,664 B2 | 6/2019 | Nainar et al. |
| 10,320,691 B1 | 6/2019 | Matthews et al. |
| 10,326,830 B1 | 6/2019 | Singh |
| 10,348,767 B1 | 7/2019 | Lee et al. |
| 10,355,989 B1 | 7/2019 | Panchal et al. |
| 10,425,382 B2 | 9/2019 | Mayya et al. |
| 10,454,708 B2 | 10/2019 | Mibu |
| 10,454,714 B2 | 10/2019 | Mayya et al. |
| 10,461,993 B2 | 10/2019 | Turabi et al. |
| 10,498,652 B2 | 12/2019 | Mayya et al. |
| 10,511,546 B2 | 12/2019 | Singarayan et al. |
| 10,523,539 B2 | 12/2019 | Mayya et al. |
| 10,554,538 B2 | 2/2020 | Spohn et al. |
| 10,560,431 B1 | 2/2020 | Chen et al. |
| 10,565,464 B2 | 2/2020 | Han et al. |
| 10,567,519 B1 | 2/2020 | Mukhopadhyaya et al. |
| 10,574,528 B2 | 2/2020 | Mayya et al. |
| 10,594,516 B2 | 3/2020 | Cidon et al. |
| 10,594,659 B2 | 3/2020 | El-Moussa et al. |
| 10,608,844 B2 | 3/2020 | Cidon et al. |
| 10,637,889 B2 | 4/2020 | Ermagan et al. |
| 10,666,460 B2 | 5/2020 | Cidon et al. |
| 10,686,625 B2 | 6/2020 | Cidon et al. |
| 10,749,711 B2 | 8/2020 | Mukundan et al. |
| 10,778,466 B2 | 9/2020 | Cidon et al. |
| 10,778,528 B2 | 9/2020 | Mayya et al. |
| 10,805,114 B2 | 10/2020 | Cidon et al. |
| 10,805,272 B2 | 10/2020 | Mayya et al. |
| 10,819,564 B2 | 10/2020 | Turabi et al. |
| 10,826,775 B1 | 11/2020 | Moreno et al. |
| 10,841,131 B2 | 11/2020 | Cidon et al. |
| 10,911,374 B1 | 2/2021 | Kumar et al. |
| 10,938,693 B2 | 3/2021 | Mayya et al. |
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 | 4/2021 | Michael et al. |
| 10,999,100 B2 | 5/2021 | Cidon et al. |
| 10,999,137 B2 | 5/2021 | Cidon et al. |
| 10,999,165 B2 | 5/2021 | Cidon et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,102,032 B2 | 8/2021 | Cidon et al. |
| 11,115,480 B2 | 9/2021 | Markuze et al. |
| 11,121,962 B2 | 9/2021 | Michael et al. |
| 11,121,985 B2 | 9/2021 | Cidon et al. |
| 11,128,492 B2 | 9/2021 | Sethi et al. |
| 2002/0198840 A1 | 12/2002 | Banka et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0154790 A1 | 7/2005 | Nagata et al. |
| 2005/0172161 A1 | 8/2005 | Cruz et al. |
| 2005/0265255 A1 | 12/2005 | Kodialam et al. |
| 2006/0002291 A1 | 1/2006 | Alicherry et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |
| 2006/0193252 A1 | 8/2006 | Naseh et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0115812 A1 | 5/2007 | Hughes |
| 2007/0121486 A1 | 5/2007 | Guichard et al. |
| 2007/0130325 A1 | 6/2007 | Lesser |
| 2007/0177511 A1 | 8/2007 | Das et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2009/0013210 A1 | 1/2009 | McIntosh et al. |
| 2009/0125617 A1 | 5/2009 | Kiessig et al. |
| 2009/0154463 A1 | 6/2009 | Hines et al. |
| 2009/0247204 A1 | 10/2009 | Sennett et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0088440 A1 | 4/2010 | Banks et al. |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0007752 A1 | 1/2011 | Silva et al. |
| 2011/0032939 A1 | 2/2011 | Nozaki et al. |
| 2011/0040814 A1 | 2/2011 | Higgins |
| 2011/0075674 A1 | 3/2011 | Li et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2012/0008630 A1 | 1/2012 | Ould-Brahim |
| 2012/0027013 A1 | 2/2012 | Napierala |
| 2012/0136697 A1* | 5/2012 | Peles .................. G06Q 10/0639 705/7.38 |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shalzkamer et al. |
| 2012/0250682 A1 | 10/2012 | Vincent et al. |
| 2012/0250686 A1 | 10/2012 | Vincent et al. |
| 2012/0281706 A1 | 11/2012 | Agarwal et al. |
| 2012/0300615 A1 | 11/2012 | Kempf et al. |
| 2012/0317291 A1 | 12/2012 | Wolte |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0103834 A1 | 4/2013 | Dzerve et al. |

(56) References Cited

U.S. PATENT DOCUMENTS

| | | |
|---|---|---|
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173788 A1 | 7/2013 | Song |
| 2013/0182712 A1 | 7/2013 | Aguayo et al. |
| 2013/0191688 A1 | 7/2013 | Agarwal et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0255839 A1 | 10/2013 | Wang et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0164560 A1 | 6/2014 | Ko et al. |
| 2014/0164617 A1 | 6/2014 | Jalan et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0208317 A1 | 7/2014 | Nakagawa |
| 2014/0219135 A1 | 8/2014 | Li et al. |
| 2014/0223507 A1 | 8/2014 | Xu |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0317440 A1 | 10/2014 | Biermayr et al. |
| 2014/0337500 A1 | 11/2014 | Lee |
| 2014/0341109 A1 | 11/2014 | Cartmell et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0363733 A1 | 12/2015 | Brown |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381493 A1 | 12/2015 | Bansal et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1* | 7/2016 | Luft .............. H04L 67/2823 709/225 |
| 2016/0210209 A1 | 7/2016 | Verkaik et al. |
| 2016/0218947 A1 | 7/2016 | Hughes et al. |
| 2016/0218951 A1 | 7/2016 | Vasseur et al. |
| 2016/0255169 A1 | 9/2016 | Kovvuri et al. |
| 2016/0261493 A1 | 9/2016 | Li |
| 2016/0261495 A1 | 9/2016 | Xia et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0012870 A1 | 1/2017 | Blair et al. |
| 2017/0019428 A1 | 1/2017 | Cohn |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034129 A1 | 2/2017 | Sawant et al. |
| 2017/0053258 A1 | 2/2017 | Carney et al. |
| 2017/0055131 A1 | 2/2017 | Kong et al. |

(56) References Cited

U.S. PATENT DOCUMENTS

| | | |
|---|---|---|
| 2017/0063674 A1 | 3/2017 | Maskalik et al. |
| 2017/0063782 A1 | 3/2017 | Jain et al. |
| 2017/0063794 A1 | 3/2017 | Jain et al. |
| 2017/0064005 A1 | 3/2017 | Lee |
| 2017/0093625 A1 | 3/2017 | Pera et al. |
| 2017/0097841 A1 | 4/2017 | Chang et al. |
| 2017/0104755 A1 | 4/2017 | Arregoces et al. |
| 2017/0109212 A1 | 4/2017 | Gaurav et al. |
| 2017/0118173 A1 | 4/2017 | Arramreddy et al. |
| 2017/0123939 A1 | 5/2017 | Maheshwari et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0155557 A1 | 6/2017 | Desai et al. |
| 2017/0163473 A1 | 6/2017 | Sadana et al. |
| 2017/0171310 A1 | 6/2017 | Gardner |
| 2017/0181210 A1 | 6/2017 | Madelia et al. |
| 2017/0195161 A1 | 7/2017 | Ruel et al. |
| 2017/0195169 A1 | 7/2017 | Mills et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0237710 A1 | 8/2017 | Mayya et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279803 A1 | 9/2017 | Desai et al. |
| 2017/0280474 A1 | 9/2017 | Vesterinen et al. |
| 2017/0289002 A1 | 10/2017 | Ganguli et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317974 A1 | 11/2017 | Masurekar et al. |
| 2017/0337086 A1 | 11/2017 | Zhu et al. |
| 2017/0339054 A1 | 11/2017 | Yadav et al. |
| 2017/0339070 A1 | 11/2017 | Chang et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0374174 A1* | 12/2017 | Evens .................. H04L 67/322 |
| 2018/0006995 A1 | 1/2018 | Bickhart et al. |
| 2018/0007123 A1 | 1/2018 | Cheng et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0097725 A1 | 4/2018 | Wood et al. |
| 2018/0114569 A1 | 4/2018 | Strachan et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0260125 A1 | 9/2018 | Botes et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0028552 A1 | 1/2019 | Johnson et al. |
| 2019/0036810 A1 | 1/2019 | Michael et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0140889 A1 | 5/2019 | Mayya et al. |
| 2019/0140890 A1 | 5/2019 | Mayya et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1* | 7/2019 | Prakash ................ G06N 20/00 |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0268421 A1 | 8/2019 | Markuze et al. |
| 2019/0268973 A1 | 8/2019 | Bull et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0313907 A1 | 10/2019 | Khachaturian et al. |
| 2019/0319847 A1 | 10/2019 | Nahar et al. |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0372888 A1 | 12/2019 | Michael et al. |
| 2019/0372889 A1 | 12/2019 | Michael et al. |
| 2019/0372890 A1 | 12/2019 | Michael et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0059420 A1 | 2/2020 | Abraham |
| 2020/0059459 A1 | 2/2020 | Abraham et al. |
| 2020/0092207 A1 | 3/2020 | Sipra et al. |

(56) References Cited

U.S. PATENT DOCUMENTS

| | | |
|---|---|---|
| 2020/0097327 A1 | 3/2020 | Beyer et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0153736 A1 | 5/2020 | Liebherr et al. |
| 2020/0177503 A1 | 6/2020 | Hooda et al. |
| 2020/0204460 A1 | 6/2020 | Schneider et al. |
| 2020/0213212 A1 | 7/2020 | Dillon et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0244721 A1 | 7/2020 | S et al. |
| 2020/0252234 A1 | 8/2020 | Ramamoorthi et al. |
| 2020/0267184 A1 | 8/2020 | Vera-Schockner |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0314006 A1 | 10/2020 | Mackie et al. |
| 2020/0314614 A1 | 10/2020 | Moustafa et al. |
| 2020/0336336 A1 | 10/2020 | Sethi et al. |
| 2020/0344163 A1 | 10/2020 | Gupta et al. |
| 2020/0351188 A1 | 11/2020 | Arora et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0029088 A1 | 1/2021 | Mayya et al. |
| 2021/0036888 A1 | 2/2021 | Makkalla et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |

FOREIGN PATENT DOCUMENTS

| | | |
|---|---|---|
| EP | 3509256 A1 | 7/2019 |
| RU | 2574350 C2 | 2/2016 |
| WO | 03073701 | 9/2003 |
| WO | 2012167184 A2 | 12/2012 |
| WO | 2017083975 A1 | 5/2017 |
| WO | 2019070611 A1 | 4/2019 |
| WO | 2019094522 A1 | 5/2019 |
| WO | 2020018704 A1 | 1/2020 |
| WO | 2020101922 A1 | 5/2020 |
| WO | 2021040934 A1 | 3/2021 |
| WO | 2021118717 A1 | 6/2021 |
| WO | 2021150465 A1 | 7/2021 |

OTHER PUBLICATIONS

Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Augusl 14-16, 2013, 10 pages, IEEE, San Francisco, CA, USA.

Non-Published Commonly Owned U.S. Appl. No. 17/068,603 (N773. C2), filed Oct. 12, 2020, 37 pages, Nicira, Inc.

Non-Published Commonly Owned U.S. Appl. No. 15/803,964 (MODE. P004), filed Nov. 6, 2017, 15 pages, The Mode Group.

Non-Published Commonly Owned U.S. Appl. No. 16/216,235 (MODE. P004C1), filed Dec. 11, 2018, 19 pages, The Mode Group.

Non-Published Commonly Owned U.S. Appl. No. 16/818,862 (MODE. P001 C1), filed Mar. 13, 2020, 198 pages, The Mode Group.

Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.

Webb, Kevin C., et al., "Blender: Upgrading Tenant-Based Data Center Networking," 2014 ACM/IEEE Symposium an Architectures for Networking and Communications Systems (ANCS), Oct. 20-21, 2014, 11 pages, IEEE, Marina del Rey, CA, USA.

Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.

Non-Published Commonly Owned U.S. Appl. No. 16/945,700 (N774 CIP1.C1), filed Jul. 31, 2020, 37 pages, Nicira, Inc.

Non-Published Commonly Owned U.S. Appl. No. 16/945,867 (N775 01.C1), filed Aug. 1, 2020, 30 pages, Nicira, Inc.

Mon-Published Commonly Owned U.S. Appl. No. 16/785,628 (N775 02.C1), filed Feb. 9, 2020, 44 pages, Nicira, Inc.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Non-Published Commonly Owned U.S. Appl. No. 17/187,913 (N776. 01.C2), filed Mar. 1, 2021, 27 pages, Nicira, Inc.

Non-Published Commonly Owned U.S. Appl. No. 17/233,427 (F271 14.CIP.C1), filed Apr. 16, 2021, 124 pages, VMware, Inc.

Non-Published Commonly Owned U.S. Appl. No. 17/240,890 (H056. C1.CIP2.C1), filed Apr. 26, 2021, 325 pages, VMware, Inc.

Non-Published Commonly Owned U.S. Appl. No. 17/240,906 (H056. C3), filed Apr. 26, 2021, 18 pages, VMware, Inc.

Non-Published Commonly Owned U.S. Appl. No. 17/361,292 (N774 CIP2.C2), filed Jun. 28, 2021, 35 pages, Nicira, Inc.

Non-Published Commonly Owned U.S. Appl. No. 17/467,378 (F271 01.CIP.C2), filed Sep. 6, 2021, 157 pages, VMware, Inc.

Non-Published Commonly Owned U.S. Appl. No. 17/474,034 (H056. C1.CIP6.C1), filed Sep. 13, 2021, 349 pages, VMware, Inc.

Sarhan, Soliman Abd Elmonsef, et al., "Data Inspection in SDN Network," 2018 13th International Conference an Computer Engineering and Systems (ICCES), Dec. 18-19, 2018, 6 pages, IEEE, Cairo, Egypt.

Xie, Junfeng, et al., A Survey of Machine Learning Techniques Applied to Software Defined Networking (SDN) Research Issues

(56) References Cited

OTHER PUBLICATIONS and Challenges, IEEE Communications Surveys & Tutorials, Aug. 23, 2018, 38 pages, vol. 21, Issue 1, IEEE.
Maudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.
Non-published Commonly Owned U.S. Appl. No. 16/656,555 (N774 CIP2.C1), filed Oct. 17, 2019, 40 pages, Nicira, Inc.
Non-Published Commonly Owned U.S. Appl. No. 16/662,363 (F544), filed Oct. 24, 2019, 129 pages, VMware, Inc.
Non-Published Commonly Owned U.S. Appl. No. 16/662,379 (F545), filed Oct. 24, 2019, 123 pages, VMware, Inc.
Non-Published Commonly Owned U.S. Appl. No. 16/662,402 (F546), filed Oct. 24, 2019, 128 pages, VMware, Inc.
Non-Published Commonly Owned U.S. Appl. No. 16/662,427 (F547.01), filed Oct. 24, 2019, 165 pages, VMware, Inc.
Non-Published Commonly Owned U.S. Appl. No. 16/662,489 (F547.02), filed Oct. 24, 2019, 165 pages, VMware, Inc.
Non-Published Commonly Owned U.S. Appl. No. 16/662,510 (F547.03), filed Oct. 24, 2019, 165 pages, VMware, Inc.
Non-Published Commonly Owned U.S. Appl. No. 16/662,531 (F548), filed Oct. 24, 2019, 135 pages, VMware, Inc.
Non-Published Commonly Owned U.S. Appl. No. 16/662,570 (F549), filed Oct. 24, 2019, 141 pages, VMware, Inc.
Non-Published Commonly Owned U.S. Appl. No. 16/662,587 (F550), filed Oct. 24, 2019, 145 pages, VMware, Inc.
Non-published Commonly Owned U.S. Appl. No. 16/699,719 (N773.CIP2.C1), filed Dec. 1, 2019, 42 pages, Nicira, Inc.
Non-published Commonly Owned U.S. Appl. No. 16/724,154 (N776.01 ,C1), filed Dec. 20, 2019, 27 pages, Nicira, Inc.
Guo, Xiangyi, et al., (U.S. Appl. No. 62/925,193) filed Oct. 23, 2019, 26 pages.
Lin, Weidong, et al., "Using Path Label Routing in Wide Area Software-Defined Networks with Open Flow," 2016 International Conference on Networking and Network Applications, Jul. 2016, 6 pages, IEEE.

\* cited by examiner

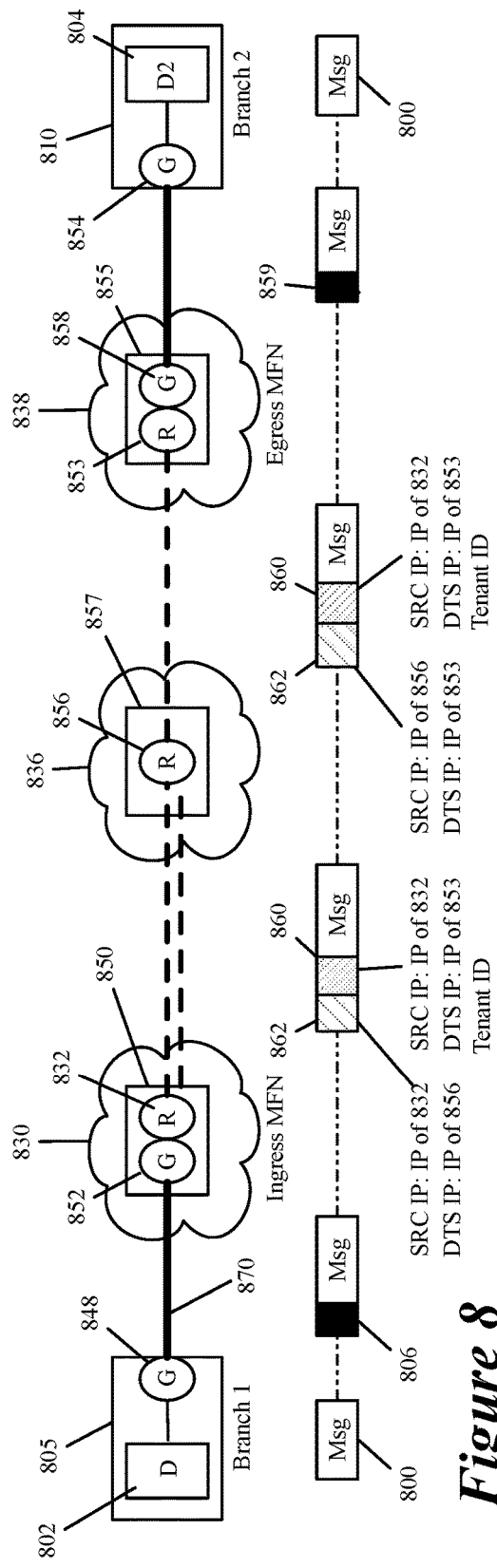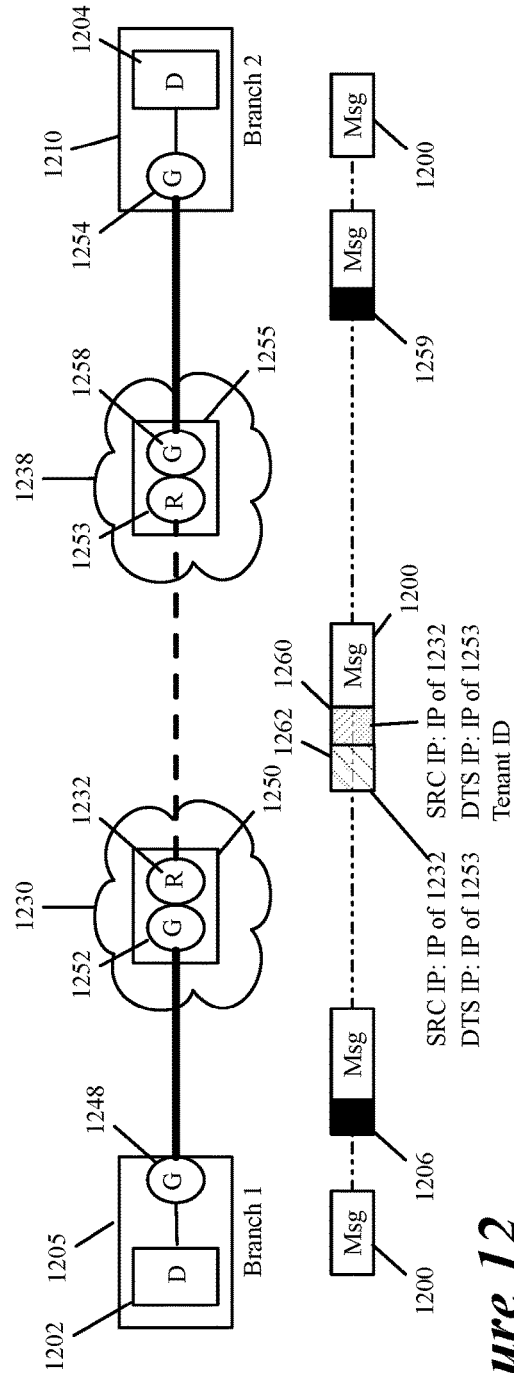

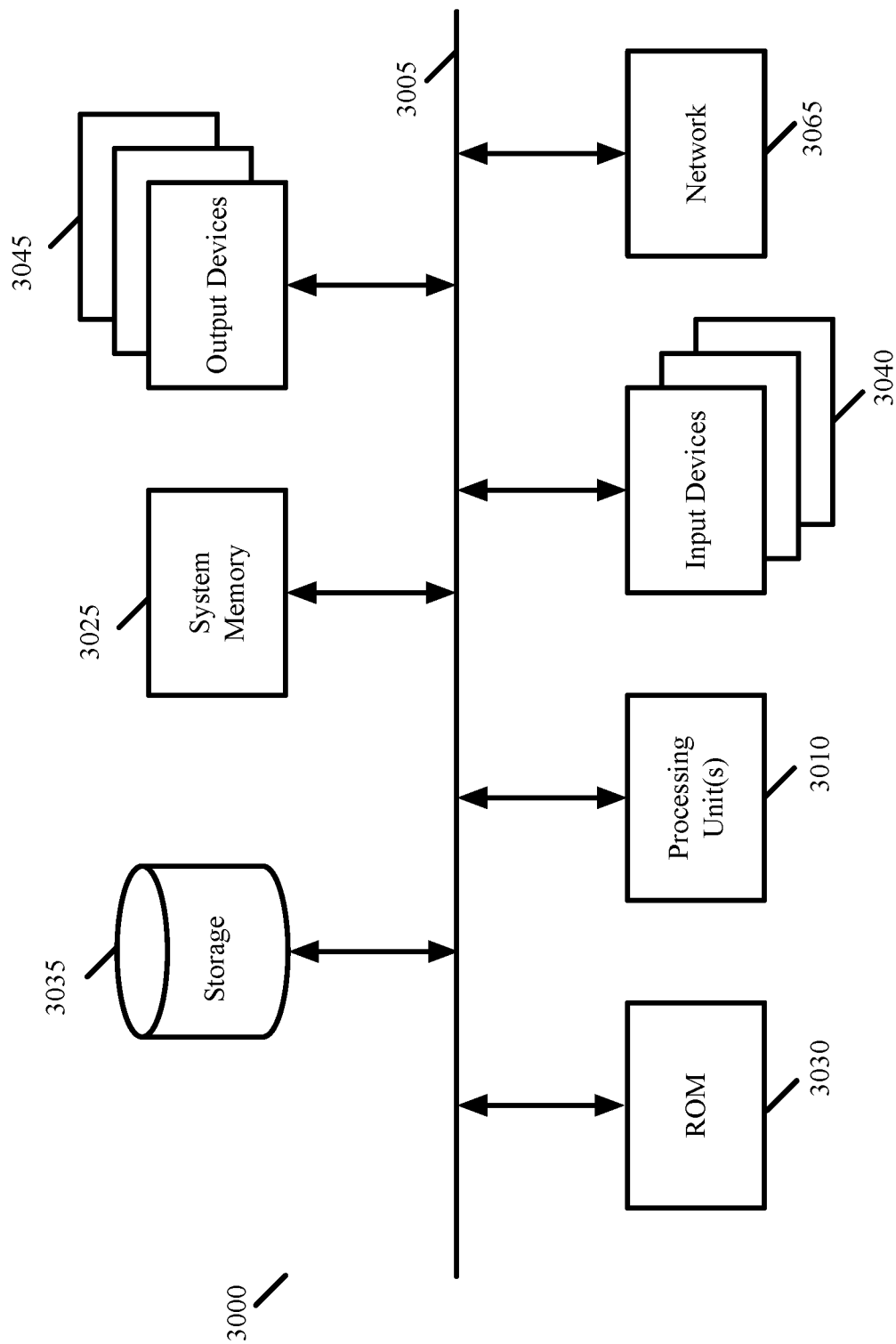

PROVIDING MEASUREMENTS OF PUBLIC CLOUD CONNECTIONS

BACKGROUND

Today, a corporate enterprise network is the communication backbone that securely connects the different offices and divisions of a corporation. This network is typically a wide area network (WAN) that connects (1) users in branch offices and regional campuses, (2) corporate datacenters that host business applications, Intranets and their corresponding data, and (3) the global Internet through corporate firewalls and DMZ (demilitarized zone). Enterprise networks include specialized hardware such as switches, routers and middle-box appliances interconnected by expensive leased lines, such as Frame Relay and MPLS (multiprotocol label switching).

In the last several years, there has been a paradigm shift in the way corporations serve and consume communication services. First, the mobility revolution has allowed users to access services from any place at any time using mobile devices, mostly smart phones. Such users access the business services through public Internet and cellular networks. At the same time, third-party SaaS (Software as a Service) vendors (e.g., Salesforce, Workday, Zendesk) have replaced traditional on-premise applications, while other applications hosted in private datacenters have been relocated to the public clouds. While this traffic is still carried within the enterprise network, a significant portion of it originates and terminates outside the corporate network perimeters and has to cross both the public Internet (once or twice) as well as the corporate network. Recent studies have shown that 40% of corporate networks report that the percentage of back-hauled traffic (i.e., of Internet traffic observed in the corporate network) is above 80%. This means that the majority of the corporate traffic is carried over both expensive leased lines and the consumer Internet.

As a consumer-centric service, the Internet itself is a poor medium for business traffic. It lacks the reliability, QoS (quality of service) guarantees and security expected by critical business applications. Moreover, the ever-increasing consumer traffic demands, net-neutrality regulations and the creation of Internet bypasses by major players (e.g., Netflix, Google, public clouds) have lowered the monetary return per traffic unit. These trends have reduced the incentives of service providers to quickly catch up with the consumer demands and offer adequate business services.

Given the growth of public clouds, corporations are migrating more of their compute infrastructure to the public cloud datacenters. Public cloud providers have been at the forefront of compute and networking infrastructure investment. These cloud services have built many datacenters across the world, with Azure, AWS, IBM and Google expanding to 38, 16, 25, and 14 worldwide regions respectively in 2016. Each public cloud provider has interconnected its own datacenters by using expensive high-speed networks that employ dark fiber and undersea cables deployed by submarines.

Today, notwithstanding these changes, corporate network policies often force all corporate traffic to go through their secure WAN gateways. As users become mobile and applications migrate to SaaS and public clouds, corporate WANs become costly detours that slow down all corporate communications. Most corporate WAN's traffic is either sourced from or destined to the Internet. Alternate secure solutions that send this traffic through the Internet are not adequate because of their poor and unreliable performance.

BRIEF SUMMARY

Some embodiments establish for an entity a virtual network over several public cloud datacenters of one or more public cloud providers in one or more regions (e.g., several cities, states, countries, etc.). Examples of entities for which such a virtual network can be established include a business entity (e.g., a corporation), a non-profit entity (e.g., a hospital, a research organization, etc.), and an educational entity (e.g., a university, a college, etc.), or any other type of entity. Examples of public cloud providers include Amazon Web Services (AWS), Google Cloud Platform (GCP), Microsoft Azure, etc.

In some embodiments, high-speed, reliable private networks interconnect two or more of the public cloud datacenters (the public clouds). Some embodiments define the virtual network as an overlay network that spans across several public clouds to interconnect one or more private networks (e.g., networks within branches, divisions, departments of the entity or their associated datacenters), mobile users, SaaS (Software as a Service) provider machines, machines and/or services in the public cloud(s), and other web applications.

Some embodiments utilize a logically centralized controller cluster (e.g., a set of one or more controller servers) that configures the public-cloud components to implement the virtual network over several public clouds. In some embodiments, the controllers in this cluster are at various different locations (e.g., are in different public cloud datacenters) in order to improve redundancy and high availability. The controller cluster in some embodiments scales up or down the number of public cloud components that are used to establish the virtual network, or the compute or network resources allocated to these components.

Some embodiments establish different virtual networks for different entities over the same set of public clouds of the same public cloud providers and/or over different sets of public clouds of the same or different public cloud providers. In some embodiments, a virtual network provider provides software and services that allow different tenants to define different virtual networks over the same or different public clouds. In some embodiments, the same controller cluster or different controller clusters can be used to configure the public cloud components to implement different virtual networks over the same or different sets of public clouds for several different entities.

To deploy a virtual network for a tenant over one or more public clouds, the controller cluster (1) identifies possible ingress and egress routers for entering and exiting the virtual network for the tenant based on locations of the tenant's branch offices, datacenters, mobile users, and SaaS providers, and (2) identifies routes that traverse from the identified ingress routers to the identified egress routers through other intermediate public-cloud routers that implement the virtual network. After identifying these routes, the controller cluster propagates these routes to the forwarding tables of the virtual network routers in the public cloud(s). In the embodiments that use Open vSwitch (OVS) based virtual network routers, the controller distributes the routes by using OpenFlow.

Some embodiments provide a novel method for deploying different virtual networks over several public cloud datacenters for different entities. For each entity, the method (1) identifies a set of public cloud datacenters of one or more public cloud providers to connect a set of machines of the entity, (2) deploys managed forwarding nodes (MFNs) for the entity in the identified set of public cloud datacenters, and then (3) configures the MFNs to implement a virtual network that connects the entity's set of machines across its identified set of public cloud datacenters.

Managed forwarding nodes in some embodiments include one or more modules executing on a set of one or more host computers to perform forwarding operations. The MFNs in some embodiments perform other operations as well, such as service operations, e.g., NAT operations, load balancing operations, etc. In some embodiments, the MFNs that the method deploys for an entity are just used to process data message flows for that entity's machines. For instance, in some embodiments, the deployed MFNs for an entity are dedicated MFNs as they only carry the data message flows for that entity.

In some embodiments, the different virtual networks that the method defines for the different entities can differ in the public cloud datacenters that they span, the public clouds of different public cloud providers that they use and/or different public cloud regions in which they are defined. In some embodiments, the entity's machines that are connected by its virtual network are machines outside of any public cloud. In other embodiments, some of the entity's machines are in a public cloud, while other machines reside outside of the public clouds. Also, in some embodiments, the entity's machines include SaaS provider machines that the entity uses for certain SaaS operations.

In some embodiments, the method identifies the set of public cloud datacenters for an entity by receiving input from the entity's network administrator. In some embodiments, this input specifies the public cloud providers to use and/or the public cloud regions in which the virtual network should be defined. Conjunctively, or alternatively, this input in some embodiments specifies the actual public cloud datacenters to use. Under the above-described approach, different entities often end up with very different virtual networks as the entities often provide different input regarding the desired public cloud providers, regions and/or datacenters. The method of some embodiments supplements the set of public cloud datacenters identified for an entity through the entity's input with one or more public cloud datacenters that the method identifies as desirable datacenters to add to the entity's set of datacenters, as further described below.

To configure the MFNs, the method deploys measurement agents in public cloud datacenters (PCDs), and has these agents exchange messages in order to generate network measurements that quantify the quality of network connections between different pairs of PCDs or different pairs of PCD groups (e.g., between different public cloud regions or availability zones). Examples of network measurements that the method generates for a connection between two PCDs or PCD groups include loss, delay, and jitter experienced on this connection, as well as the reliability and cost of the connection.

In some embodiments, the method configures the MFNs deployed for an entity based on the network measurements that it generates for the set of PCDs that it identifies for the entity. For instance, in some embodiments, the method configures an entity's deployed MFNs by (1) performing path-identifying processes that use the measurements generated for the entity's identified set of PCDs to identify a set of paths connecting the entity's machines across the identified set of PCDs, and (2) using the identified paths to define next hop records that configure the MFNs to forward data message flows along the different paths. To configure the MFNs, the method in some embodiments provides the next hop records to a set of controllers that distribute them to the MFNs.

To identify the paths, the method uses the generated measurements to perform smallest cost (e.g., shortest) path searches. Some embodiments allow different entities to direct the method to use different types of measurements in performing its path searches, e.g., one entity can direct the method to minimize message delay, another entity can direct the method to minimize message jitter, still another entity can direct the method to minimize loss and delay, etc. For each entity, the method in some embodiments custom configures its path search operations to optimize a set of criteria specified by the entity.

As mentioned above, the method of some embodiments supplements the set of public cloud datacenters that it identifies for an entity through the entity's input, with one or more PCDs or PCD groups that the method identifies as desirable datacenters to add to the entity's set of datacenters. In some embodiments, the method provides to an entity a recommendation to add certain public clouds, PCD groups or PCDs to the list of public clouds or PCDs specified by entity, before deploying any MFN for the entity. Conjunctively, or alternatively, the method in some embodiments provides a recommendation to add one or more public clouds or PCDs after deploying the entity's MFNs, collecting statistics regarding their usage and analyzing the statistics to determine that it is desirable to add the public clouds or PCDs. Based on its analysis of the collected statistics, the method in some embodiments also recommends removal of underutilized public clouds or PCDs.

The method of some embodiments allows an entity to use other MFNs that have not been specifically deployed for the entity under certain circumstances. These other MFNs in some embodiments are shared MFNs as multiple entities can use them, as opposed to dedicated MFNs that are specifically deployed for a single entity. In some embodiments, the dedicated MFNs that are specifically deployed for one entity have the same attributes and perform the same operations (e.g., check for a tenant identifier in performing its forwarding operations) as the shared MFNs that are deployed and used by multiple entities. The only difference between the dedicated and shared MFNs in these embodiments is that the dedicated MFNs are used to process data messages for just one tenant, while the shared MFNs are used to process data messages for multiple entities.

One example in which an entity can use a shared MFN that has not been specifically deployed for the entity involves the use of MFNs in remote locations by the mobile devices of an entity in those location. For instance, an entity may predominantly operate in one region (e.g., only have offices in North America, etc.), but may have users that go on trips internationally and need to access the entity's network through the virtual network that is deployed for it over the public clouds. For such situations, the method of some embodiments allows the mobile devices (e.g., phones, tablets, laptops, etc.) of these traveling users to access its virtual network through an MFN that the method deploys in one or more PCDs (e.g., public clouds in Europe or Asia) in the foreign countries.

Another example involves the use of MFNs that are deployed in datacenters near the Internet backbone or serving as part of the Internet backbone. Setting up machines near or at the Internet backbone is difficult and can be expensive for any one entity. Accordingly, entities might not typically request that their virtual networks have a dedicated MFN deployed near or at the Internet backbone. Deploying such dedicated MFNs might not even be possible.

Before or after deploying the MFNs for an entity, the method's path searches might determine that for certain compute nodes of the entity, it is desirable to use a path that traverses through one or more shared MFNs deployed near or at the Internet backbone (i.e., to use a path that leaves the dedicated virtual network of the entity to use one or more MFNs near or at the Internet backbone). In such cases, the method of some embodiments provides a recommendation to the entity that the shared MFNs deployed near or at the Internet backbone should be used. When the entity accepts this recommendation, the method configures the MFNs to use the identified path(s) that use the shared MFNs near or at the Internet backbone.

The method of some embodiments allows for temporary usage of the shared MFNs when an entity's dedicated virtual network appears congested or is expected to be congested at one or more MFNs that are specifically deployed for the entity. In some embodiments, the method collects and analyzes statistics regarding the use of the dedicated MFNs that have been deployed for a particular entity. Based on this analysis, the method identifies one or more MFNs that are congested, and in response, reconfigures one or more network elements (e.g., load balancers) to redirect some of the data message flows to the shared MFNs and reconfigures these shared MFNs to forward the entity's data message flows until they reach their destination nodes or they reach another ingress node into the entity's virtual network.

The method in some embodiments does not deploy and configure MFNs to implement virtual networks. For instance, in some embodiments, the method provides measurements that quantify connections between PCDs or PCD groups to other processes that deploy and configure MFNs. In other embodiments, the method provides these measurements to other processes that perform other cloud-based operations, such as processes that deploy application machines in the public clouds and use the measurements to identify the best locations for such deployments. The method of still other embodiments uses these measurements to perform other cloud-based operations itself (e.g., deploying application machines in the public clouds and using the measurements to identify the best locations for such deployments).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 7 illustrates an example of the two encapsulating headers of some embodiments, while FIG. 8 presents an example that illustrates how these two headers are used in some embodiments.

FIG. 12 illustrates an example that does not involve an intermediate MFN between the ingress and egress MFNs.

FIG. 30 conceptually illustrates a computer system with which some embodiments of the invention are implemented.

DETAILED DESCRIPTION

Figure 1A:
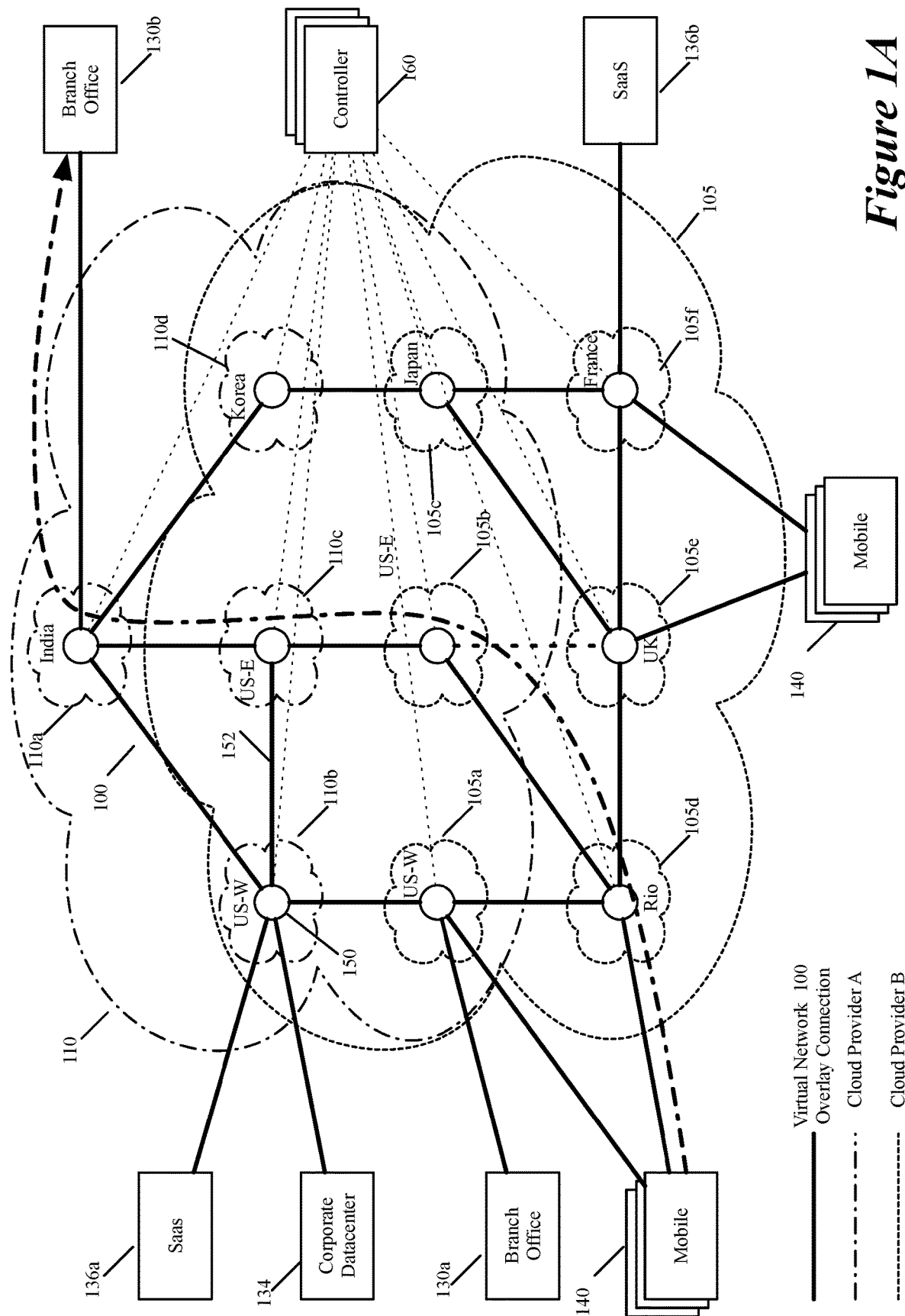
FIG. 1A presents a virtual network that is defined for a corporation over several public cloud datacenters of two public cloud providers.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments establish for an entity a virtual network over several public cloud datacenters of one or more public cloud providers in one or more regions (e.g., several cities, states, countries, etc.). An example of an entity for which such a virtual network can be established include a business entity (e.g., a corporation), a non-profit entity (e.g., a hospital, a research organization, etc.), and an educational entity (e.g., a university, a college, etc.), or any other type of entity. Examples of public cloud providers include Amazon Web Services (AWS), Google Cloud Platform (GCP), Microsoft Azure, etc.

Some embodiments define the virtual network as an overlay network that spans across several public cloud datacenters (public clouds) to interconnect one or more private networks (e.g., networks within branches, divisions, departments of the entity or their associated datacenters), mobile users, SaaS (Software as a Service) provider machines, machines and/or services in the public cloud(s), and other web applications. In some embodiments, high-speed, reliable private networks interconnect two or more of the public cloud datacenters.

The virtual network in some embodiments can be configured to optimize the routing of the entity's data messages to their destinations for best end-to-end performance, reliability and security, while trying to minimize the routing of this traffic through the Internet. Also, the virtual network in some embodiments can be configured to optimize the layer 4 processing of the data message flows passing through the network. For instance, in some embodiments, the virtual network optimizes the end-to-end rate of TCP (Transport Control Protocol) connections by splitting the rate control mechanisms across the connection path.

Some embodiments establish the virtual network by configuring several components that are deployed in several public clouds. These components include in some embodiments software-based measurement agents, software forwarding elements (e.g., software routers, switches, gateways, etc.), layer-4 connection proxies and middlebox service machines (e.g., appliances, VMs, containers, etc.).

Some embodiments utilize a logically centralized controller cluster (e.g., a set of one or more controller servers) that configures the public-cloud components to implement the virtual network over several public clouds. In some embodiments, the controllers in this cluster are at various different locations (e.g., are in different public cloud datacenters) in order to improve redundancy and high availability. When different controllers in the controller cluster are located in different public cloud datacenters, the controllers in some embodiments share their state (e.g., the configuration data that they generate to identify tenants, routes through the virtual networks, etc.). The controller cluster in some embodiments scales up or down the number of public cloud components that are used to establish the virtual network, or the compute or network resources allocated to these components.

Some embodiments establish different virtual networks for different entities over the same set of public clouds of the same public cloud providers and/or over different sets of public clouds of the same or different public cloud providers. In some embodiments, a virtual network provider provides software and services that allow different tenants to define different virtual networks over the same or different public clouds. In some embodiments, the same controller cluster or different controller clusters can be used to configure the public cloud components to implement different virtual networks over the same or different sets of public clouds for several different entities.

Several examples of corporate virtual networks are provided in the discussion below. However, one of ordinary skill will realize that some embodiments define virtual networks for other types of entities, such as other business entities, non-profit organizations, educational entities, etc. Also, as used in this document, data messages refer to a collection of bits in a particular format sent across a network. One of ordinary skill in the art will recognize that the term data message is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

FIG. 1A presents a virtual network 100 that is defined for a corporation over several public cloud datacenters 105 and 110 of two public cloud providers A and B. As shown, the virtual network 100 is a secure overlay network that is established by deploying different managed forwarding nodes 150 in different public clouds and connecting the managed forwarding nodes (MFNs) to each other through overlay tunnels 152. In some embodiments, an MFN is a conceptual grouping of several different components in a public cloud datacenter that with other MFNs (with other groups of components) in other public cloud datacenters establish one or more overlay virtual networks for one or more entities.

As further described below, the group of components that form an MFN include in some embodiments (1) one or more VPN gateways for establishing VPN connections with an entity's compute nodes (e.g., offices, private datacenters, remote users, etc.) that are external machine locations outside of the public cloud datacenters, (2) one or more forwarding elements for forwarding encapsulated data messages between each other in order to define an overlay virtual network over the shared public cloud network fabric, (3) one or more service machines for performing middlebox service operations as well as L4-L7 optimizations, and (4) one or more measurement agents for obtaining measurements regarding the network connection quality between the public cloud datacenters in order to identify desired paths through the public cloud datacenters. In some embodiments, different MFNs can have different arrangements and different numbers of such components, and one MFN can have different numbers of such components for redundancy and scalability reasons.

Also, in some embodiments, each MFN's group of components execute on different computers in the MFN's public cloud datacenter. In some embodiments, several or all of an MFN's components can execute on one computer of a public cloud datacenter. The components of an MFN in some embodiments execute on host computers that also execute other machines of other tenants. These other machines can be other machines of other MFNs of other tenants, or they can be unrelated machines of other tenants (e.g., compute VMs or containers).

The virtual network 100 in some embodiments is deployed by a virtual network provider (VNP) that deploys different virtual networks over the same or different public cloud datacenters for different entities (e.g., different corporate customers/tenants of the virtual network provider). The virtual network provider in some embodiments is the entity that deploys the MFNs and provides the controller cluster for configuring and managing these MFNs.

The virtual network 100 connects the corporate compute endpoints (such as datacenters, branch offices and mobile users) to each other and to external services (e.g., public web services, or SaaS services such as Office365 or Salesforce) that reside in the public cloud or reside in private datacenter accessible through the Internet. As further described below, SaaS in some embodiments is a software distribution model in which a third-party provider hosts applications and makes them available to customers over the Internet.

The virtual network 100 leverages the different locations of the different public clouds to connect different corporate compute endpoints (e.g., different private networks and/or different mobile users of the corporation) to the public clouds in their vicinity. Corporate compute endpoints are also referred to as corporate compute nodes in the discussion below. In some embodiments, the virtual network 100 also leverages the high-speed networks that interconnect these public clouds to forward data messages through the public clouds to their destinations or to get as close to their destinations while reducing their traversal through the Internet. When the corporate compute endpoints are outside of public cloud datacenters over which the virtual network spans, these endpoints are referred to as external machine locations. This is the case for corporate branch offices, private datacenters and devices of remote users.

In the example illustrated in FIG. 1A, the virtual network 100 spans six datacenters 105a-105f of the public cloud provider A and four datacenters 110a-110d of the public cloud provider B. In spanning these public clouds, this virtual network connects several branch offices, corporate datacenters, SaaS providers and mobile users of the corporate tenant that are located in different geographic regions. Specifically, the virtual network 100 connects two branch offices 130a and 130b in two different cities (e.g., San Francisco, Calif., and Pune, India), a corporate datacenter 134 in another city (e.g., Seattle, Wash.), two SaaS provider datacenters 136a and 136b in another two cities (Redmond, Wash., and Paris, France), and mobile users 140 at various locations in the world. As such, this virtual network can be viewed as a virtual corporate WAN.

In some embodiments, the branch offices 130a and 130b have their own private networks (e.g., local area networks) that connect computers at the branch locations and branch private datacenters that are outside of public clouds. Similarly, the corporate datacenter 134 in some embodiments has its own private network and resides outside of any public cloud datacenter. In other embodiments, however, the corporate datacenter 134 or the datacenter of the branch 130a and 130b can be within a public cloud, but the virtual network does not span this public cloud, as the corporate or branch datacenter connects to the edge of the virtual network 100.

As mentioned above, the virtual network 100 is established by connecting different deployed managed forwarding nodes 150 in different public clouds through overlay tunnels 152. Each managed forwarding node 150 includes several configurable components. As further described above and further described below, the MFN components include in some embodiments software-based measurement agents, software forwarding elements (e.g., software routers, switches, gateways, etc.), layer 4 proxies (e.g., TCP proxies) and middlebox service machines (e.g., VMs, containers, etc.). One or more of these components in some embodiments use standardized or commonly available solutions, such as Open vSwitch, OpenVPN, strongSwan, etc.

In some embodiments, each MFN (i.e., the group of components the conceptually forms an MFN) can be shared by different tenants of the virtual network provider that deploys and configures the MFNs in the public cloud datacenters. Conjunctively, or alternatively, the virtual network provider in some embodiments can deploy a unique set of MFNs in one or more public cloud datacenters for a particular tenant. For instance, a particular tenant might not wish to share MFN resources with another tenant for security reasons or quality of service reasons. For such a tenant, the virtual network provider can deploy its own set of MFNs across several public cloud datacenters.

In some embodiments, a logically centralized controller cluster 160 (e.g., a set of one or more controller servers) operate inside or outside of one or more of the public clouds 105 and 110, and configure the public-cloud components of the managed forwarding nodes 150 to implement the virtual network over the public clouds 105 and 110. In some embodiments, the controllers in this cluster are at various different locations (e.g., are in different public cloud datacenters) in order to improve redundancy and high availability. The controller cluster in some embodiments scales up or down the number of public cloud components that are used to establish the virtual network, or the compute or network resources allocated to these components.

Figure 1B:
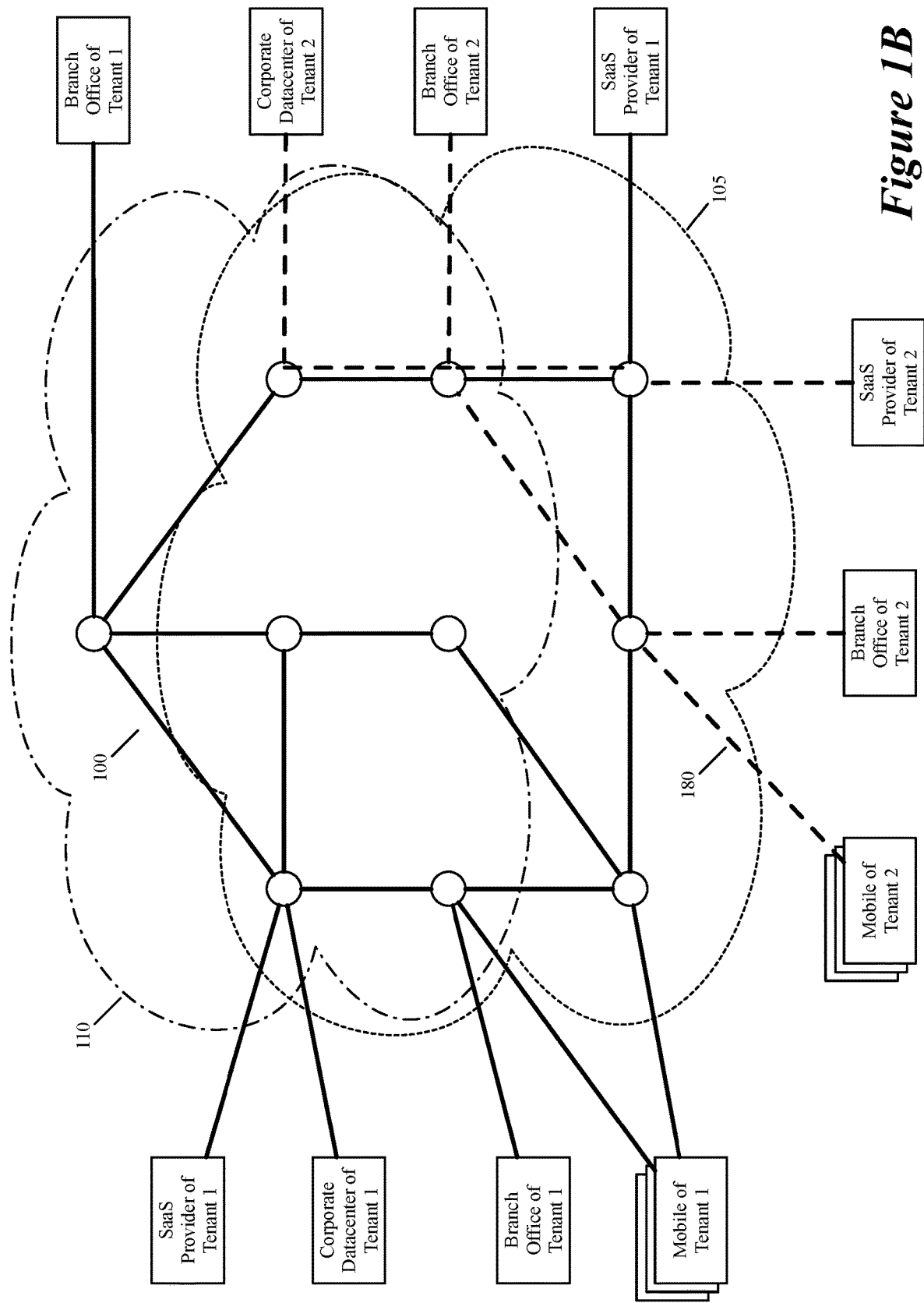
FIG. 1B illustrates an example of two virtual networks for two corporate tenants that are deployed over the public clouds.
Figure 1C:
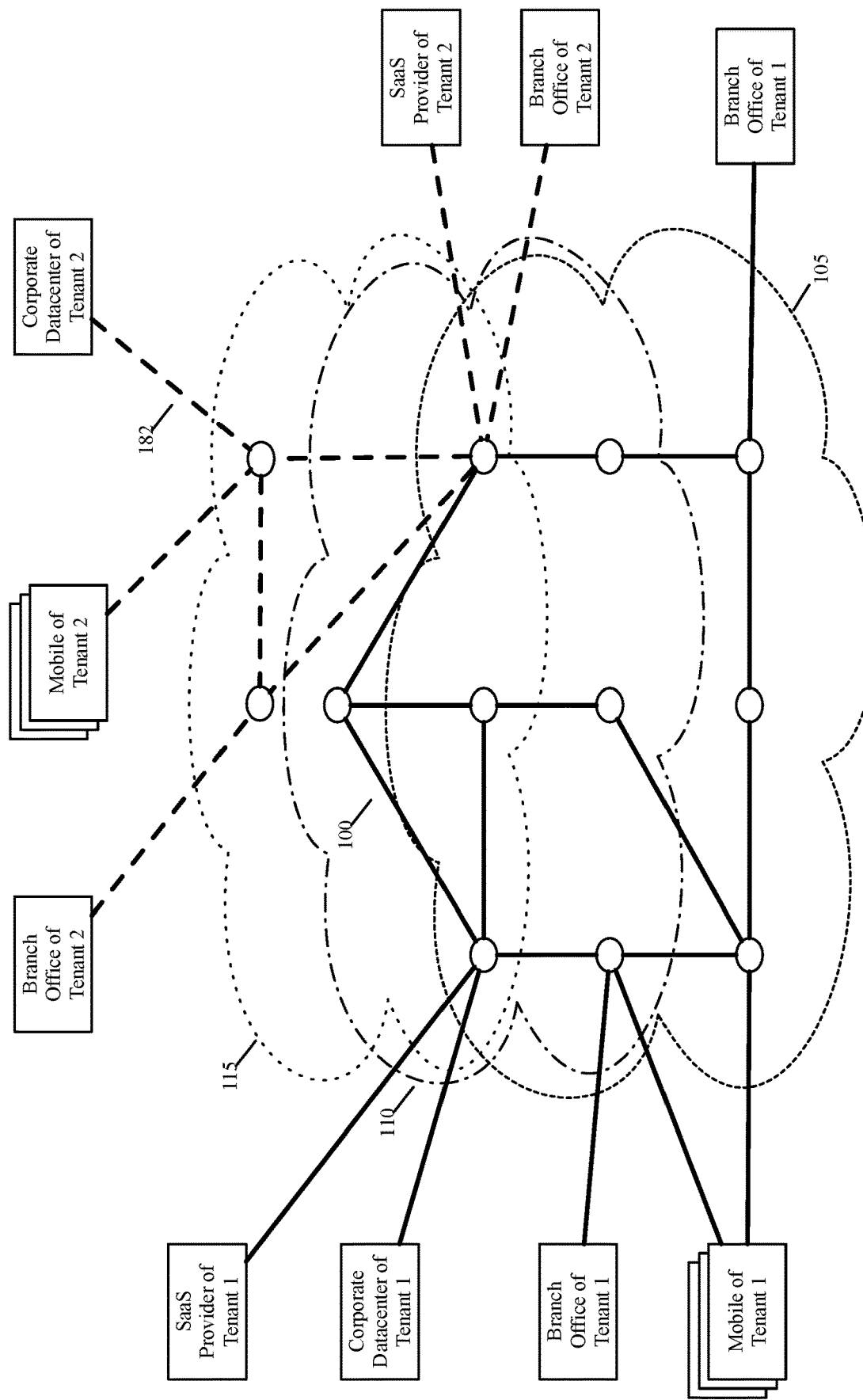
FIG. 1C alternatively illustrates an example of two virtual networks, with one network deployed over public clouds and the other virtual network deployed over another pair of public clouds.

In some embodiments, the controller cluster 160, or another controller cluster of the virtual network provider, establishes a different virtual network for another corporate tenant over the same public clouds 105 and 110, and/or over different public clouds of different public cloud providers. In addition to the controller cluster(s), the virtual network provider in other embodiments deploys forwarding elements and service machines in the public clouds that allow different tenants to deploy different virtual networks over the same or different public clouds. FIG. 1B illustrates an example of two virtual networks 100 and 180 for two corporate tenants that are deployed over the public clouds 105 and 110. FIG. 1C alternatively illustrates an example of two virtual networks 100 and 182, with one network 100 deployed over public clouds 105 and 110 and the other virtual network 182 deployed over another pair of public clouds 110 and 115.

Through the configured components of the MFNs, the virtual network 100 of FIG. 1A allows different private networks and/or different mobile users of the corporate tenant to connect to different public clouds that are in optimal locations (e.g., as measured in terms of physical distance, in terms of connection speed, loss, delay and/or cost, and/or in terms of network connection reliability, etc.) with respect to these private networks and/or mobile users. These components also allow the virtual network 100 in some embodiments to use the high-speed networks that interconnect the public clouds to forward data messages through the public clouds to their destinations while reducing their traversal through the Internet.

In some embodiments, the MFN components are also configured to run novel processes at the network, transport and application layers to optimize the end-to-end performance, reliability and security. In some embodiments, one or more of these processes implement proprietary high-performance networking protocols, free from the current network protocol ossification. As such, the virtual network 100 in some embodiments is not confined by Internet autonomous systems, routing protocols, or even end-to-end transport mechanisms.

For example, in some embodiments, the components of the MFNs 150 (1) create optimized, multi-path and adaptive centralized routing, (2) provide strong QoS (Quality of Service) guarantees, (3) optimize end-to-end TCP rates through intermediate TCP splitting and/or termination, and (4) relocate scalable application-level middlebox services (e.g., firewalls, intrusion detection systems (IDS), intrusion prevention system (IPS), WAN optimization, etc.) to the compute part of the cloud in a global network function virtualization (NFV). Accordingly, the virtual network can be optimized to fit customized and changing demands of the corporation without being bound to existing network protocol. Also, in some embodiments, the virtual network can be configured as a "pay as you go" infrastructure that can be dynamically and elastically scaled up and down both in performance capability and in geographical span according to the continuous requirement changes.

Figure 2:
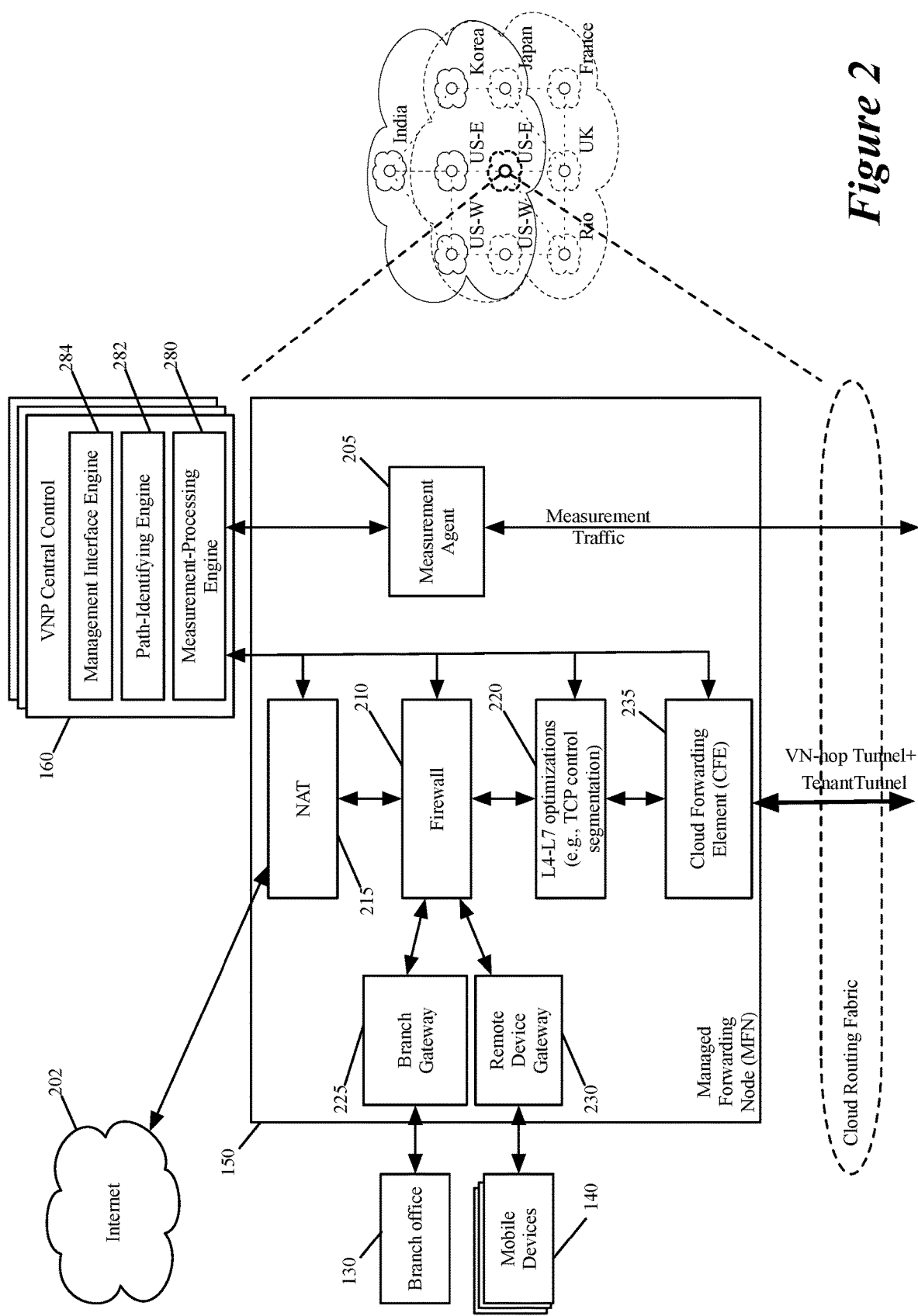
FIG. 2 illustrates an example of a managed forwarding node and a controller cluster of some embodiments of the invention.

To implement the virtual network 100, at least one managed forwarding node 150 in each public cloud datacenter 105a-105f and 110a-110d spanned by the virtual network has to be configured by the set of controllers. FIG. 2 illustrates an example of a managed forwarding node 150 and a controller cluster 160 of some embodiments of the invention. In some embodiments, each managed forwarding node 150 is a machine (e.g., a VM or container) that executes on a host computer in a public cloud datacenter. In other embodiments, each managed forwarding node 150 is implemented by multiple machines (e.g., multiple VMs or containers) that execute on the same host computer in one public cloud datacenter. In still other embodiments, two or more components of one MFN can be implemented by two or more machines executing on two or more host computers in one or more public cloud datacenters.

As shown, the managed forwarding node 150 includes a measurement agent 205, firewall and NAT middlebox service engines 210 and 215, one or more optimization engines 220, edge gateways 225 and 230, and a cloud forwarding element 235 (e.g., a cloud router). In some embodiments, each of these components 205-235 can be implemented as a cluster of two or more components.

The controller cluster 160 in some embodiments can dynamically scale up or down each component cluster (1) to add or remove machines (e.g., VMs or containers) to implement each component's functionality and/or (2) to add or remove compute and/or network resources to the previously deployed machines that implement that cluster's components. As such, each deployed MFN 150 in a public cloud datacenter can be viewed as a cluster of MFNs, or it can be viewed as a node that includes multiple different component clusters that perform different operations of the MFN.

Also, in some embodiments, the controller cluster deploys different sets of MFNs in the public cloud datacenters for different tenants for which the controller cluster defines virtual networks over the public cloud datacenters. In this approach, the virtual networks of any two tenants do not share any MFN. However, in the embodiments described below, each MFN can be used to implement different virtual networks for different tenants. One of ordinary skill will realize that in other embodiments the controller cluster 160 can implement the virtual network of each tenant of a first set of tenants with its own dedicated set of deployed MFNs, while implementing the virtual network of each tenant of a second set of tenants with a shared set of deployed MFNs.

In some embodiments, the branch gateway 225 and remote device gateway 230 establish secure VPN connections respectively with one or more branch offices 130 and remote devices (e.g., mobile devices 140) that connect to the MFN 150, as shown in FIG. 2. One example of such VPN connections are IPsec connections, which will be further described below. However, one of ordinary skill will realize that in other embodiments, such gateways 225 and/or 230 establish different types of VPN connections.

An MFN 150 in some embodiments includes one or more middlebox engines that perform one or more middlebox service operations, such are firewall operations, NAT operations, IPS operations, IDS operations, load balancing operations, WAN optimization operations, etc. By incorporating these middlebox operations (e.g., firewall operations, WAN optimization operations, etc.) in the MFNs that are deployed in the public cloud, the virtual network 100 implements in the public cloud much of the functions that are traditionally performed by the corporate WAN infrastructure at a corporation's datacenter(s) and/or branch office(s).

Accordingly, for many of the middlebox services, the corporate compute nodes (e.g., remote devices, branch offices and datacenters) no longer have to access the corporate WAN infrastructure of the corporation in a private datacenter or branch office, as much of these services are now deployed in the public clouds. This approach speeds up the access of the corporate compute nodes (e.g., remote devices, branch offices and datacenters) to these services, and avoids costly congested-network bottlenecks at private datacenters that would otherwise be dedicated to offering such services.

This approach effectively distributes the WAN gateway functionality to various MFNs in the public cloud datacenters. For instance, in the virtual network 100 of some embodiments, most or all of the traditional corporate WAN gateway security functions (e.g., firewall operations, intrusion detection operations, intrusion prevention operations, etc.) are moved to the public cloud MFNs (e.g., ingress MFNs at which data from compute endpoints is received into the virtual network). This effectively allows the virtual network 100 to have a distributed WAN gateway that is implemented at many different MFNs that implement the virtual network 100.

In the example illustrated in FIG. 2, the MFN 150 is shown to include the firewall engine 210, the NAT engine 215 and one or more L4-L7 optimization engines. One of ordinary skill will realize that in other embodiments, the MFN 150 includes other middlebox engines for performing other middlebox operations. In some embodiments, the firewall engine 210 enforces firewall rules on (1) data message flows on their ingress paths into the virtual network (e.g., on data message flows that the gateways 225 and 230 receives and process from branch offices 130 and mobile devices 140) and (2) data messages flows on their egress paths out of the virtual network (e.g., on data message flows that are sent to SaaS provider datacenters through the NAT engine 215 and the Internet 202).

The firewall engine 210 of the MFN 150 in some embodiments also enforces firewall rules when the firewall engine belongs to an MFN that is an intermediate hop between an ingress MFN at which a data message flow enters a virtual network and an egress MFN at which the data message flow exits the virtual network. In other embodiments, the firewall engine 210 only enforces firewall rules when it is part of a data message flow's ingress MFN and/or egress MFN.

In some embodiments, the NAT engine 215 performs a network address translation to change the source network addresses of data message flows on their egress paths out of the virtual network to third party devices (e.g., to SaaS provider machines) through the Internet 202. Such network address translations ensure that third-party machines (e.g., SaaS machines) can be properly configured to process the data message flows that without the address translations might specify private network addresses of the tenants and/or the public cloud providers. This is particularly problematic as private network addresses of different tenants and/or cloud providers might overlap. The address translation also ensures that the reply messages from the third party devices (e.g., the SaaS machines) can be properly received by the virtual network (e.g., by the MFN NAT engine from which the message exited the virtual network).

The NAT engines 215 of the MFNs in some embodiments perform double-NAT operations on each data message flow that leaves the virtual network to reach a third party machine, or that enters the virtual network from a third party machine. As further described in U.S. Public Patent Application 2019-0103990 A1 (incorporated herein by reference), one NAT operation in the two NAT operations is performed on such a data message flow at its ingress MFN when it enters the virtual network, while the other NAT operation is performed on the data message flow at its egress MFN when it exits the virtual network.

This double NAT approach allows more tenant private networks to be mapped to the networks of the public cloud providers. This approach also reduces the load for distributing to the MFNs data regarding changes to tenant private networks. Before the ingress or egress NAT operations, some embodiments perform a tenant mapping operation that uses the tenant identifier to first map the tenant's source network address to another source network address that is then mapped to yet another source network address by the NAT operation. Performing the double NAT operation reduces the data distribution load for distributing data regarding changes to the tenant private networks.

The optimization engine 220 executes novel processes that optimize the forwarding of the entity's data messages to their destinations for best end-to-end performance and reliability. Some of these processes implement proprietary high-performance networking protocols, free from the current network protocol ossification. For example, in some embodiments, the optimization engine 220 optimizes end-to-end TCP rates through intermediate TCP splitting and/or termination.

The cloud forwarding element 235 is the MFN engine that is responsible for forwarding a data message flow to the next hop MFN's cloud forwarding element (CFE) when the data message flow has to traverse to another public cloud to reach its destination, or to an egress router in the same public cloud when the data message flow can reach its destination through the same public cloud. In some embodiments, the CFE 235 of the MFN 150 is a software router.

To forward the data messages, the CFE encapsulates the messages with tunnel headers. Different embodiments use different approaches to encapsulate the data messages with tunnel headers. Some embodiments described below use one tunnel header to identify network ingress/egress addresses for entering and exiting the virtual network, and use another tunnel header to identify next hop MFNs when a data message has to traverse one or more intermediate MFN to reach the egress MFN.

Specifically, in some embodiments, the CFE sends the data message with two tunnel headers (1) an inner header that identifies an ingress CFE and egress CFE for entering and exiting the virtual network, and (2) an outer header that identifies the next hop CFE. The inner tunnel header in some embodiments also includes a tenant identifier (TID) in order to allow multiple different tenants of the virtual network provider to use a common set of MFN CFEs of the virtual network provider. Other embodiments define tunnel headers differently in order to define the overlay virtual network.

To deploy a virtual network for a tenant over one or more public clouds, the controller cluster (1) identifies possible ingress and egress routers for entering and exiting the virtual network for the tenant based on locations of the tenant's corporate compute nodes (e.g., branch offices, datacenters, mobile users and SaaS providers), and (2) identifies routes that traverse from the identified ingress routers to the identified egress routers through other intermediate public-cloud routers that implement the virtual network. After identifying these routes, the controller cluster propagates these routes to the forwarding tables of the MFN CFEs 235 in the public cloud(s). In the embodiments that use OVS-based virtual network routers, the controller distributes the routes by using OpenFlow.

In some embodiments, the controller cluster 160 can also configure the components 205-235 of each MFN 150 that implements the virtual network to optimize several network processing layers in order to achieve best end-to-end performance, reliability and security. For example, in some embodiments, these components are configured (1) to optimize layer3 traffic routing (e.g., shortest path, packet duplication), (2) to optimize layer 4 TCP congestion control (e.g., segmentation, rate control), (3) to implement security features (e.g., encryption, deep packet inspection, firewall), and (4) to implement application-layer compression features (e.g., de-duplication, caching). Within the virtual network, corporate traffic is secured, inspected and logged.

In some embodiments, one measurement agent is deployed for each MFN in a public cloud datacenter. In other embodiments, multiple MFNs in a public cloud datacenter or in a collection of datacenters (e.g., in a collection of nearby, associated datacenters, such as datacenters in one availability zone) share one measurement agent. To optimize the layers 3 and 4 processing, the measurement agent 205 associated with each managed forwarding node 150 repeatedly generates measurement values that quantify the quality of the network connection between its node and each of several other "neighboring" nodes.

Different embodiments define neighboring nodes differently. For a particular MFN in one public cloud datacenter of a particular public cloud provider, a neighboring node in some embodiments includes (1) any other MFN that operates in any public cloud datacenter of the particular public cloud provider, and (2) any other MFN that operates in another public cloud provider's datacenter that is within the same "region" as the particular MFN.

Different embodiments define the same region differently. For instance, some embodiments define a region in terms of a distance that specifies a bounding shape around the particular managed forwarding node. Other embodiments define regions in terms of cities, states, or regional areas, such as northern California, southern California, etc. The assumption of this approach is that different datacenters of the same public cloud provider are connected with very high-speed network connections, while the network connections between the datacenters of different public cloud providers are likely fast when the datacenters are within the same region but likely not as fast when the datacenters are in different regions. The connection between the datacenters of different public cloud providers might have to traverse long distances through the public Internet when the datacenters are in different regions.

The measurement agent 205 generates measurement values differently in different embodiments. In some embodiments, the measurement agent sends pinging messages (e.g., UDP echo messages) periodically (e.g., once every second, every N seconds, every minute, every M minutes, etc.) to each of the measurement agents of its neighboring managed forwarding nodes. Given the small size of the pinging messages, they do not result in large network connection charges. For instance, for 100 nodes with each node sending a ping to each other node every 10 seconds, about 10 Kb/s of ingress and egress measurement traffic is generated for each node, and this leads to network consumption charges of a few dollars (e.g., $5) per node per year, given the current public cloud prices.

Based on the speed of the reply messages that it receives, the measurement agent 205 computes and updates measurement metric values, such as network-connection throughput speed, delay, loss, and link reliability. By repeatedly doing these operations, the measurement agent 205 defines and updates a matrix of measurement results that expresses the quality of network connections to its neighboring nodes. As the agent 205 interacts with the measurement agents of its neighboring nodes, its measurement matrix only quantifies the quality of the connections to its local clique of nodes.

The measurement agents of the different managed forwarding nodes send their measurement matrices to the controller cluster 160, which then aggregates all different clique connection data to obtain an aggregate mesh view of the connections between different pairs of managed forwarding nodes. When the controller cluster 160 collects different measurements for a link between two pairs of forwarding nodes (e.g., measurements taken by one node at different times), the controller cluster produces a blended value from the different measurements (e.g., produces an average or a weighted average of the measurements). The aggregate mesh view in some embodiments is a full mesh view of all the network connections between each pair of managed forwarding nodes, while in other embodiments it is a more complete view than the one produced by the measurement agents of the individual managed forwarding nodes.

As shown in FIG. 2, the controller cluster 160 includes a cluster of one or more measurement-processing engines 280, one or more path-identifying engines 282, and one or more management interfaces 284. In order not to obscure the description with unnecessary detail, each of these clusters will be referred to below in terms of singular engine or interface layers, i.e., in terms of a measurement-processing layer 280, a path-identifying layer 282, and a management interface layer 284.

The measurement-processing layer 280 receives the measurement matrices from the measurement agents 205 of the managed forwarding nodes and processes these measurements matrices to produce the aggregate mesh matrix that expresses the connection quality between different pairs of managed forwarding nodes. The measurement-processing layer 280 provides the aggregate mesh matrix to the path-identifying layer 282. Based on the aggregate mesh matrix, the path-identifying layer 282 identifies different desired routing paths through the virtual network for connecting different corporate data endpoints (e.g., different branch offices, corporate datacenters, SaaS provider datacenters and/or remote devices). This layer 282 then provides these routing paths in route tables that are distributed to the cloud forwarding elements 235 of the managed forwarding nodes 150.

In some embodiments, the identified routing path for each pair of data message endpoints is a routing path that is deemed optimal based on a set of optimization criteria, e.g., it is the fastest routing path, the shortest routing path, or the path that least uses the Internet. In other embodiments, the path-identifying engine can identify and provide (in the routing table) multiple different routing paths between the same two endpoints. In these embodiments, the cloud forwarding elements 235 of the managed forwarding nodes 150 then select one of the paths based on QoS criteria or other runtime criteria that they are enforcing. Each CFE 235 in some embodiments does not receive the entire routing path from the CFE to the egress point of the virtual network, but rather receives the next hop for the path.

Figure 3:
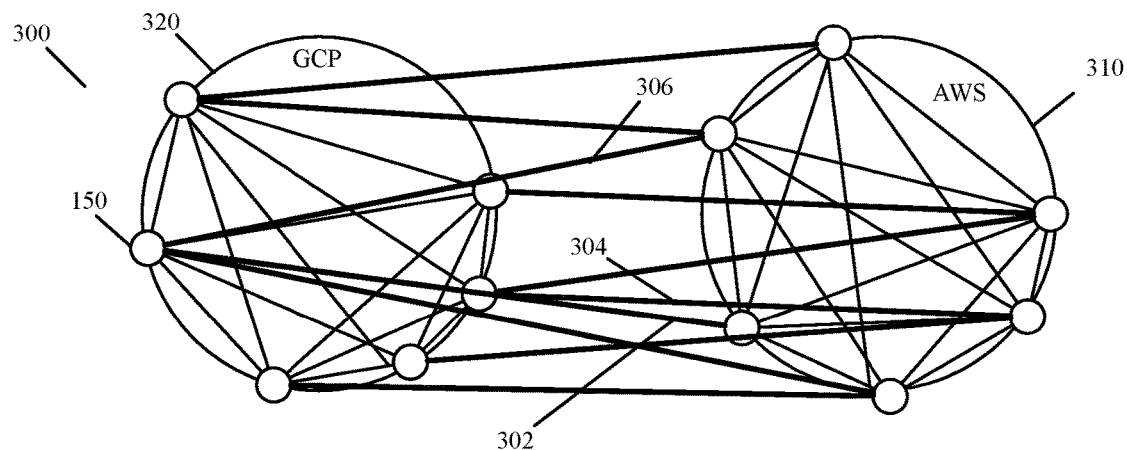
FIG. 3 illustrates an example of a measurement graph that the controller measurement-processing layer produces in some embodiments.
Figure 4A:
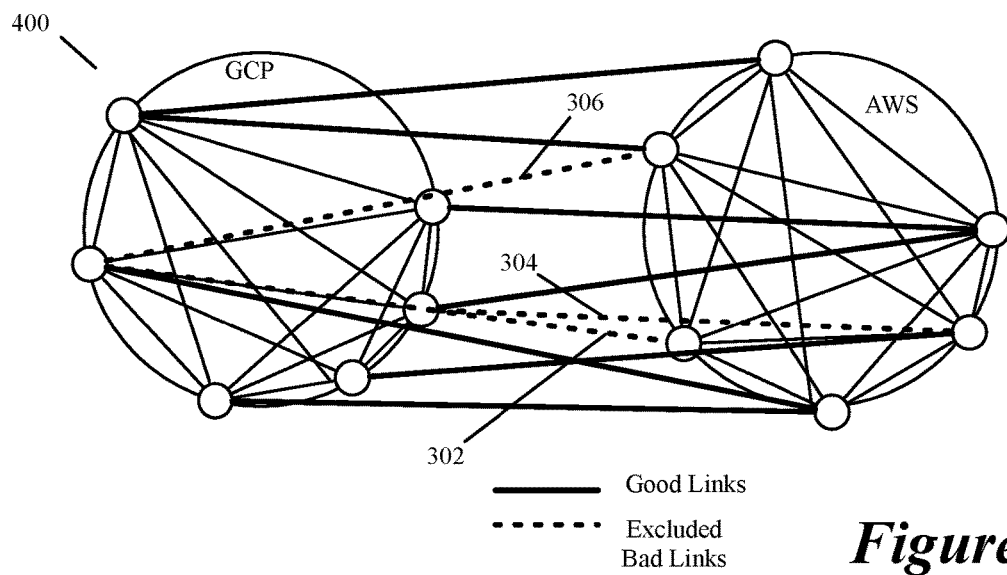
FIG. 4A illustrates an example of a routing graph that the controller path-identifying layer produces in some embodiments from the measurement graph.

In some embodiments, the path-identifying layer 282 uses the measurement values in the aggregate mesh matrix as inputs to routing algorithms that it executes to construct a global routing graph. This global routing graph is an aggregated and optimized version of a measurement graph that the measurement-processing layer 280 produces in some embodiments. FIG. 3 illustrates an example of a measurement graph 300 that the controller measurement-processing layer 280 produces in some embodiments. This graph depicts network connections between various managed forwarding nodes 150 in AWS and GCP public clouds 310 and 320 (i.e., in the datacenters of AWS and GCP). FIG. 4A illustrates an example of a routing graph 400 that the controller path-identifying layer 282 produces in some embodiments from the measurement graph 300.

Figure 5:
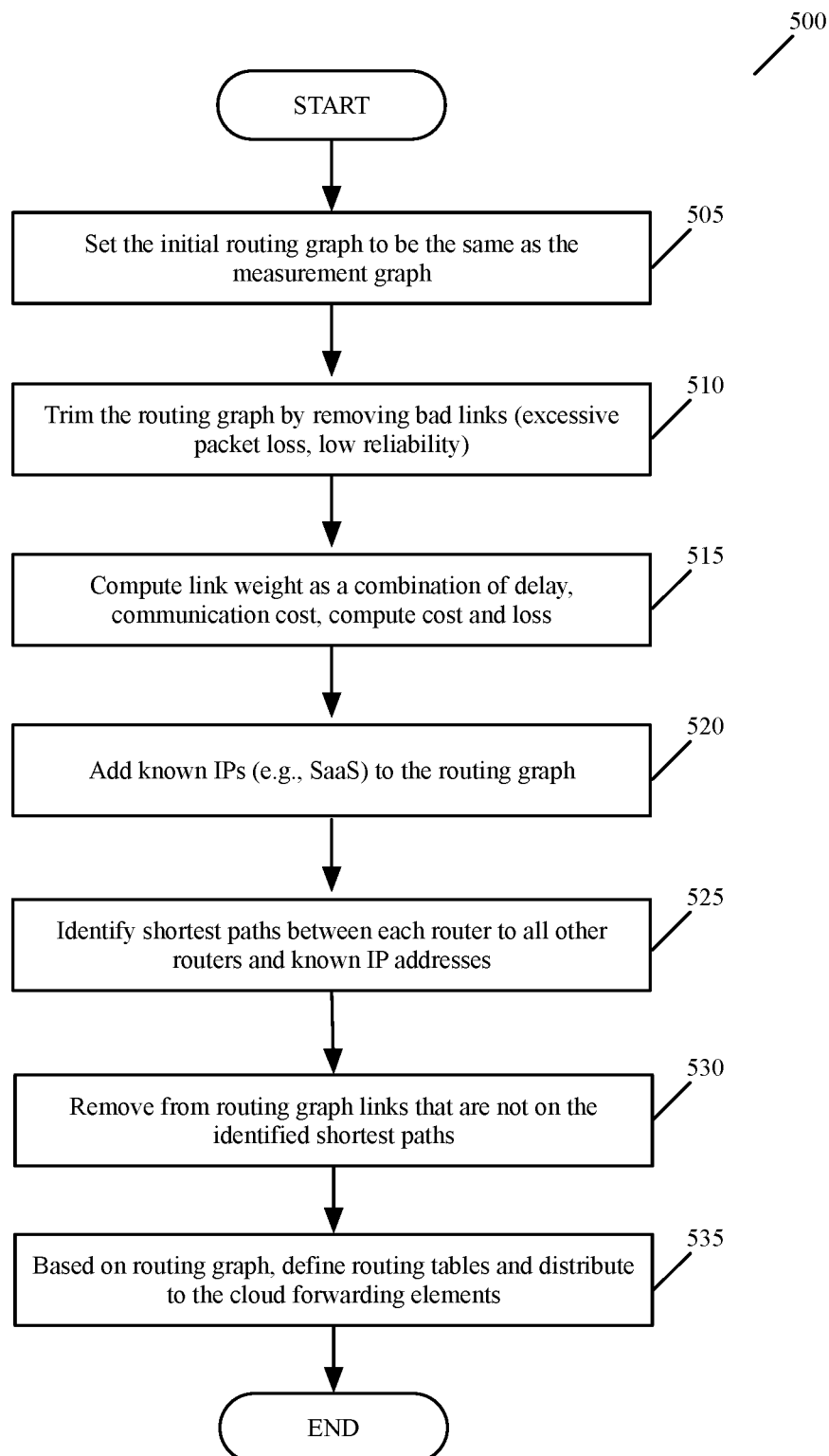
FIG. 5 illustrates a process that the controller path-identifying layer uses to generate a routing graph from a measurement graph received from the controller measurement layer.

FIG. 5 illustrates a process 500 that the controller path-identifying layer uses to generate a routing graph from a measurement graph received from the controller measurement layer. The path-identifying layer 282 performs this process 500 repeatedly as it repeatedly receives updated measurement graphs from the controller measurement layer (e.g., performs the process 500 each time that it receives a new measurement graph, or each $N^{th}$ time that it receives a new measurement graph). In other embodiments, the path-identifying layer 282 performs this process periodically (e.g., once every 12 hours or 24 hours).

As shown, the path-identifying layer initially defines (at 505) the routing graph to be identical to the measurement graph (i.e., to have the same links between the same pairs of managed forwarding nodes). At 510, the process removes bad links from the measurement graph 300. Examples of bad links are links with excessive message loss or poor reliability (e.g., links with greater than 2% message loss in last 15 minutes, or with message loss greater than 10% in the last 2 minute). FIG. 4A illustrates that links 302, 304 and 306 in the measurement graph 300 are excluded in the routing graph 400. This figure illustrates the exclusion of these links by depicting these links with dashed lines.

Next, at 515, the process 500 computes a link weight score (cost score) as a weighted combination of several computed and provider-specific values. In some embodiments, the weight score is a weighted combination of the link's (1) computed delay value, (2) computed loss value, (3) provider network-connection cost, and (4) provider compute cost. In some embodiments, the provider compute cost is accounted for as the managed forwarding nodes connected by the link are machines (e.g., VMs or containers) that execute on host computers in the public cloud datacenter(s).

Figure 4B:
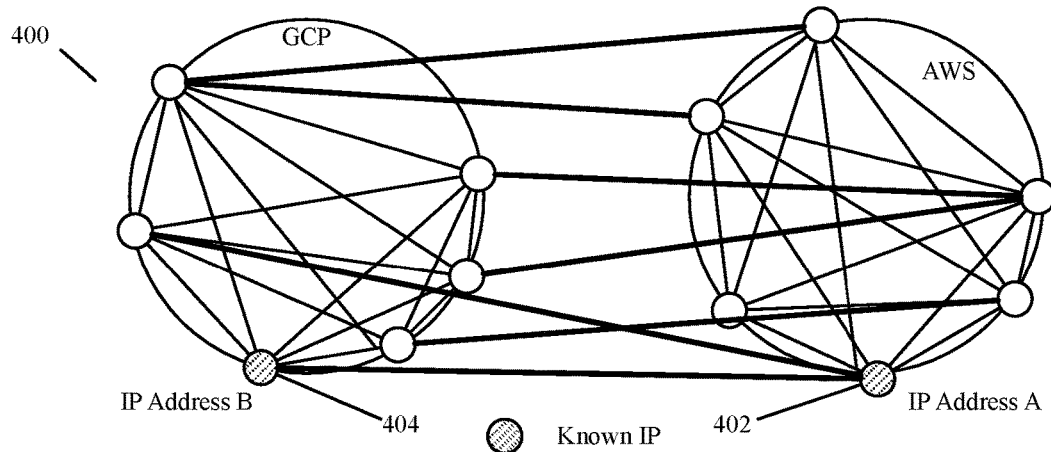
FIG. 4B illustrates an example of adding known IPs for two SaaS providers to the two nodes in the routing graph that are in datacenters that are closest to the datacenters of these SaaS providers.

At 520, the process adds to the routing graph the known source and destination IP addresses (e.g., known IPs of SaaS providers used by the corporate entity) for the data message flows in the virtual network. In some embodiments, the process adds each known IP address of a possible message-flow endpoint to the node (e.g., to the node representing an MFN) in the routing graph that is closest to that end point. In doing so, the process in some embodiments assumes that each such endpoint is connected to the virtual network through a link with a zero delay cost and a zero loss cost. FIG. 4B illustrates an example of adding known IPs for two SaaS providers to the two nodes 402 and 404 (representing two MFNs) in the routing graph that are in datacenters that are closest to the datacenters of these SaaS providers. In this example, one node is in an AWS public cloud, while the other node is in the GCP public cloud.

Alternatively, or conjunctively, the process 500 in some embodiments adds the known source and destination IP addresses to the routing graph by adding nodes to this graph to represent the source and destination endpoints, assigning IP addresses to these nodes, and assigning weight values to the links that connect these added nodes to other nodes in the routing graph (e.g., to nodes in the routing graph that represent MFNs in the public clouds). When the source and destination endpoints for the flows are added as nodes, the path-identifying engine 282 can account for cost (e.g., distance cost, delay cost, and/or financial cost, etc.) of reaching these nodes when it is identifying different routes through the virtual network between different source and destination endpoints.

Figure 4C:
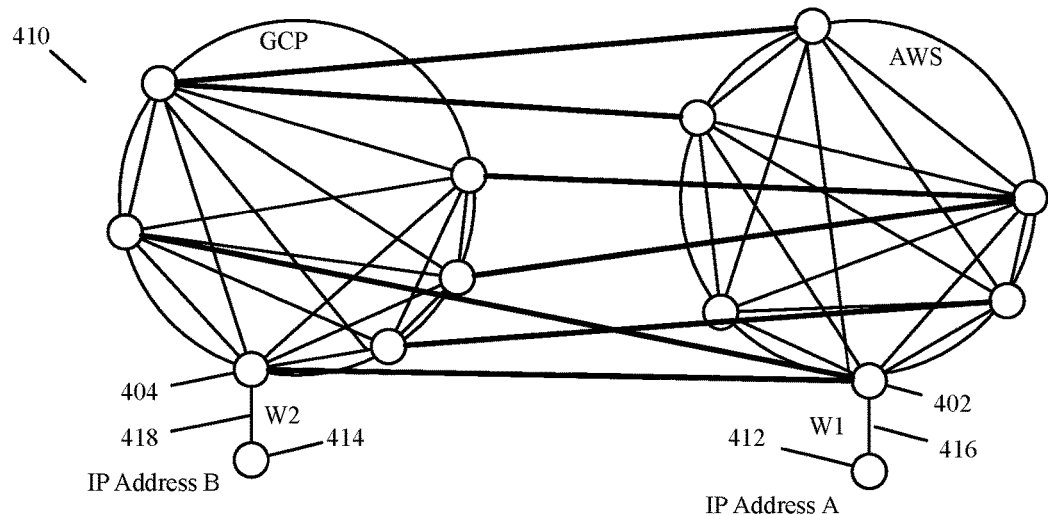
FIG. 4C illustrates a routing graph that is generated by adding two nodes to represent two SaaS providers.

FIG. 4C illustrates a routing graph 410 that is generated by adding two nodes 412 and 414 to the node graph 400 of FIG. 4A in order to represent two SaaS providers. In this example, the known IP addresses are assigned to nodes 412 and 414, and these nodes are connected to nodes 402 and 404 (representing two MFNs) through links 416 and 418 that have weights W1 and W2 assigned to them. This approach is an alternative approach for adding the known IP addresses of the two SaaS providers to the approach illustrated in FIG. 4B.

Figure 4D:
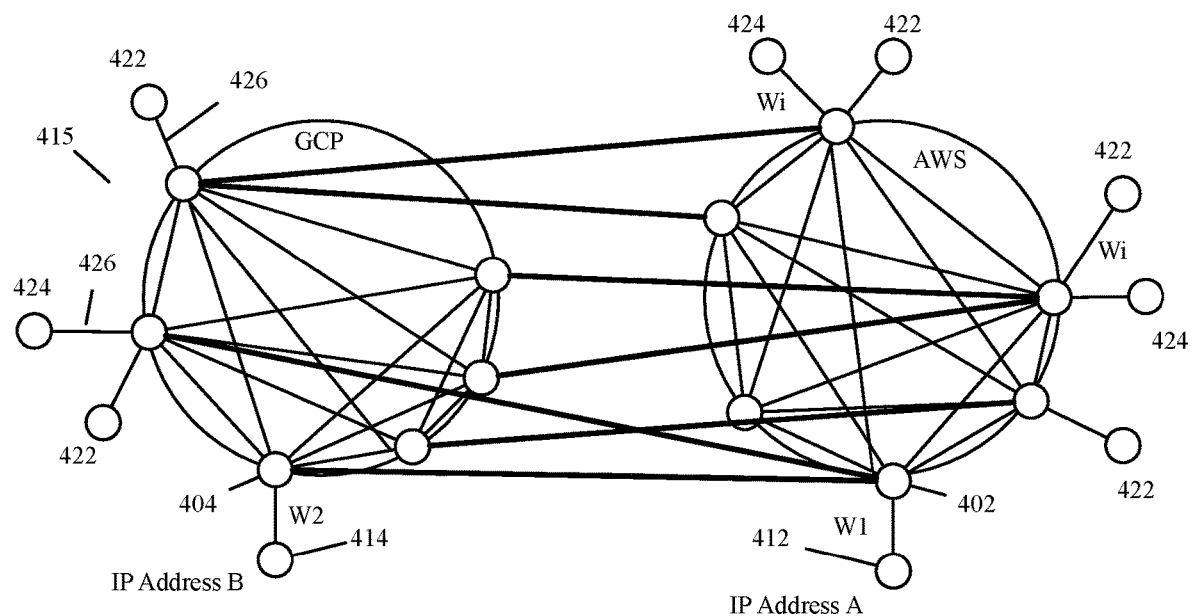
FIG. 4D illustrates a routing graph with additional nodes added to represent branch offices and datacenters with known IP addresses that connect respectively to two public clouds.

FIG. 4D illustrates a more detailed routing graph 415. In this more detailed routing graph, additional nodes 422 and 424 are added to represent external corporate compute nodes (e.g., branch offices and datacenters) with known IP addresses that connect respectively to the AWS and GCP public clouds 310 and 320. Each of these nodes 422/424 is connected by at least one link 426 with an associated weight value Wi to at least one of the routing graph nodes that represents an MFN. Some of these nodes (e.g., some of the branch offices) are connected with multiple links to same MFN or to different MFNs.

Next, at 525, the process 500 compute the lowest cost paths (e.g., shortest paths, etc.) between each MFN and each other MFN that can serve as a virtual network egress location for a data message flow of the corporate entity. The egress MFNs in some embodiments include the MFNs connected to external corporate compute nodes (e.g., branch offices, corporate datacenters, and SaaS provider datacenters) as well as MFNs that are candidate locations for mobile device connections and egress Internet connections. In some embodiments, this computation uses a traditional lowest-cost (e.g., shortest-path) identification process that identifies the shortest paths between different MFN pairs.

For each candidate MFN pair, the lowest-cost identification process uses the computed weight scores (i.e., the scores computed at 510) to identify a path with the lowest score when multiple such paths exist between the MFN pair. Several manners for computing lowest-cost paths will be further described below. As mentioned above, the path-identifying layer 282 identifies multiples paths between two MFN pairs in some embodiments. This is to allow the cloud forwarding elements 235 to use different paths under different circumstances. Accordingly, in these embodiments, the process 500 can identify multiple paths between two MFN pairs.

At 530, the process removes from the routing graph the links between MFN pairs that are not used by any of the lowest-cost paths identified at 525. Next, at 535, the process generates the routing tables for the cloud forwarding elements 235 from the routing graph. At 535, the process distributes these routing tables to the cloud forwarding elements 235 of the managed forwarding nodes. After 535, the process ends.

In some embodiments, the virtual network has two types of external connections, which are: (1) external secure connections with the compute nodes (e.g., branch offices, datacenters, mobile users, etc.) of an entity, and (2) external connections to third party computers (e.g., SaaS provider servers) through the Internet. Some embodiments optimize the virtual network by finding optimal virtual-network ingress and egress locations for each datapath that terminates at source and destination nodes outside of the virtual network. For instance, to connect a branch office to a SaaS provider server (e.g., salesforce.com server), some embodiments connect the branch office to an optimal edge MFN (e.g., the MFN that has the fastest network connection to the branch office or the one that is closest to the branch office), and identify an optimal edge MFN to an optimally located SaaS provider server (e.g., the SaaS that is closest to the edge MFN for the branch office or has the fastest path to the edge MFN for the branch office through the edge MFN connected to the SaaS provider server).

To associate each compute node (e.g., a branch office, a mobile user, etc.) of an entity to the closest MFN through a VPN connection, the virtual network provider in some embodiments deploys one or more authoritative domain name servers (DNS) in the public clouds for the compute nodes to contact. In some embodiments, each time a corporate compute node in some embodiments needs to establish a VPN connection (i.e., to initialize or re-initialize the VPN connection) to an MFN of the virtual network provider, the compute node first resolves an address associated with its virtual network (e.g., virtualnetworkX.net) with this authoritative DNS server in order to obtain from this server the identity of the MFN that this server identifies as the MFN that is closest to the corporate compute node. To identify this MFN, the authoritative DNS server provides an MFN identifier (e.g., the IP address of the MFN) in some embodiments. The corporate compute node then establishes a VPN connection to this managed forwarding node.

In other embodiments, the corporate compute node does not first perform a DNS resolution (i.e., does not first resolve a network address for a particular domain) each time that it needs to establish a VPN connection to an MFN of the VNP. For instance, in some embodiments, the corporate compute node sticks with a DNS-resolved MFN for a particular duration (e.g., for a day, a week, etc.) before performing another DNS resolution to determine whether this MFN is still an optimal one to which is should connect.

When the source IP address in the DNS request is that of the local DNS server of the corporate compute node, and not of the node itself, the authoritative DNS server in some embodiments identifies the MFN closest to the local DNS server instead of the MFN closest to the corporate compute node. To address this, the DNS request in some embodiments identifies the corporate compute node in terms of a domain name that includes one or more parts (labels) that are concatenated and delimited by dots, where one of these parts identifies the corporation and the other part identifies the compute node of the corporation.

In some embodiments, this domain name specifies a hierarchy of domains and sub-domains that descends from the right label to the left label in the domain name. The right-most first label identifies the particular domain, a second label to the left of the first label identifies the corporate entity, and a third label to the left of the second label identifies the external machine location of the entity in cases where the entity has more than one external machine location. For instance, in some embodiments, the DNS request identifies the corporate compute node as myNode of company myCompany, and asks for the resolution of the address myNode.myCompany.virtualnetwork.net. The DNS server then uses the myNode identifier to better select the ingress MFN to which the corporate compute node should establish a VPN connection. In different embodiments, the myNode identifier is expressed differently. For example, it may be addressed as an IP address, a latitude/longitude description of a location, a GPS (Global Positioning System) location, a street address, etc.

Even when the IP address properly reflects the location, there may be several potential ingress routers, e.g., belonging to different datacenters in the same cloud or to different clouds in the same region. In such a case, the virtual network authoritative server in some embodiments sends back a list of IPs of potential MFN CFEs (e.g., C5, C8, C12). The corporate compute node in some embodiments then pings the different CFEs in the list, to produce measurements (e.g., distance or speed measurements), and selects the closest one by comparing measurements among the set of CFE candidates.

In addition, the corporate compute node may base this selection by identifying the MFNs currently used by the other compute nodes of the corporate entity. For example, in some embodiments, the corporate compute node adds connection costs to each MFN, so that if many of the corporate branches are already connected to a given cloud, new compute nodes would have an incentive to connect to the same cloud, thus minimizing inter-cloud costs in terms of processing, latency, and dollars.

Other embodiments use other DNS resolution techniques. For instance, each time a corporate compute node (e.g., a branch office, datacenter, a mobile user, etc.) needs to perform a DNS resolution, the corporate compute node (e.g., the mobile device or a local DNS resolver at a branch office or datacenter) communicates with a DNS service provider that serves as an authoritative DNS resolver for a number of entities. In some embodiments, this DNS service provider has DNS resolving machines located in one or more private datacenters, while in other embodiments it is part of one or more public cloud datacenters.

To identify which of N managed forwarding nodes that connect directly to the Internet should be used to reach a SaaS provider server, the virtual network (e.g., the ingress MFN or the controller cluster that configures the MFNs) in some embodiments identifies a set of one or more candidate edge MFNs from the N managed forwarding nodes. As described further below, each candidate edge MFN in some embodiments is an edge MFN that is deemed to be optimal based on a set of criteria, such as distance to SaaS provider server, network connection speed, cost, delay and/or loss, network compute cost, etc.

To assist in identifying the optimal edge points, the controller cluster of some embodiments maintains for an entity a list of the most popular SaaS providers and consumer web destinations and their IP address subnets. For each such destination, the controller cluster assigns one or more of the optimal MFNs (again as judged by physical distance, network connection speed, cost, loss and/or delay, compute cost, etc.) as candidate egress nodes. For each candidate egress MFN, the controller cluster then computes the best route from each possible ingress MFN to the candidate MFN, and sets up the resulting next-hop table in the MFNs accordingly, such that the Internet SaaS provider or web destination is associated to the correct virtual network next-hop node.

Given that the service destination can often be reached through several IP subnets at several locations (as provided by the authoritative DNS server), there are several potential egress nodes to minimize latency and provide load-balancing. Accordingly, in some embodiments, the controller cluster computes the best location and egress node for each MFN, and updates the next-hop accordingly. Also, the best egress node to get to a SaaS provider (e.g., office365.com) may be through one public cloud provider (e.g., Microsoft Azure), but the best ingress MFN from purely a distance or connection speed may be in another public cloud provider (e.g., AWS). In such situations, it may not be optimal in terms of latency, processing and cost to traverse to another cloud (i.e., to the public cloud with the best egress MFN) before leaving the virtual network. Providing multiple candidate edge nodes would allow for the selection of an optimal edge MFN and an optimal path to the selected edge MFN in such situations.

To identify the optimal path through the virtual network to an egress MFN that connects to the Internet or connects to a corporate compute node of the corporate entity, the controller cluster identifies optimal routing paths between the MFNs. As mentioned above, the controller cluster in some embodiments identifies the best path between any two MFNs by first costing each link between a pair of directly connected MFNs, e.g., based on a metric score that reflects the weighted sum of estimated latency and financial costs. The latency and financial costs include in some embodiments (1) link delay measurements, (2) estimated message processing latency, (3) cloud charges for outgoing traffic from a particular datacenter either to another datacenter of the same public cloud provider, or to exit the public cloud (PC) provider's cloud (e.g., to another public cloud datacenter of another public cloud provider or to the Internet), and (4) estimated message processing costs associated with the MFNs executing on host computers in the public clouds.

Using the computed costs of these pair-wise links, the controller cluster can compute the cost of each routing path that uses one or more of these pair-wise links by aggregating the costs of the individual pair-wise links that are used by the routing path. As described above, the controller cluster then defines its routing graph based on the computed costs of the routing paths, and generates the forwarding tables of the cloud routers of the MFNs based on the defined routing graphs. Also, as mentioned above, the controller cluster repeatedly performs these costing, graph-building, and forwarding table update and distribution operations periodically (e.g., once every 12 hours, 24 hours, etc.) or as it receives measurement updates from the measurement agents of the MFNs.

Whenever the forwarding table at an MFN CFE $C_i$ points to a next-hop MFN CFE the CFE $C_j$ considers $C_i$ as a neighbor. In some embodiments, the CFE $C_i$ establishes a secure, actively maintained VPN tunnel to CFE $C_j$. A secure tunnel in some embodiments is a tunnel that requires the payloads of the encapsulated data messages to be encrypted. Also, in some embodiments, a tunnel is actively maintained by one or both endpoints of the tunnel sending keep alive signals to the other endpoint.

In other embodiments, the CFEs do not establish secure, actively maintained VPN tunnels. For instance, in some embodiments, the tunnels between the CFEs are static tunnels that are not actively monitored through the transmission of keep-alive signals. Also, in some embodiments, these tunnels between the CFEs do not encrypt their payloads. In some embodiments, the tunnels between pair of CFEs include two encapsulating headers, with the inner header identifying the tenant ID and the ingress and egress CFEs for a data message entering and exiting the virtual network (i.e., entering and exiting the public cloud(s)), and the outer encapsulating header specifying the source and destination network addresses (e.g., IP addresses) for traversing through zero or more CFE from the ingress CFE to the egress CFE.

In addition to internal tunnels, the virtual network in some embodiments connects corporate compute nodes to their edge MFNs using VPN tunnels, as mentioned above. Therefore, in the embodiments where secure tunnels are used to connect the CFEs, the data messages transit through virtual network using an entirely secure VPN path.

As the virtual network data messages are forwarded using encapsulation within the virtual network, the virtual network in some embodiments uses its own unique network addresses that are different than the private addresses used by the different private networks of the tenant. In other embodiments, the virtual network uses the private and public network address spaces of the public clouds over which it is defined. In yet other embodiments, the virtual network uses some of its own unique network addresses for some of its components (e.g., some of its MFNs, CFEs, and/or services), while using the private and public network address spaces of the public clouds for other of its components.

Also, in some embodiments, the virtual network uses a clean-slate communication platform with its own proprietary protocols. In the embodiments in which the data messages are forwarded entirely through software MFN routers (e.g., through software CFEs), the virtual network can provide an optimized rate control for long-haul end-to-end connections. This is accomplished in some embodiments by operating a TCP optimization proxy engine 220 at every MFN 150. In other embodiments that do not break the TCP itself (e.g., with HTTPS), this is accomplished by the proxy engine 220 segmenting the rate control using intermediate per-flow buffering together with TCP receiver-window and ACK manipulation.

Due to its clean-slate nature, the virtual network in some embodiments optimizes many of its components to provide an even better service. For instance, in some embodiments, the virtual network uses multiple-path routing to support premium bandwidth-guaranteed VPN setups that are routed across the virtual network. In some embodiments, such VPNs include state data in each MFN similar to ATM/MPLS routing, and their establishment and removal is centrally controlled. Some embodiments identify the available bandwidth per outgoing link, either by measuring it directly (through packet pair or a similar process) or by having a given capacity for the link and reducing from this capacity the traffic that is already sent through this link.

Some embodiments use the residual bandwidth of a link as a constraint. For instance, when a link does not have at least 2 Mbps of available bandwidth, the controller cluster of some embodiments removes the link from the set of links that are used to compute lowest-cost path (e.g., shortest path) to any destination (e.g., remove the link from the routing graph, such as graph 400). If an end-to-end route is still available after the removal of this link, new VPNs will be routed across this new route. VPN removal can bring back available capacity to a given link, which in turn can enable this link to be included in the lowest-cost path (e.g., shortest path) calculation. Some embodiments use other options for multiple-path routing such as load balancing of traffic across multiple paths, e.g., using MPTCP (multi-path TCP).

Some embodiments provide a better service for premium customers by exploiting the path parallelism and the inexpensive cloud links to duplicate traffic from the ingress MFNs to the egress MFN, through two disjoint paths (e.g., maximally disjoint paths) within the virtual network. Under this approach, the earliest message that arrives is accepted, and the later one discarded. This approach increases the virtual network reliability and reduces the delay, at the cost of increasing the egress processing complexity. In some such embodiments, Forward Error Correction (FEC) techniques are used to increase reliability while reducing the duplication traffic. Due to its clean-slate nature, the virtual network of some embodiments performs other upper-layer optimizations, such as application-layer optimizations (e.g., de-duplication and caching operations) and security optimizations (e.g., the addition of encryption, DPI (deep packet inspection) and firewalling).

The virtual network of some embodiments accounts for collaboration with cloud providers, to further improve the virtual network setup by using anycast messaging. For instance, in some embodiments when all MFNs obtain the same external IP address, it is easier to connect any new corporate compute node to an optimal edge node (e.g., the closest edge node) using an anycast connection. Likewise, any SaaS provider can obtain this IP address and connect to the optimal MFN (e.g., closest MFN).

Figure 6:
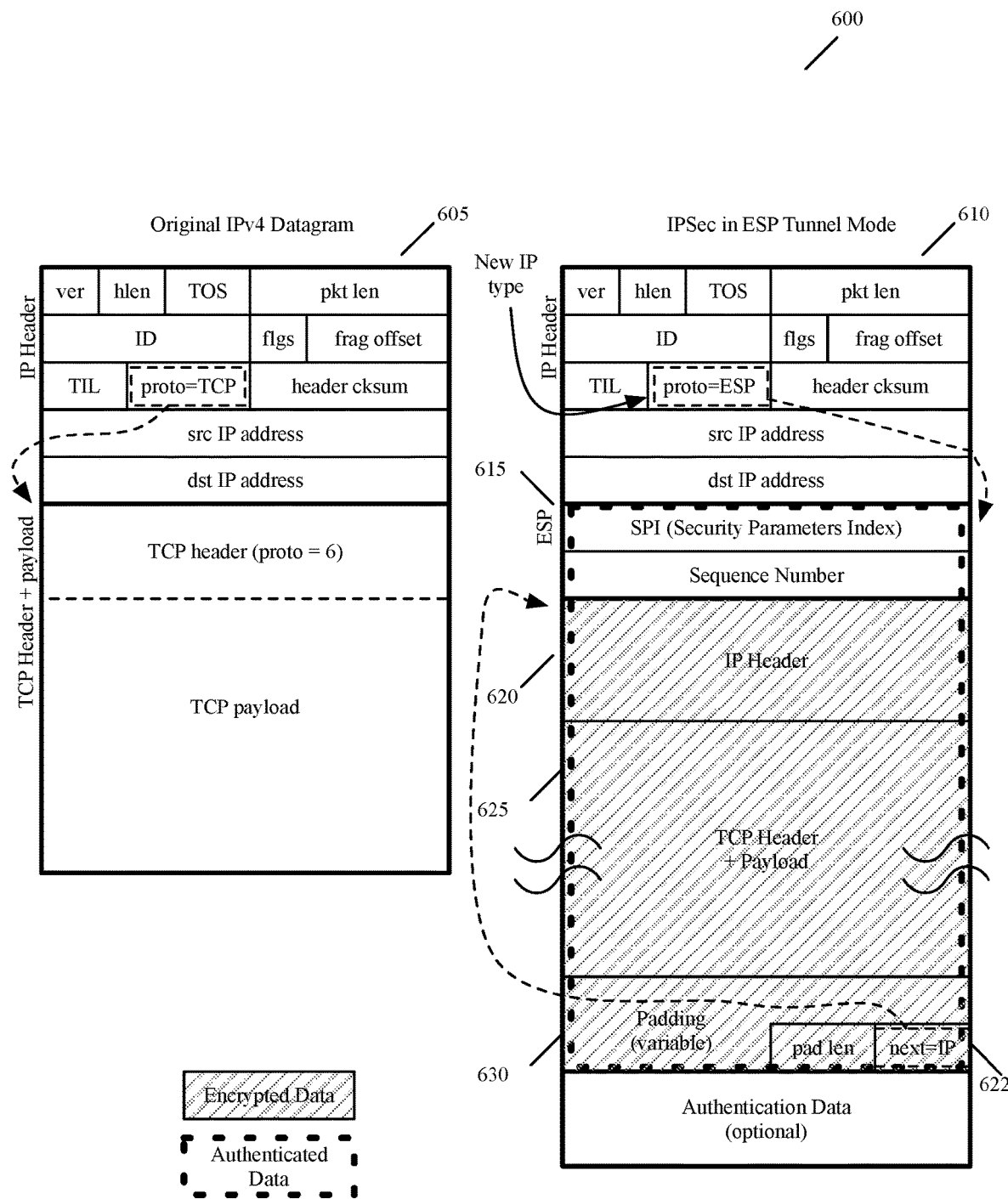
FIG. 6 illustrates the IPsec data message format of some embodiments.

As mentioned above, different embodiments use different types of VPN connections to connect corporate compute nodes (e.g., branches and mobile devices) to the MFNs that establish the virtual network of a corporate entity. Some embodiments use IPsec to set up these VPN connections. FIG. 6 illustrates the IPsec data message format of some embodiments. Specifically, this figure illustrates an original format of a data message 605 generated by a machine at the corporate compute node, and an IPsec encapsulated data message 610 after the data message 605 has been encapsulated (e.g., at the corporate compute node or the MFN) for transmission through an IPsec tunnel (e.g., to the MFN or to the corporate compute node).

In this example, the IPsec tunnel is set up with ESP Tunnel Mode, port 50. As shown, this mode is set up in this example by replacing the TCP protocol identifier in the IP header with an ESP protocol identifier. The ESP header identifies the start of the message 615 (i.e., the header 620 and payload 625). The message 615 has to be authenticated by the recipient of the IPsec encapsulated data message (e.g., by the IPsec gateway of the MFN). The start of the payload 625 is identified by the value of the next field 622 of the message 615. Also, the payload 625 is encrypted. This payload includes the IP header, the TCP header and payload of the original data message 605, as well as a padding field 630, which includes the next field 622.

In some embodiments, each MFN IPsec gateway can handle multiple IPsec connections for the same or different virtual network tenants (e.g., for the same corporation or for different corporations). Accordingly, an MFN IPsec gateway (e.g., gateway 230) in some embodiments identifies each IPsec connection in terms of a tunnel ID, a tenant ID (TID), and a corporate compute node subnet. In some embodiments, different corporate nodes (e.g., different branch offices) of a tenant do not have overlapping IP subnets (per RFC 1579). The IPsec gateway in some embodiments has a table mapping each IPsec tunnel ID (which is contained in the IPsec tunnel header) to a tenant ID. For a given tenant that an IPsec gateway is configured to handle, the IPsec gateway also has a mapping of all subnets of that tenant that connect to the virtual network established by the MFNs and their cloud forwarding elements.

When an ingress first MFN in a first public cloud datacenter receives through an IPsec tunnel a data message associated with a tenant ID and destined to a destination (e.g., a branch or datacenter subnet, or a SaaS provider) that connects to an egress second MFN in a second public cloud datacenter, the IPsec gateway of the first MFN removes the IPsec tunnel header. In some embodiments, the CFE of the first MFN then encapsulates the message with two encapsulating headers that allow the message to traverse a path from the ingress first MFN to the egress second MFN, directly or through one or more other intermediate MFNs. The CFE of the first MFN identifies this path by using its controller-configured routing table.

As mentioned above, the two encapsulating headers in some embodiments include (1) an outer header that specifies the next hop MFN CFE to allow the encapsulated data message to traverse through the MFNs of the virtual network to reach the egress MFN CFE, and (2) an inner header that specifies the tenant ID and the ingress and egress MFN CFEs that identify the MFNs for the data message entering and exiting the virtual network.

Specifically, in some embodiments, the inner encapsulating header includes a valid IP header with the destination IP address of the egress second MFN's CFE and the source IP address of the ingress first MFN's CFE. This approach allows standard IP router software to be used in every CFE of the MFNs. The encapsulation further includes the tenant ID (e.g., a customer CID). When a message arrives at the egress second MFN's CFE, it is decapsulated and sent by the second MFN to its destination (e.g., sent by the second MFN's IPsec gateway to the destination via another IPsec tunnel that is associated with the tenant ID and the destination subnet of the message).

Certain cloud providers prohibit machines from "spoofing" source IP, and/or impose other restrictions for TCP and UDP traffic. To deal with such possible restrictions, some embodiments use the outer header to connect neighboring pairs of MFNs that are used by one or more routes. This header in some embodiments is a UDP header that specifies source and destination IP addresses and the UDP protocol parameters. In some embodiments, the ingress MFN CFE specifies its IP address as the source IP address of the outer header, while specifying the next MFN CFE hop's IP address as the destination IP address of the outer header.

When the path to the egress MFN's CFE includes one or more intermediate MFN CFEs, an intermediate CFE replaces the source IP address in the outer header of the double-encapsulated message that it receives with its IP address. It also uses the destination IP address in the inner header to perform a route lookup in its routing table to identify the destination IP address of the next hop MFN CFE that is on the path to the destination IP address of the inner header. The intermediate CFE then replaces the destination IP address in the outer header with the IP address that it identified through its route table lookup.

When the double encapsulated data message reaches the egress MFN's CFE, the CFE determines that it is the egress node for the data message when it retrieves the destination IP address in the inner header and determines that this destination IP address belongs to it. This CFE then removes the two encapsulating headers from the data message and then sends it to it destination (e.g., through its MFN's IPsec gateway to the destination via another IPsec tunnel that is associated with the tenant ID and the destination IP address or subnet in the data message's original header).

Figure 7:
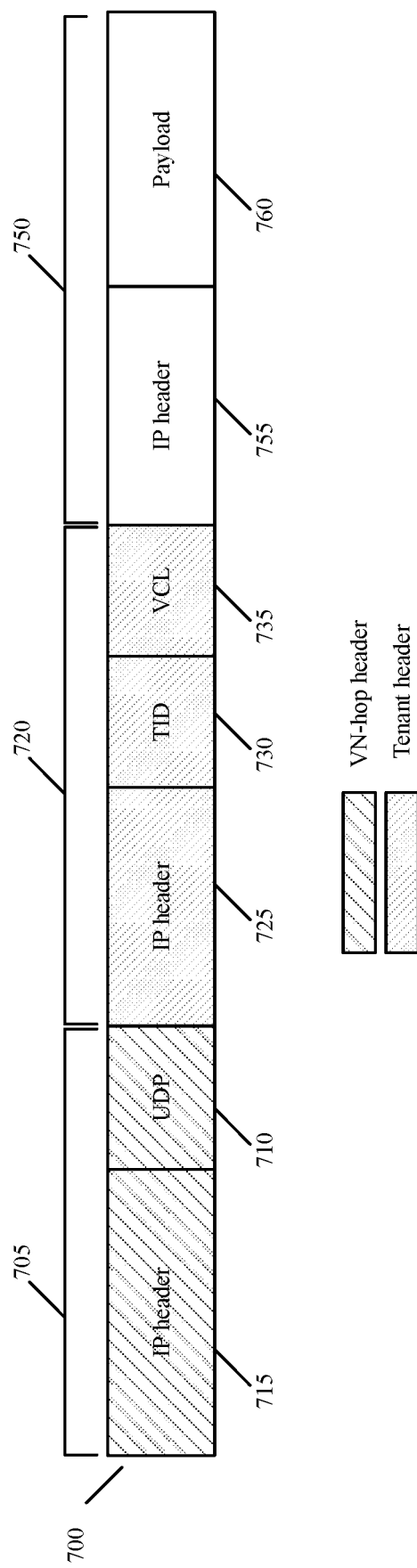

FIG. 7 illustrates an example of the two encapsulating headers of some embodiments, while FIG. 8 presents an example that illustrates how these two headers are used in some embodiments. In the discussion below, the inner header is referred to as the tenant header as it includes the tenant ID along with the identity of the virtual-network ingress/egress nodes connected to the tenant's corporate compute end nodes. The outer header is referred to below as the VN-hop tunnel header because it is used to identify the next hop through the virtual network as the data message traverses a path through the virtual network between ingress and egress MFN CFEs.

FIG. 7 shows a VN-hop tunnel header 705 and a tenant tunnel header 720 encapsulating an original data message 750 with an original header 755 and a payload 760. As shown, the VN-hop tunnel header 705 in some embodiments includes a UDP header 710 and an IP header 715. The UDP header in some embodiments is defined according to a UDP protocol. In some embodiments, the VN-hop tunnel is a standard UDP tunnel, while in other embodiments, this tunnel is a proprietary UDP tunnel. In still other embodiments, this tunnel is a standard or proprietary TCP tunnel. The tunnel header 705 in some embodiments is an encrypted one that encrypts its payload, while in other embodiments it is an unencrypted tunnel.

As further described below, the tunnel header 705 in some embodiments is used to define an overlay VNP network, and is used by each MFN CFE to reach the next hop MFN CFE over the underlay public cloud networks. As such, the IP header 715 of the tunnel header 705 identifies the source and destination IP addresses of the first and second CFEs of the first and second neighboring MFNs connected by the VNP tunnel. In some cases (e.g., when the next hop destination MFN is in a different public cloud of a different public cloud vendor than the source MFN), the source and destination IP addresses are public IP addresses that are used by the public cloud datacenters that include the MFNs. In other cases, when the source and destination MFN CFEs belong to the same public cloud, the source and destination IP addresses can be private IP addresses that are used in just the public cloud. Alternatively, in such cases, the source and destination IP addresses might still be public IP addresses of the public cloud vendor.

As shown in FIG. 7, the tenant tunnel header 720 includes an IP header 725, a tenant ID field 730 and a virtual circuit label (VCL) 735. The tenant tunnel header 720 is used by each hop CFE after the ingress hop CFE to identify the next hop for forwarding the data message to the egress CFE of the egress MFN. As such, the IP header 725 includes a source IP address that is the IP address of the ingress CFE and a destination IP address that is the IP address of the egress CFE. As with the source and destination IP addresses of the VN-hop header 705, the source and destination IP addresses of the tenant header 720 can be either private IP addresses of one public cloud provider (when the data message traverses a route that only goes through one public cloud provider's datacenter), or public IP addresses of one or more public cloud providers (e.g., when the data message traverses a route that goes through datacenters of two or more public cloud providers).

The IP header of the tenant header 720 can be routed by using any standard software router and IP routing table in some embodiments. The tenant ID field 730 contains the tenant ID, which is a unique tenant identifier that can be used at the ingress and egress MFNs to uniquely identify a tenant. The virtual network provider in some embodiments defines different tenant IDs for different corporate entities that are tenants of the provider. The VCL field 735 is an optional routing field that some embodiments use to provide an alternative way (non-IP based way) for forwarding messages through the network. In some embodiments, the tenant tunnel header 720 is a GUE (Generic UDP Encapsulation) header.

FIG. 8 presents an example that illustrates how these two tunnel headers 705 and 710 are used in some embodiments. In this example, a data messages 800 is sent from a first machine 802 (e.g., first VM) in a first branch office 805 of a company to a second machine 804 (e.g., a second VM) in a second branch office 810 of the company. The two machines are in two different subnets, which are 10.1.0.0 and 10.2.0.0, with the first machine having an IP address 10.1.0.17 and the second machine having an IP address 10.2.0.22. In this example, the first branch 805 connects to an ingress MFN 850 in a first public cloud datacenter 830, while the second branch 810 connects to an egress MFN 855 in a second public cloud datacenter 838. Also, in this example, the ingress and egress MFNs 850 and 855 of the first and second public cloud datacenters are indirectly connected through an intermediate MFN 857 of a third public cloud datacenter 836.

As shown, the data message 800 from machine 802 is sent to the ingress MFN 850 along an IPsec tunnel 870 that connects the first branch office 805 to the ingress MFN 850. This IPsec tunnel 870 is established between an IPsec gateway 848 of the first branch office and an IPsec gateway 852 of the ingress MFN 850. This tunnel is established by encapsulating the data message 800 with an IPsec tunnel header 806.

The IPsec gateway 852 of the MFN 850 decapsulates the data message (i.e., removes the IPsec tunnel header 806), and passes the decapsulated message to this MFN's CFE 832 directly or through one or more middlebox service machines (e.g., through a firewall machine, such as machine 210 of FIG. 2). In passing this message, the IPsec gateway or some other module of the MFN 850 in some embodiments associates the message with the tunnel ID of the IPsec tunnel and a tenant ID of the company. This tenant ID identifies the company in the records of the virtual network provider.

Based on the associated tenant ID and/or the IPsec tunnel ID, the CFE 832 of the ingress MFN 850 identifies a route for the message to its destination machine's subnet (i.e., to the second branch office 810) through the virtual network that is established by the MFNs in the different public cloud datacenters. For instance, the CFE 832 uses the tenant ID and/or the IPsec tunnel ID to identify the routing table for the company. In this routing table, the CFE 832 then uses the destination IP address 10.2.0.22 of the received message to identify a record that identifies the CFE 853 of the egress MFN 855 of the public cloud datacenter 838 as the destination egress forwarding node for the data message 800. In some embodiments, the identified record maps the entire subnet 10.2.0.0/16 of the second branch office 810 to the CFE 853 of the MFN 855.

After identifying the egress CFE 853, the CFE 832 of the ingress MFN 850 encapsulates the received data message with a tenant tunnel header 860 that in its IP header 725 includes the source IP of the ingress CFE 832 and the destination IP of the egress CFE 853. In some embodiments, these IP addresses are defined in the public IP address space. The tunnel header 860 also includes the tenant ID that was associated with the data message at ingress MFN 850. As mentioned above, this tunnel header also includes the VCL header value in some embodiments.

In some embodiments, the ingress CFE 832 also identifies the next hop MFN that is on the desired CFE routing path to the egress CFE 853. In some embodiments, the ingress CFE 832 identifies this next hop CFE in its routing table by using the destination IP address of the egress CFE 853. The next hop MFN CFE in this example is the CFE 856 of the third MFN 857 of a third public cloud datacenter 836.

After identifying the next hop MFN CFE, the ingress MFN CFE encapsulates the encapsulated data message 800 with a VN-hop, second tunnel header 862. This tunnel header allows the message to route to the next hop CFE 856. In the IP header 715 of this outer header 862, ingress MFN CFE 832 specifies the source and destination IP addresses as the source IP of the ingress CFE 832 and the destination IP of the intermediate CFE 856. It also specifies its layer 4 protocol as being UDP in some embodiments.

When the CFE 856 of the third MFN 857 receives the double-encapsulated data message, it removes the VN-hop, second tunnel header 862, and the extracts from the tunnel header 860 the destination IP address of the CFE 853 of the egress MFN 855. Since this IP address is not associated with the CFE 856, the data message still has to traverse to another MFN to reach its destination. Accordingly, the CFE 856 uses the extracted destination IP address to identify a record in its routing table that identifies the next hop MFN CFE 853. It then changes re-encapsulates the data message with the outer header 705 and specifies the source and destination IP addresses in its IP header 715 as its own IP address and the destination IP address of the MFN CFE 853. Next, the CFE 856 forwards the double-encapsulated data message 800 to the egress CFE 853 through intervening routing fabric of the public cloud datacenters 836 and 838.

After receiving the encapsulated data message, the egress CFE 853 determines that the encapsulated message is directed to it when it retrieves the destination IP address in the inner header 860 and determines that this destination IP address belongs to it. The egress CFE 853 removes both encapsulating headers 860 and 862 from the data message 800, and extracts the destination IP address in the data message's original header. This destination IP address identifies the IP address of the second machine 804 in the second branch office's subnet.

Using the tenant ID in the removed tenant tunnel header 860, the egress CFE 853 identifies the correct routing table to search, and then searches this routing table based on the destination IP address extracted from the original header value of the received data message. From this search, the egress CFE 853 identifies a record that identifies the IPsec connection to use to forward the data message to its destination. It then provides the data message along with the IPsec connection identifier to the second MFN's IPsec gateway 858, which then encapsulates this message with an IPsec tunnel header 859 and then forwards it to an IPsec gateway 854 of the second branch office 810. The gateway 854 then removes the IPsec tunnel header and forwards the data message to its destination machine 804.

Several more detailed message-processing examples will now be described by reference to FIGS. 9-15. In these examples, it is assumed that each tenant IPsec interface is on the same local public IP address, as are the VNP tunnels. As such, the interfaces in some embodiments are attached to a single VRF (virtual routing and forwarding) namespace. This VRF namespace is referred to below as the VNP namespace.

Figure 9:
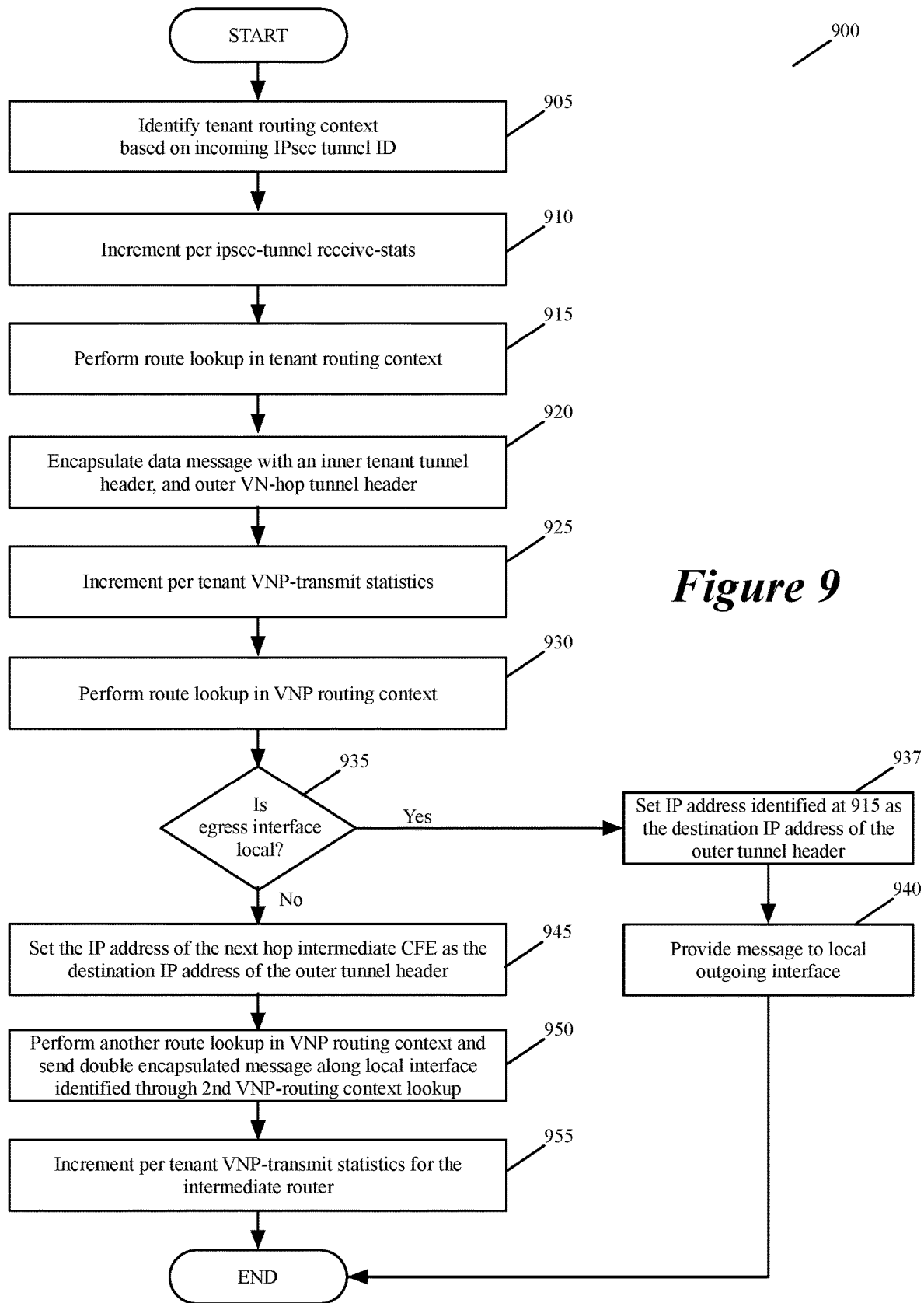
FIGS. 9-11 illustrate message-handling processes that are performed respectively by the ingress, intermediate, and egress managed forwarding nodes (MFNs) when they receive a message that is sent between two compute devices in two different branch offices.
Figure 10:
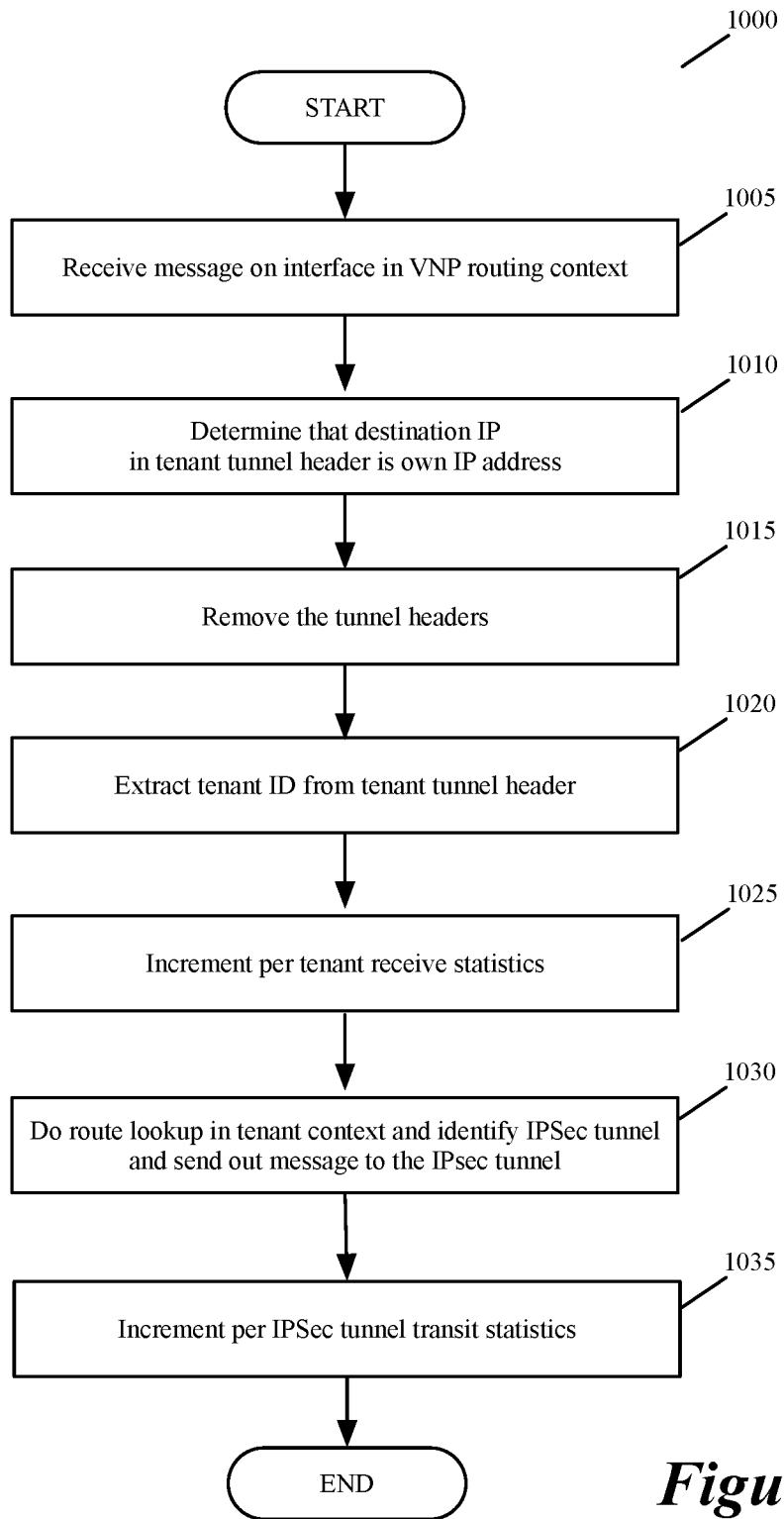
Figure 11:
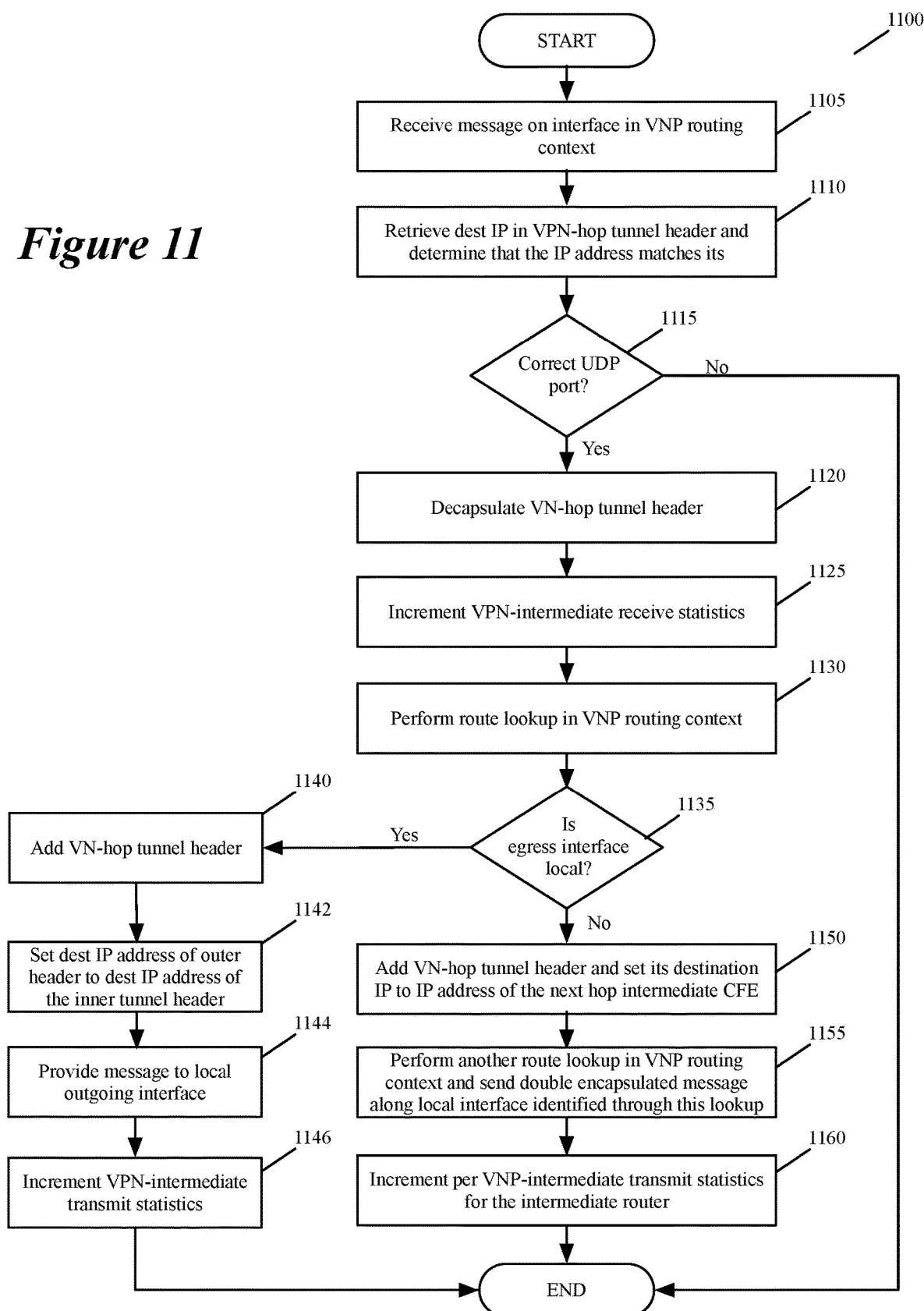

FIGS. 9-11 illustrate message-handling processes 900-1100 that are performed respectively by the ingress, intermediate, and egress MFNs when they receive a message that is sent between two compute devices in two different external machine locations (e.g., branch offices, datacenters, etc.) of a tenant. In some embodiments, the controller cluster 160 configures the CFE of each MFN to operate as an ingress, intermediate, and egress CFE, when each such CFE is a candidate to serve as an ingress, intermediate and egress CFE for different data message flows of a tenant.

The processes 900-1100 will be explained below by reference to two examples in FIGS. 8 and 12. As mentioned above, FIG. 8 illustrates an example when the data message goes through an intermediate MFN to get to the egress MFN. FIG. 12 illustrates an example that does not involve an intermediate MFN between the ingress and egress MFNs. Specifically, it illustrates a data message 1200 being sent from a first device 1202 in a first branch office 1205 to a second device 1210 in a second branch office 1220 when the two branch offices connect to two public cloud datacenters 1230 and 1238 with two MFNs 1250 and 1255 that are directly connected. As shown, the CFEs 1232 and 1253 of the MFNs in these examples perform the routing operations associated with each MFN.

The ingress CFE (e.g., ingress CFE 832 or 1232) of the ingress MFNs 850 and 1250 perform the process 900 in some embodiments. As shown in FIG. 9, the ingress process 900 starts by initially identifying (at 905) the tenant routing context based on the identifier of the IPsec tunnel (e.g., 806 or 1206) in the received data message. In some embodiments, the IPsec gateways or other MFN modules store the tenant IDs for the IPsec tunnel IDs in mapping tables. Whenever a data message is received along a particular IPsec tunnel, the IPsec gateway extracts the IPsec tunnel ID, which this gateway or another MFN module then uses to identify the associated tenant ID by reference to its mapping table. By identifying the tenant ID, the process identifies the tenant routing table or the tenant portion of the VRF namespace to use.

At 910, the process increments the identified IPsec tunnel's RX (receive) counter to account for receiving this data message. Next, at 915, the process performs a route lookup (e.g., a longest prefix match, LPM, lookup) in the identified tenant routing context (e.g., in the tenant's portion of the VRF namespace) to identify the IP address of the egress interface for exiting the tenant's virtual network that is built over the public cloud datacenters. For the branch-to-branch examples, the egress interface is the IP address of an egress CFE (e.g., CFE 853 or 1253) of an MFN connected to the destination branch.

At 920, the process adds a tenant tunnel header (e.g., header 860 or 1260) to the received data message, and embeds the source IP address of the ingress CFE (e.g., ingress CFE 832 or 1252) and the destination IP address of the egress CFE (e.g., egress CFE 853 or 1253) as the source and destination IP addresses in this tunnel header. In the tenant header, the process also stores the tenant ID (identified at 905) in the tenant header. At 920, the process adds a VN-hop tunnel header (e.g., header 862 or 1262) outside of the tenant header, and stores its IP address as the source IP address in this header. The process also specifies (at 920) the UDP parameters (e.g., UDP port) of the VNP tunnel header.

Next, at 925, the process increments the VN-transmit counter for the tenant to account for this data message's transmission. At 930, the process performs a route lookup (e.g., an LPM lookup) in the identified VNP routing context (e.g., in the VNP's portion of the VRF namespace) to identify the next hop interface for this data message. In some embodiments, this route lookup is an LPM lookup (e.g., in the VNP's portion of the VRF namespace) that is at least partially based on the egress CFE's destination IP.

At 935, the process determines whether the next hop egress interface is a local interface (e.g., a physical or virtual port) of the ingress CFE. If so, the process defines (at 937) the destination IP address in the VN-hop outer tunnel header as the egress interface IP address identified at 915. Next, at 940, the process provides the double encapsulated data message to its local interface so that it can be forwarded to the destination egress CFE. After 940, the process 900 ends.

FIG. 12 illustrates an example of the operation 905-940 for the data message 1200 that the ingress CFE 1232 receives from the device 1202 of the first branch office 1205. As shown, this CFE's MFN 1250 receives this data message as an IPsec encapsulated message at its IPsec gateway 1252 from the IPsec gateway 1248 of the first branch office 1205. The ingress CFE 1232 encapsulates the received message 1200 (after its IPsec header has been removed by an IPsec gateway 1252) with a VN-hop tunnel header 1262 and a tenant tunnel header 1260, and forwards this double encapsulated message to the egress CFE 1253 of MFN 1255 of public cloud 1238. As shown, the source and destination IP addresses of both tunnel headers 1260 and 1262 are identical in this example. Given that these two sets of IP addresses are identical, some embodiments forego using the outer IP header 1262 when the data message is not routed through any intervening CFE, such as CFE 856.

When the process determines (at 935) that the next hop egress interface is not a local interface of the ingress CFE but rather is the destination IP address of another router, the process embeds (at 945) in the VN-hop tunnel header, the destination IP address of the next hop intermediate CFE (e.g., intermediate CFE 856) as the destination IP address of the VN-hop tunnel header.

Next, at 950, the process performs another route lookup (e.g., an LPM lookup) in the identified VNP routing context (e.g., in the VNP's portion of the VRF namespace). This time, the lookup is based on the IP address of the intermediate CFE that is identified in the VNP tunnel header. As the intermediate CFE (e.g., CFE 856) is a next-hop CFE in the virtual network for the ingress CFE (e.g., CFE 832), the routing table identifies a local interface (e.g., a local port) for data messages sent to the intermediate CFE. Thus, this lookup in the VNP routing context identifies a local interface, to which the ingress CFE provides (at 950) the double-encapsulated message. The process then increments (at 955) the VN-intermediate counter to account for this data message's transmission. After 955, the process ends.

FIG. 10 illustrates a process 1000 that a CFE (e.g., CFE 853 or 1253) of an egress MFN performs in some embodiments when it receives a data message that should be forwarded to a corporate compute node (e.g., a branch office, datacenter, remote user location) connected to the MFN. As shown, the process initially receives (at 1005) the data message on an interface associated with the virtual network. This message is encapsulated with the VN-hop tunnel header (e.g., header 862 or 1262) and tenant tunnel header (e.g., header 860 or 1260).

At 1010, the process determines that the destination IP address in the VN-hop tunnel header is its CFE's destination IP address (e.g., IP address of CFE 853 or 1253). Next, at 1015, the process removed the two tunnel headers. The process then retrieves (at 1020) the tenant ID from the removed tenant tunnel header. To account for the received data message, the CFE then increments (at 1025) the RX (receive) counter that it maintains for the tenant specified by the extracted tenant ID.

Next, at 1030, the process performs a route lookup (e.g., an LPM lookup) in the identified tenant routing context (i.e., in the routing context of the tenant identified by the tenant ID extracted at 1020) to identify the next hop interface for this data message. The process performs this lookup based on the destination IP address in the original header (e.g., header 755) of the received data message in some embodiments. From the record identified through this lookup, the process 1000 identifies the IPsec interface through which the data message has to be sent to its destination. Accordingly, the process 1000 sends the decapsulated, received data message to its MFN's IPsec gateway (e.g., gateway 858 or 1258).

This gateway then encapsulates the data message with an IPsec tunnel header (e.g., tunnel header 859 or 1259) and forwards it to a gateway (e.g., gateway 854 or 1254) in the destination corporate compute node (e.g., destination branch office), where it will be decapsulated and forwarded to its destination. After 1030, the CFE or its MFN increments (at 1035) the counter that it maintains for transmitting messages along the IPsec connection to the destination corporate compute node (e.g., the IPsec connection between gateways 854 and 858, or between gateways 1254 and 1258).

FIG. 11 illustrates a process 1100 that a CFE (e.g., CFE 856) of an intermediate MFN performs in some embodiments when it receives a data message that should be forwarded to another CFE of another MFN. As shown, the process initially receives (at 1105) the data message on an interface associated with the virtual network. In some embodiments, this message is encapsulated with two tunnel headers, a VN-tunnel header (e.g., header 862) and a tenant tunnel header (e.g., header 860).

At 1110, the process terminates the VN-hop tunnel as it determines that the destination IP address in this tunnel header is its CFE's destination IP address (e.g., is the destination IP address of CFE 856). Next, at 1115, the process determines whether the VN-hop tunnel header specifies the correct UDP port. If not, the process ends. Otherwise, at 1120, the process removes the VN-hop tunnel header. To account for the received data message, the CFE then increments (at 1125) the RX (receive) counter that it maintains to quantify the number of messages that it has received as an intermediate hop CFE.

At 1130, the process performs a route lookup (e.g., an LPM lookup) in the identified VNP routing context (e.g., in the VNP's portion of the VRF namespace) to identify the next hop interface for this data message. In some embodiments, this route lookup is an LPM lookup (e.g., in the VNP's portion of the VRF namespace) that is at least partially based on the egress CFE's destination IP that is identified in the inner tenant tunnel header.

The process then determines (at 1135) whether the next hop egress interface is a local interface of the intermediate CFE. If so, the process adds (at 1140) the VN-hop tunnel header to the data message, which is already encapsulated with the tenant tunnel header. The process sets (at 1142) the destination IP address in the VN-hop tunnel header to the egress CFE's destination IP address that is specified in the tenant tunnel header. It also sets (at 1142) the source IP address in the VN-hop tunnel header to the IP address of its CFE. In this tunnel header, the process also sets the UDP attributes (e.g., the UDP port, etc.).

Next, at 1144, the process provides the double encapsulated data message to its local interface (identified at 1130) so that it can be forwarded to the destination egress CFE. One example of this VN-hop tunnel de-capsulation and forwarding was described above by reference to the operations of CFE 856 in FIG. 8. To account for the received data message, the CFE then increments (at 1146) the TX (transmit) counter that it maintains to quantify the number of messages that it has transmitted as an intermediate hop CFE. After 1146, the process 1100 ends.

On the other hand, when the process determines (at 1135) that the next hop egress interface is not a local interface of its CFE but rather is the destination IP address of another router, the process adds (at 1150) a VN-hop tunnel header to the data message from which it previously removed a VN-hop tunnel header. In the new VN-hop tunnel header, the process 1100 embeds (at 1150) the source IP address of its CFE and the destination IP address (identified at 1130) of the next hop intermediate CFE as the source and destination IP addresses of the VN-hop tunnel header. This VNP tunnel header also specifies a UDP layer 4 protocol with a UDP destination port.

Next, at 1155, the process performs another route lookup (e.g., an LPM lookup) in the identified VNP routing context (e.g., in the VNP's portion of the VRF namespace). This time, the lookup is based on the IP address of the next hop intermediate CFE that is identified in the new VN-hop tunnel header. As this intermediate CFE is a next-hop of the current intermediate CFE in the virtual network, the routing table identifies a local interface for data messages sent to the next-hop intermediate CFE. Thus, this lookup in the VNP routing context identifies a local interface, to which the current intermediate CFE provides the double-encapsulated message. The process then increments (at 1160) the VN-intermediate TX (transmit) counter to account for this data message's transmission. After 1160, the process ends.

Figure 13:
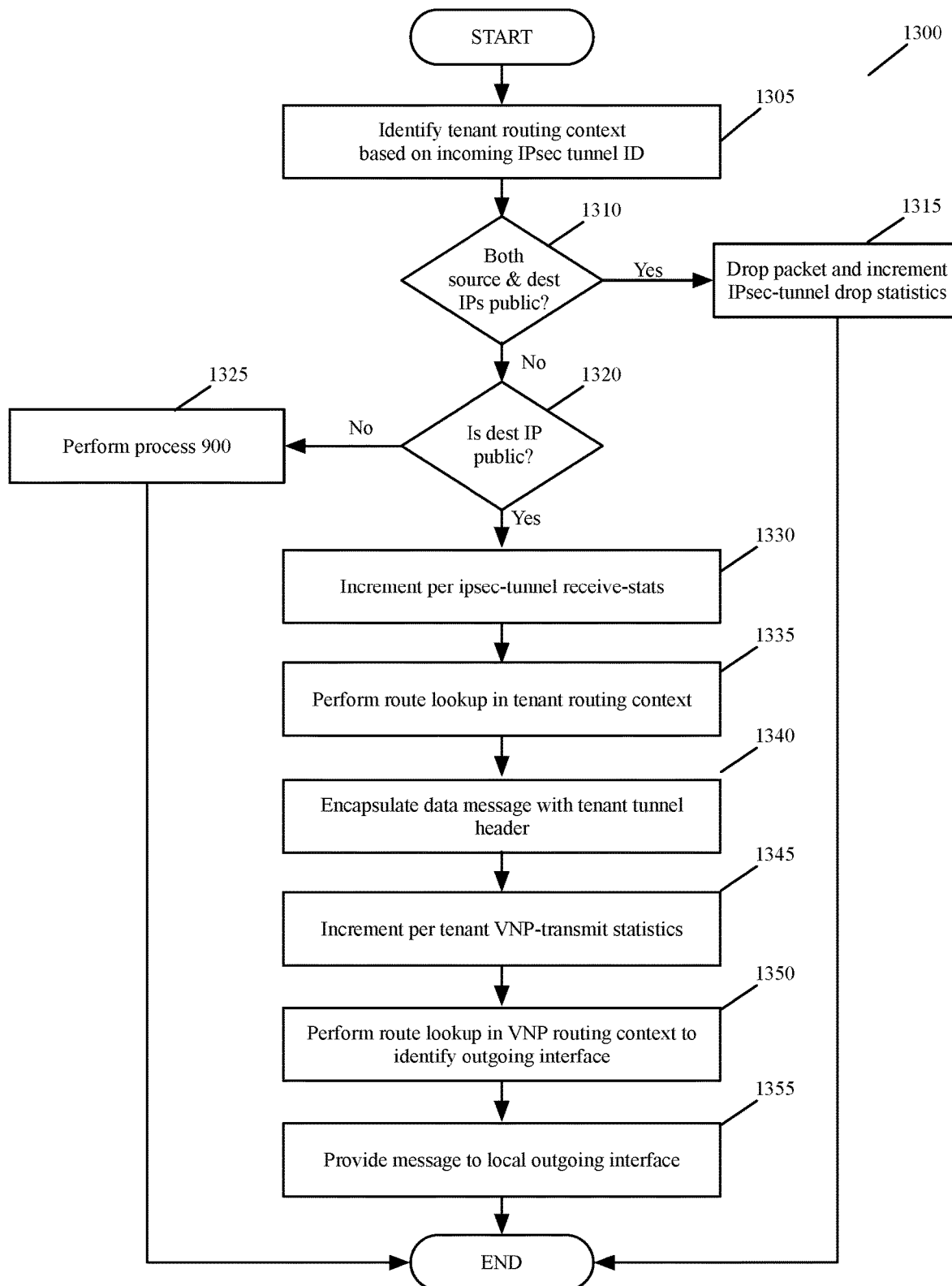
FIG. 13 illustrates a message-handling process that is performed by the cloud forwarding element (CFE) of the ingress MFN when it receives a message that is sent from a corporate compute device in a branch office to another device in another branch office or in a SaaS provider datacenter.

FIG. 13 illustrates a message-handling process 1300 that is performed by the CFE of the ingress MFN when it receives a message for a tenant that is sent from a corporate compute device of the tenant (e.g., in a branch office) to another tenant machine (e.g., in another branch office, tenant datacenter or a SaaS provider datacenter). The process 900 of FIG. 9 is a subset of this process 1300 as further described below. As shown in FIG. 13, the process 1300 starts by initially identifying (at 905) the tenant routing context based on the identifier of the incoming IPsec tunnel.

At 1310, the process determines whether both the source and destination IP addresses in the received data message's header are public IP addresses. If so, the process (at 1315) drops the data message and increments the drop counter that it maintains for the received data message's IPsec tunnel. At 1315, the process drops the counter because it should not be receiving messages that are addressed to and from public IP addresses when it receives the messages through the tenant's IPsec tunnel. In some embodiments, the process 1300 also sends back to the source corporate compute machine an ICMP error message.

On the other hand, when the process determines (at 1310) that the data message is not coming from a public IP address and going to another public IP address, the process determines (at 1320) whether the destination IP address in the received data message's header is a public IP address. If so, the process transitions to 1325 to perform process 900 of FIG. 9, with the exception of operation 905, which it has performed at the start of the process 1300. After 1325, the process 1300 ends. On the other hand, when the process 1300 determines (at 1320) that the destination IP address in the received data message's header is not a public IP address, the process increments (at 1330) the identified IPsec tunnel's RX (receive) counter to account for receiving this data message.

The process 1300 then performs (at 1335) a route lookup (e.g., an LPM lookup) in the identified tenant routing context (e.g., in the tenant's portion of the VRF namespace). This lookup identifies the IP address of the egress interface for exiting the tenant's virtual network that is built over the public cloud datacenters. In the example illustrated in FIG. 13, the process 1300 reaches the lookup operation 1335 when the data message is intended for a machine in a SaaS provider datacenter. Hence, this lookup identifies the IP address of the egress router for exiting the tenant's virtual network to reach the SaaS provider machine. In some embodiments, all the SaaS provider routes are installed in one route table or in one portion of the VRF namespace, while in other embodiments the routes for the different SaaS providers are stored in different route tables or different VRF namespace portions.

At 1340, the process adds a tenant tunnel header to the received data message, and embeds the source IP address of the ingress CFE and the destination IP address of the egress router as the source and destination IP addresses in this tunnel header. Next, at 1345, the process increments the VN-transmit counter for the tenant to account for this data message's transmission. At 1350, the process performs a route lookup (e.g., an LPM lookup) in the VNP routing context (e.g., in the VNP's portion of the VRF namespace) to identify one of its local interfaces as the next hop interface for this data message. When the next hop is another CFE (e.g., in other public cloud datacenter), the process in some embodiments further encapsulates the data message with the VN-hop header, and embeds its CFE's IP address and the other CFE's IP address as the source and destination addresses of the VN-hop header. At 1355, the process provides the encapsulated data message to its identified local interface so that the data message can be forwarded to its egress router. After 1355, the process 1300 ends.

In some cases, the ingress MFN can receive a data message for a tenant that its CFE can directly forward to the data message's destination machine without going through another MFN's CFE. In some such cases, the data message does not need to be encapsulated with a tenant header or a VN-hop header when the CFE does not need to relay any tenant specific information to any other subsequent VN processing module or the needed information can be provided to the subsequent VN processing module through other mechanisms.

For instance, to directly forward a tenant's data message to an external SaaS provider datacenter, the ingress MFN's NAT engine 215 would have to perform a NAT operation based on the tenant identifier, as further described below. The ingress CFE or another module in the ingress MFN has to provide the tenant identifier to the ingress MFN's associated NAT engine 215. When the ingress CFE and NAT engines execute on the same computer, some embodiments share this information between these two modules by storing it in a shared memory location. On the other hand, when the CFE and NAT engines do not execute on the same computer, some embodiments use other mechanisms (e.g., an out-of-band communication) to share the tenant ID between the ingress CFE and NAT engines. In such cases, however, other embodiments use an encapsulating header (i.e., use an in-band communication) to store and share the tenant ID between different modules of the ingress MFN.

Figure 14:
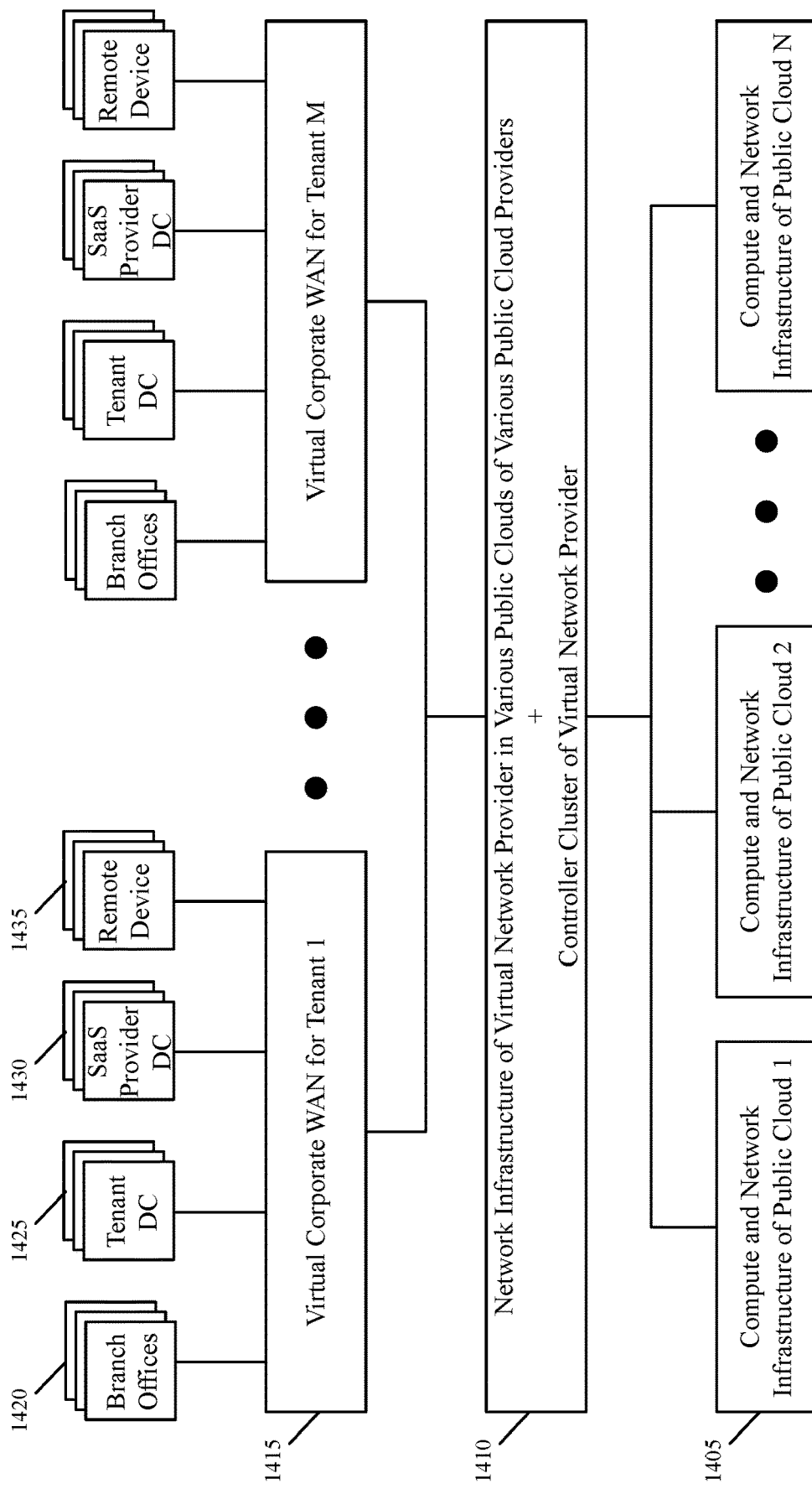
FIG. 14 presents an example that shows M virtual corporate WANs for M tenants of a virtual network provider that has network infrastructure and controller cluster(s) in N public clouds of one or more public cloud providers.

In some embodiments, a virtual network provider uses the above-described processes, systems, and components to provide multiple virtual WANs for multiple different tenants (e.g., multiple different corporate WANs for multiple corporations) over multiple public clouds of the same or different public cloud providers. FIG. 14 presents an example that shows M virtual corporate WANs 1415 for M tenants of a virtual network provider that has network infrastructure and controller cluster(s) 1410 in N public clouds 1405 of one or more public cloud providers.

Each tenant's virtual WAN 1415 can span all of the N public clouds 1405, or a subset of these public clouds. Each tenant's virtual WAN 1415 connects one or more branch offices 1420, datacenters 1425, SaaS provider datacenters 1430, and remote devices of the tenant. In some embodiments, each tenant's virtual WAN spans any public cloud 1405 that the VNP's controller cluster deems necessary for efficiently forwarding data messages between the different compute nodes 1420-1435 of the tenant. In selecting the public clouds, the controller cluster in some embodiments also accounts for public clouds that the tenant selects and/or the public clouds in which the tenant, or at least one SaaS provider of the tenant, has one or more machines.

The virtual WAN 1415 of each tenant allows the remote devices 1435 (e.g., mobile devices or remote computers) of the tenant to avoid interacting with the tenant's WAN gateway at any branch office or tenant datacenter, in order to access a SaaS provider service (i.e., to access a SaaS provider machine or machine cluster). The tenant's virtual WAN in some embodiments allows the remote devices to avoid the WAN gateways at the branch offices and tenant datacenters, by moving the functionalities of these WAN gateways (e.g., the WAN security gateways) to one or more machines in the public clouds spanned by the virtual WAN.

For example, to allow a remote device to access the compute resources of the tenant or its SaaS provider services, a WAN gateway in some embodiments has to enforce firewall rules that control how the remote device can access the tenant's computer resources or its SaaS provider services. To avoid branch or datacenter WAN gateways of the tenant, the tenant's firewall engines 210 are placed in the virtual network MFNs in one or more public clouds spanned by the tenant's virtual WAN.

The firewall engines 210 in these MFNs perform the firewall service operations on the data message flows from and to the remote devices. By performing these operations in the virtual network deployed over one or more public clouds, the data message traffic associated with the tenant's remote devices do not need to be unnecessarily routed through the tenant's datacenter(s) or branch offices in order to receive firewall rule processing. This alleviates traffic congestion in the tenant datacenters and branch offices, and avoids consuming expensive ingress/egress network bandwidth at these locations for processing traffic that is not destined to compute resources at these locations. It also helps speed up the forwarding of the data message traffic from and to the remote devices as this approach allows the intervening firewall rule processing to occur within the virtual network as the data message flows traverse to their destinations (e.g., at their ingress MFNs, egress MFNs or intermediate-hop MFNs).

In some embodiments, the firewall enforcing engine 210 (e.g., firewall service VM) of an MFN receives firewall rules form the VNP central controllers 160. A firewall rule in some embodiments includes a rule identifier and an action. The rule identifier in some embodiments includes one or more match values that are to be compared to data message attributes, such as layer 2 attributes (e.g., MAC addresses), layer 3 attributes (e.g., five tuple identifiers, etc.), tenant ID, location ID (e.g., office location ID, datacenter ID, remote user ID, etc.), in order to determine whether the firewall rule matches a data message.

The firewall rule's action in some embodiments specifies the action (e.g., allow, drop, re-direct, etc.) that the firewall enforcing engine 210 has to take on a data message when the firewall rule matches the data message's attributes. To address the possibility that multiple firewall rules match a data message, the firewall enforcing engine 210 stores the firewall rules (that it receives from the controller cluster 160) in a firewall rule data storage in a hierarchical manner so that one firewall rule can have higher priority than another firewall rule. When a data message matches two firewall rules, the firewall enforcing engine applies the rule with the higher priority in some embodiments. In other embodiments, the firewall enforcing engine examines the firewall rules according to their hierarchy (i.e., examines higher priority rules before lower priority rules) in order to ensure that it first matches the higher priority rule in case another lower priority rule might also be a match for the data message.

Some embodiments allow the controller cluster to configure the MFN components to have the firewall service engines examine a data message at an ingress node (e.g., node 850) as it enters a virtual network, at an intermediate node (e.g., node 857) on the virtual network or at an egress node (e.g., node 855) as it exits the virtual network. At each of these nodes, the CFE (e.g., 832, 856, or 858) in some embodiments calls its associated firewall service engine 210 to perform the firewall service operation on the data message that the CFE receives. In some embodiments, the firewall service engine returns its decision to the module that called it (e.g., to the CFE) so that this module can perform the firewall action on the data message, while in other embodiments, the firewall service engine performs its firewall action on the data message.

In some embodiments, other MFN components direct the firewall service engine to perform its operation. For instance, at an ingress node, the VPN gateway (e.g., 225 or 230) in some embodiments directs its associated firewall service engine to perform its operation, in order to determine whether the data message should be passed to the ingress node's CFE. Also, at the egress node, the CFE in some embodiments passes the data message to its associated firewall service engine, which if it decides to allow the data message through, then passes the data message through an external network (e.g., the Internet) to its destination, or passes the data message to its associated NAT engine 215 to perform its NAT operation before passing the data message to its destination through an external network.

The virtual network providers of some embodiments allow the tenant's WAN security gateway that is defined in the public clouds to implement other security services in addition to, or instead of, firewall services. For instance, a tenant's distributed WAN security gateway (which in some embodiments is distributed over each public cloud datacenter that is spanned by the tenant's virtual network) not only includes firewall service engines, but also includes intrusion detection engines and intrusion prevention engines. In some embodiments, the intrusion detection engines and intrusion prevention engines are incorporated architecturally in the MFN 150 to occupy similar position to the firewall service engine 210.

Each of these engines in some embodiments includes one or more storages that store intrusion detection/prevention policies distributed by the central controller cluster 160. In some embodiments, these policies configure the engines to detect/prevent unauthorized intrusions into the tenant's virtual network (that is deployed over several public cloud datacenters), and to take actions in response to detected intrusion events (e.g., generating logs, sending out notifications, shutting down services or machines, etc.). Like firewall rules, the intrusion detection/prevention policies can be enforced at various different managed forwarding nodes (e.g., ingress MFNs, intermediate MFNs, and/or egress MFNs of the data message flows) over which the virtual network is defined.

As mentioned above, the virtual network provider deploys each tenant's virtual WAN by deploying at least one MFN in each public cloud spanned by the virtual WAN, and configuring the deployed MFNs to define routes between the MFNs that allow the tenant's message flows to enter and exit the virtual WAN. Also, as mentioned above, each MFN can be shared by different tenants in some embodiments, while in other embodiments each MFN is deployed for just one particular tenant.

In some embodiments, each tenant's virtual WAN is a secure virtual WAN that is established by connecting the MFNs used by that WAN through overlay tunnels. This overlay tunnel approach in some embodiments encapsulates each tenant's data message flows with a tunnel header that is unique to each tenant, e.g., contains a tenant identifier that uniquely identifies the tenant. For a tenant, the virtual network provider's CFEs in some embodiments use one tunnel header to identify ingress/egress forwarding elements for entering/exiting the tenant's virtual WAN, and another tunnel header to traverse intervening forwarding elements of the virtual network. The virtual WAN's CFEs use different overlay encapsulation mechanisms in other embodiments.

To deploy a virtual WAN for a tenant over one or more public clouds, the VNP's controller cluster (1) identifies possible edge MFNs (that can serve as ingress or egress MFNs for different data message flows) for the tenant based on locations of the tenant's corporate compute nodes (e.g., branch offices, datacenters, mobile users, and SaaS providers), and (2) identifies routes between all possible edge MFNs. Once these routes are identified they are propagated to the forwarding tables of the CFEs (e.g., propagated using OpenFlow to different OVS-based virtual network routers). Specifically, to identify optimal routes through a tenant's virtual WAN, the MFNs associated with this WAN generate measurement values that quantify the quality of the network connection between them and their neighboring MFNs, and regularly provide their measurements to the VNP's controller cluster.

As mentioned above, the controller cluster then aggregates the measurements from the different MFNs, generates routing graphs based on these measurements, defines routes through a tenant's virtual WAN, and then distributes these routes to the forwarding elements of the CFEs of the MFNs. To dynamically update the defined routes for a tenant's virtual WAN, the MFNs associated with this WAN periodically generate their measurements and provide these measurements to the controller cluster, which then periodically repeats its measurement aggregation, route-graph generation, route identification, and route distribution based on the updated measurements that it receives.

In defining the routes through a tenant's virtual WAN, the VNP's controller cluster optimizes the routes for the desired end-to-end performance, reliability and security, while trying to minimize the routing of tenant's message flows through the Internet. The controller cluster also configures the MFN components to optimize the layer 4 processing of the data message flows passing through the network (e.g., to optimize the end-to-end rate of TCP connections by splitting the rate control mechanisms across the connection path).

With the proliferation of public clouds, it is often very easy to find a major public cloud datacenter close to each branch office of a corporation. Similarly, SaaS vendors are increasingly hosting their applications within public clouds, or are similarly located at the vicinity of some public cloud datacenter. Consequently, the virtual corporate WANs 1415 securely use the public clouds 1405 as corporate network infrastructure that have presence in the vicinity of the corporate compute nodes (e.g., branch offices, datacenters, remote devices, and SaaS providers).

Corporate WANs require bandwidth guarantees in order to provide business critical application at an acceptable performance at all times. Such applications maybe interactive data applications, e.g. ERP, financial or procurement, deadline-oriented application (e.g., industrial or IoT control), real time application (e.g., VoIP or video conferencing). Consequently, traditional WAN infrastructure (e.g., Frame Relay or MPLS) provides such guarantees.

A main obstacle in providing bandwidth guarantee in a multi-tenant network (e.g., a shared virtual network over which multiple virtual networks are defined) is the need to reserve bandwidth over one or more path for a certain customer. In some embodiments, the VNP offers QoS services and provides an Ingress Committed Rate (ICR) guarantee and an Egress Committed Rate (ECR) guarantee. ICR refers to the traffic rate coming into the virtual network, while ECR refers to the traffic rate exiting the virtual network to the tenant site.

As long as traffic does not exceed ICR and ECR limits, the virtual network in some embodiments provides bandwidth and delay guarantees. For example, as long as HTTP ingress or egress traffic do not exceed 1 Mbps, the bandwidth and low delay are guaranteed. This is the point-to-cloud model because, for QoS purposes, the VNP need not keep track of traffic destinations, as long as its destinations are within the ICR/ECR bounds. This model is sometimes called the hose model.

For the more stringent applications, where a customer desires a point-to-point guarantee, a virtual data pipe needs to be constructed to deliver the highly critical traffic. For example, an enterprise may want two hub sites or datacenters connected with high service level agreement guarantees. To that end, VNP routing automatically chooses a routing path that satisfies the bandwidth constraint for each customer. This is referred to as the point-to-point model or the pipe model.

The main advantage of VNP in providing guaranteed bandwidth to end users is the ability to adjust the VNP infrastructure according to the changing bandwidth demands. Most public clouds provide minimum bandwidth guarantees between each two instances located at different regions of the same cloud. If the current network does not have enough unused capacity to provide the guaranteed bandwidth for a new request, the VNP adds new resources to its facilities. For example, the VNP can add new CFEs in high-demand regions.

One challenge is to optimize the performance and the cost of this new dimension in planning routes and scaling up and down the infrastructure. To facilitate the algorithms and bandwidth accounting, some embodiments assume that end-to-end bandwidth reservations are not split. In other ways, if a certain bandwidth (e.g., 10 Mbps) is reserved between branch A and branch B of a certain tenant, the bandwidth is allocated over a single path that starts from an ingress CFE to which branch A connects, and then traverses a set of zero or more intermediate CFEs to reach the egress CFE that is connected to branch B. Some embodiments also assume that the bandwidth guaranteed path only traverse a single public cloud.

In order to account for the various bandwidth reservation that intersect over the network topology, the VNP in some embodiments defines the routing over a reserved bandwidth path statically, so that data message flows always traverse through the same routes that were reserved for the bandwidth requirements. In some embodiments, each route is identified with a single tag that each CFE traversed by the route matches to a single outgoing interface associated with this route. Specifically, each CFE matches a single outgoing interface to each data message that has this tag in its header and arrives from a specific incoming interface.

In some embodiments, the controller cluster maintains a network graph that is formed by several interconnected nodes. Each node n in the graph has the allocated total guaranteed bandwidth ($TBW_n$) associated with this node and the amount of bandwidth already reserved (allocated to a certain reserved path) by this node ($RBW_n$). In addition, for each node, the graph includes the cost in cents per gigabyte ($C_{ij}$) and the delay in milliseconds ($D_{ij}$) associated with sending traffic between this node and all other nodes in the graph. The weight associated with sending traffic between node i and node j is $W_{ij}=a*C_{ij}+D_{ij}$, where a is a system parameter that is typically between 1 and 10.

When a request for a bandwidth reservation of value BW between branches A and B is accepted, the controller cluster first maps the request to specific ingress and egress routers n and m, which are bound to branches A and B respectively. The controller cluster then executes a routing process that conducts two lowest-cost (e.g., shortest path) computations between n and m. The first is a lowest-cost (e.g., shortest path) route between n and m irrespective of the available bandwidth along the computed route. The total weight of this route is computed as $W_1$.

The second lowest-cost (e.g., shortest path) computation initially modifies the graph by eliminating all nodes i where $BW>TBW_i-RBW_i$. The modified graph is termed the trimmed graph. The controller cluster then performs a second lowest-cost (e.g., shortest path) route computation over the trimmed graph. If the weight of the second route is no more than K percent (K is typically 10%-30%) higher than the first route, the second route is selected as the preferred path. On the other hand, when this requirement is not met, the controller cluster will add to the first path the node i with the smallest value of $TBW_i-RBW_i$, and then repeats the two lowest-cost (e.g., shortest path) computations. The controller cluster will continue adding more routers until the condition is met. At that point, the reserved bandwidth BW is added to all $RBW_i$ where i is a router on the selected route.

For the special case of a request for additional bandwidth for a route that already has reserved bandwidth, the controller cluster will first delete the current bandwidth reservation between nodes A and B and will calculate the path for the total bandwidth request between these nodes. To do this, the information held for each node in some embodiments also includes the bandwidth reserved for each tag, or each source and destination branches, and not only the overall bandwidth reserved. After bandwidth reservations are added to the network, some embodiments do not revisit the routes so long as there are no major changes in measured network delays or costs through the virtual network. However, when the measurements and/or costs change, these embodiments repeat the bandwidth reservation and route computation processes.

Figure 15:
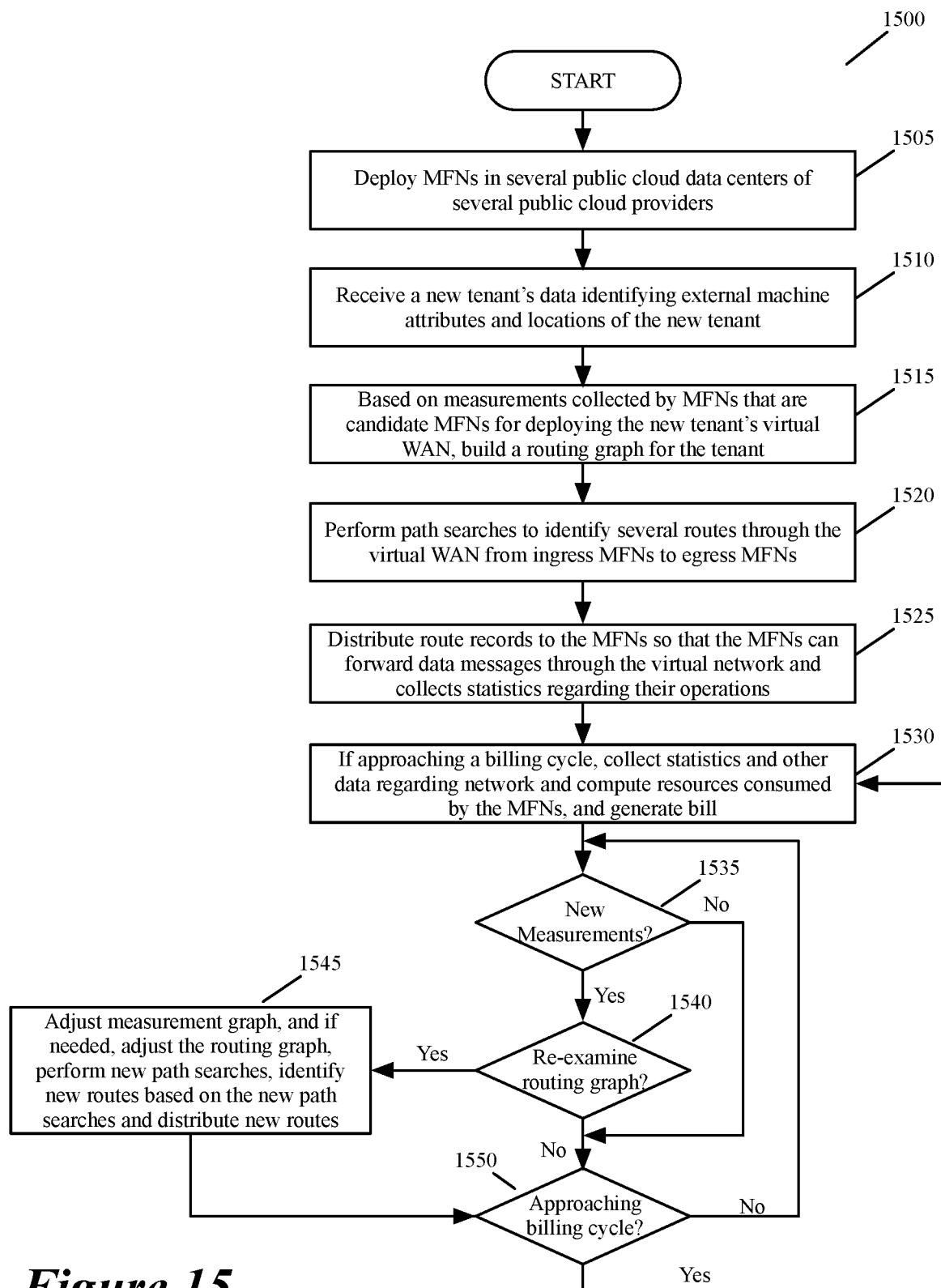
FIG. 15 conceptually illustrates a process performed by the controller cluster of the virtual network provider to deploy and manage a virtual WAN for a particular tenant.

FIG. 15 conceptually illustrates a process 1500 performed by the controller cluster 160 of the virtual network provider to deploy and manage a virtual WAN for a particular tenant. In some embodiments, the process 1500 is performed by several different controller programs executing on the controller cluster 160. The operations of this process do not necessarily have to follow the sequence illustrated in FIG. 15, as these operations can be performed by the different programs in parallel or in a different sequence. Accordingly, these operations are illustrated in this figure only to describe one exemplary sequence of operations performed by the controller cluster.

As shown, the controller cluster initially deploys (at 1505) several MFNs in several public cloud datacenters of several different public cloud providers (e.g., Amazon AWS, Google GCP, etc.). The controller cluster in some embodiments configures (at 1505) these deployed MFNs for one or more other tenants that are different than the particular tenant for which the process 1500 is illustrated.

At 1510, the controller cluster receives from the particular tenant data about external machine attributes and locations of the particular tenant. In some embodiments, this data includes the private subnets used by the particular tenant as well as identifiers for one or more tenant offices and datacenters at which the particular tenant has external machines. In some embodiments, the controller cluster can receive the tenant data through APIs or through a user interface that the controller cluster provides.

Next, at 1515, the controller cluster generates a routing graph for the particular tenant from the measurements collected by the measurement agents 205 of the MFNs 150 that are candidate MFNs to use for establishing the virtual network for the particular tenant. As mentioned above, the routing graph has nodes that represent the MFNs, and links between the nodes that represent the network connections between the MFNs. The links have associated weights, which are cost values that quantify the quality and/or cost of using the network connections represented by the links. As mentioned above, the controller cluster first generates a measurement graph from the collected measurements, and then generates the routing graph by removing links from the measurement graph that are not optimal (e.g., that have large delays or drop rates).

After constructing the routing graph, the controller cluster performs (at 1520) path searches to identify possible routes between different pairs of candidate ingress and egress nodes (i.e., MFNs) that the tenant's external machines can use to send data messages into the virtual network (deployed by the MFNs) and to receive data messages from the virtual network. In some embodiments, the controller cluster uses known path search algorithms to identify different paths between each candidate ingress/egress pair of nodes. Each path for such a pair uses one or more links that when concatenated traverse from the ingress node to the egress node through zero or more intermediate nodes.

In some embodiments, the cost between any two MFNs comprises a weighted sum of estimated latency and financial costs for a connection link between the two MFNs. The latency and financial costs include in some embodiments one or more of the following: (1) link delay measurements, (2) estimated message processing latency, (3) cloud charges for outgoing traffic from a particular datacenter either to another datacenter of the same public cloud provider, or to exit the public cloud (PC) provider's cloud (e.g., to another public cloud datacenter of another public cloud provider or to the Internet), and (4) estimated message processing costs associated with the MFNs executing on host computers in the public clouds.

Some embodiments assess a penalty for connection links between two MFNs that traverse through the public Internet, in order to minimize such traversal whenever possible. Some embodiments also incentivize the use of private network connections between two datacenters (e.g., by reducing the connection link cost) in order to bias the route generation towards using such connections. Using the computed costs of these pair-wise links, the controller cluster can compute the cost of each routing path that uses one or more of these pair-wise links by aggregating the costs of the individual pair-wise links that are used by the routing path.

The controller cluster then selects (at 1520) one or up to N identified paths (where N is an integer larger than 1) based on the computed costs (e.g., the lowest aggregate cost) of the identified candidate paths between each candidate ingress/ egress pair of nodes. In some embodiments, the computed costs for each path are based on the weight cost of each link used by the path (e.g., is a sum of each link's associated weight value), as mentioned above. The controller cluster can select more than one path between a pair of ingress/egress nodes when more than one route is needed between two MFNs to allow the ingress MFN or an intermediate MFN to perform a multi-path operation.

After selecting (at 1520) one or N paths for each candidate pair of ingress/egress nodes, the controller cluster defines one or N routes based on the selected paths, and then generates route tables or route table portions for the MFNs that implement the particular tenant's virtual network. The generated route records identify edge MFNs to reach different subnets of the particular tenant, and identify next hop MFNs for traversing routes from ingress MFNs to egress MFNs.

At 1525, the controller cluster distributes route records to the MFNs in order to configure the forwarding elements 235 of these MFNs to implement the virtual network for the particular tenant. In some embodiments, the controller cluster communicates with the forwarding elements to pass the route records by using communication protocols that are presently used in a software defined multi-tenant datacenter to configure software routers executing on host computers to implement a logical network that spans the host computers.

Once the MFNs have been configured and the virtual network is operational for the particular tenant, the edge MFNs receive data messages from tenant's external machines (i.e., machines outside of the virtual network) and forward these data messages to edge MFNs in the virtual network, which in turn forward the data messages to other external machines of the tenant. While performing such forwarding operations, the ingress, intermediate and egress MFNs collect statistics regarding their forwarding operations. Also, in some embodiments, one or more modules on each MFN in some embodiments collect other statistics regarding network or compute consumption in the public cloud datacenters. In some embodiments, the public cloud providers collect such consumption data and pass the collected data to the virtual network provider.

When approaching a billing cycle, the controller cluster collects (e.g., at 1530) statistics collected by the MFNs, and/or the network/compute consumption data collected by the MFNs or provided by the public cloud providers. Based on the collected statistics, and/or provided the network/compute consumption data, the controller cluster generates (at 1530) billing reports and sends the billing reports to the particular tenant.

As mentioned above, the amount billed in the billing report accounts for statistics and network/consumption data that the controller cluster receives (e.g., at 1530). Also, in some embodiments, the bill accounts for the cost that the virtual network provider incurred to operate the MFNs (that implement the virtual network for the particular tenant) plus a rate of return (e.g., a 10% increase). This billing scheme is convenient for the particular tenant because the particular tenant does not have to deal with bills from multiple different public cloud providers over which the tenant's virtual network is deployed. The VNP's incurred cost in some embodiments includes the cost charged to the VNP by the public cloud providers. At 1530, the controller cluster also charges a credit card or electronically withdraws funds from a bank account for the charges reflected in the billing report.

At 1535, the controller cluster determines whether it has received new measurements from the measurement agents 205. If not, the process transitions to 1545, which will be described below. On the other hand, when the controller cluster determines that it has received new measurements from the measurement agents, it determines (at 1540) whether it needs to re-examine its routing graph for the particular tenant based on the new measurements. Absent an MFN failure, the controller cluster in some embodiments at most updates its routing graph for each tenant once during a particular time period (e.g., once every 24 hours or every week) based on received, updated measurements.

When the controller cluster determines (at 1540) that it needs to re-examine the routing graph based on new measurements that it has received, the process generates (at 1545) a new measurement graph based on the newly received measurements. In some embodiments, the controller cluster uses a weighted sum to blend each new measurement with the prior measurements in order to ensure that the measurement values associated with the links of the measurement graph do not fluctuate dramatically each time a new measurement set is received.

At 1545, the controller cluster also determines whether it needs to adjust the routing graph based on the adjusted measurement graph (e.g., whether it needs to adjust weight values for the routing-graph links, or add or remove links in the routing graph because of adjusted measurement values associated with the links). If so, the controller cluster (at 1545) adjusts the routing graph, performs path search operations (such as operations 1520) to identify routes between ingress/egress node pairs, generates route records based on the identified routes, and distributes route records to the MFNs. From 1545, the process transitions to 1550.

The process also transitions to 1550 when the controller cluster determines (at 1540) that it does not need to re-examine the routing graph. At 1550, the controller cluster determines whether it has to collect statistics regarding data messages processed and network/compute resources consumed. If not, the process returns to 1535 to determine whether it has received new measurements from the MFN measurement agents. Otherwise, the process returns to 1530 to collect statistics and network/compute consumption data, and to generate and send billing reports. In some embodiments, the controller cluster repeatedly performs the operations of the process 1500 until the particular tenant no longer needs a virtual network that is deployed across the public cloud datacenters.

In some embodiments, the controller cluster not only deploys virtual networks for tenants in the public cloud datacenters, but also assists the tenants in deploying and configuring compute node machines and service machines in the public cloud datacenters. The deployed service machines can be machines separate from the service machines of the MFNs. In some embodiments, the controller cluster billing report to the particular tenant also accounts for compute resources consumed by the deployed compute and service machines. Again, having one bill from one virtual network provider for network and compute resources consumed in multiple public cloud datacenters of multiple public cloud providers is more preferable for the tenant than receiving multiple bills from multiple public cloud providers.

Other embodiments use other deployment models to deploy dedicated or shared MFNs to implement dedicated or shared virtual networks over the network and compute infrastructure of two or more public cloud providers. For instance, in some embodiments, the virtual network provider allows one or more cloud service resellers to deploy dedicated or shared MFNs for one or more of their customers. In some embodiments, a dedicated virtual network is one that is established with dedicated MFNs that are deployed for one entity. On the other hand, in some of these embodiments, a shared virtual network is one that is established with shared MFNs that are deployed for use by multiple entities. Multiple segregated virtual networks for multiple entities can be defined over a shared virtual network in some embodiments.

Figure 16:
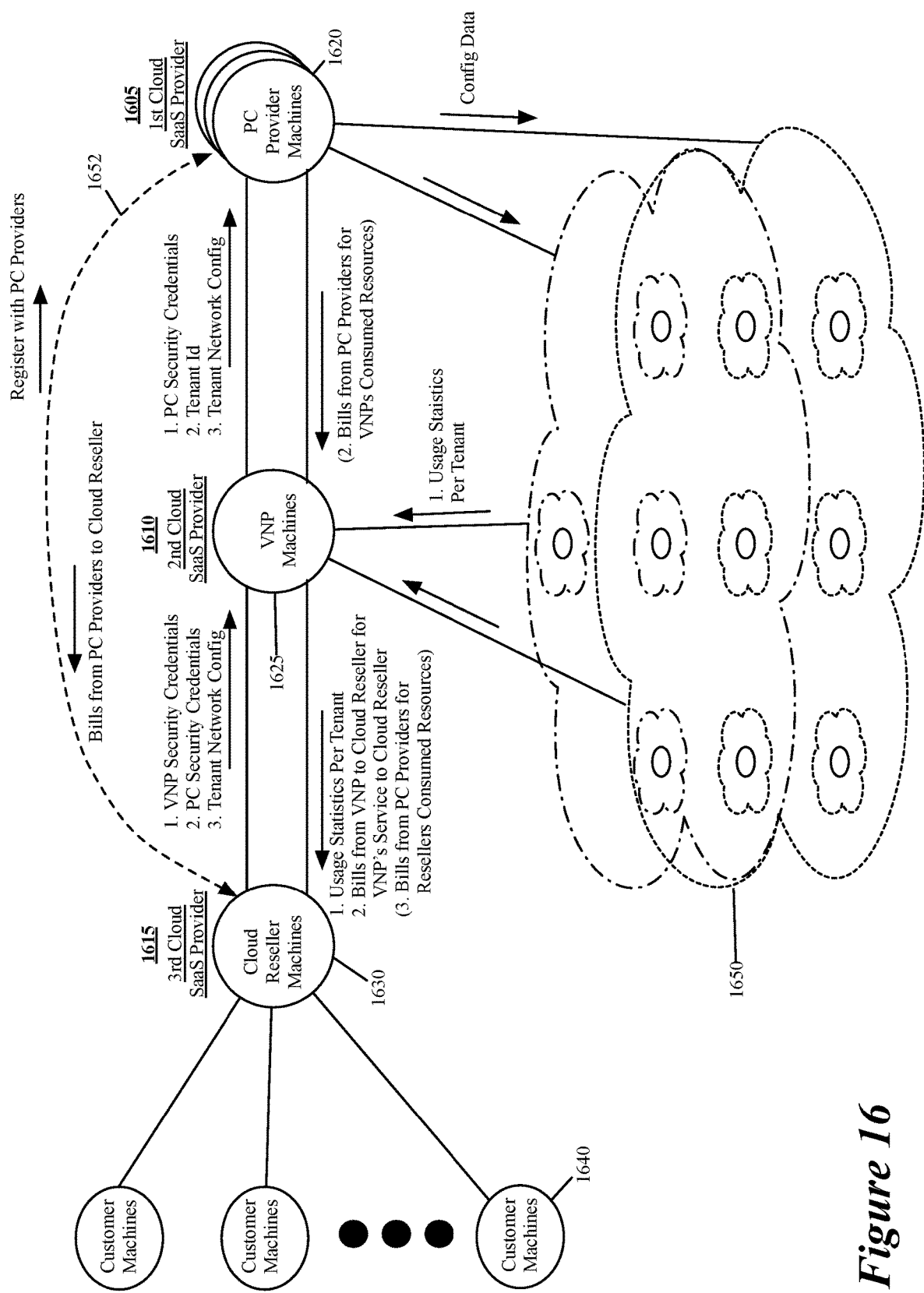
FIG. 16 illustrates a three-layer SaaS deployment model of some embodiments.

FIG. 16 illustrates one such deployment model. As shown, this deployment model uses three levels of SaaS providers 1605-1615 that provide three sets of SaaS services. The first SaaS layer 1605 is provided by one or more public cloud providers 1620 that provide compute and network infrastructure (e.g., compute elements (such as host computers, VMs and/or containers) and network elements (hardware or software switches, routers, middlebox elements, etc.) that connect the compute elements) in multiple different public clouds 1650. The second SaaS layer 1610 is provided by the VNP 1625, which provides the tools for deploying virtual networks across multiple public clouds 1650 for a cloud reseller. The cloud reseller 1630 provides the third SaaS layer 1615 to its customers 1640, which use the cloud resellers tools to define compute elements and network infrastructure (e.g., virtual network) to deploy across one or more public clouds 1650.

The cloud reseller 1630 in some embodiments has its own customer account with each of the public cloud providers. In some embodiments, the cloud reseller establishes its customer account with each public cloud provider directly (as identified by dashed arc 1652) and then provides security credentials for this customer account to the VNP provider 1625. In other embodiments, the cloud reseller establishes its public cloud customer account through the VNP provider's machines 1625. To direct the VNP to deploy a virtual network for one of its tenants over public cloud infrastructure, the cloud reseller machines 1630 initially provide the cloud reseller's VNP security credentials (e.g., username, password, certificate, etc.) to the VNP machines 1625 in order to authenticate the cloud reseller.

As shown, the cloud reseller also provides the desired network configuration to the VNP 1625. This configuration described the attributes of the virtual network that needs to be deployed for a tenant. In some embodiments, this configuration data also includes a tenant identifier that the cloud reseller 1630 uses for its customer for which it directs the VNP 1625 to deploy a virtual network. This tenant identifier in some embodiments is obtained from the VNP. In other embodiments, the configuration data includes a tenant identifier provided by the VNP, which the cloud reseller maps to its own tenant identifier for its tenant.

In some embodiments, the VNP machines 1625 provide the cloud reseller's security credentials to the public cloud machines 1620 when deploying virtual networks (e.g., when deploying MFNs, configuring MFN CFEs with proper routing records, etc.) for the reseller's customers. These security credentials (e.g., user name, password, security certificate, etc.) allow the VNP machines to authenticate themselves as machines operating at the behest of the cloud reseller (e.g., to logon onto the public cloud machines 1620 as if the cloud reseller machines 1630 are logging on to the public cloud machines 1620).

To deploy the virtual network for each tenant of the cloud reseller, the VNP machines also configure in some embodiments the components that form the virtual network (e.g., the MFN, MFN gateways/service boxes/CFEs, etc.) with the tenant identifier for the cloud reseller's tenant. In some embodiments, these configured components then associate the statistics that they collect (e.g., the routing statistics and deployment machine compute statistics) with the tenant identifiers, so that the cloud reseller's customers can be appropriately charged based on these statistics, as further described below.

In some of the embodiments in which the cloud reseller provides the tenant identifiers for its customers to the VNP machines 1625, the VNP machines 1625 map each tenant identifier provided by the cloud reseller 1630 to a unique tenant identifier of the VNP, and translate the VNP tenant identifiers for the collected statistics to the cloud reseller's tenant identifiers before providing the statistics to the cloud reseller. In other embodiments, the cloud reseller machines 1630 and/or VNP provider machines 1625 use tenant identifiers provided by the public cloud provider machines 1620.

The VNP machines 1625 uses the tenant network configuration data provided by the cloud reseller 1630 to deploy and/or configure the virtual network components (e.g., the MFNs, etc.) of the virtual network for each customer of the cloud reseller. In some embodiments, multiple different customers share the same virtual network and/or virtual network components. Conjunctively, or alternatively, the VNP machines 1625 in some embodiments can define a dedicated virtual network for any individual customer of the cloud reseller. As shown, the VNP machines 1625 deploy and configure the virtual networks and/or virtual network components through the public cloud provider machines 1620. In some embodiments, reseller, VNP, and public cloud machines 1620-1630 communicate with each other through their respective API interfaces and intervening network fabric (e.g., the Internet).

The VNP machines 1625 collect per tenant statistics from the deployment virtual network components (e.g., routing statistics from the CFEs and gateways, etc.), aggregate the statistics, and forward the aggregated statistics to the cloud reseller. In the embodiments in which the VNP machines map the reseller customer identifiers to VNP tenant identifiers, the VNP machines translate the tenant identifiers to the customer identifiers before supplying the aggregated statistics with the translated customer identifiers. Also, in the embodiments in which the VNP machines map the public cloud identifiers to VNP tenant identifiers, the VNP machines translate the public cloud identifiers to the VNP identifiers.

As shown, the VNP machines 1625 periodically send billing reports to the cloud reseller 1630 to collect fees for services performed by the VNP. In some embodiments, these billing reports charge the cloud reseller for the VNP's service fees for deploying virtual networks for the cloud reseller over two or more public clouds. These deployment charges include fees for performing ancillary operations in support of such deployments, such as measurement operations that produce measurements that quantify the quality and/or cost of links between MFNs in the public clouds and between external machine locations of the tenants.

Also, the VNP machines 1625 in some embodiments receive billing data from one or more public cloud providers for the cloud reseller. This billing data is associated with the cloud reseller's customer credentials (e.g., PC provider customer number for the cloud reseller) in some embodiments. The VNP machines 1625 in these embodiments pass along the billing data to the cloud reseller (e.g., with a markup adjustment or without a markup adjustment). In other embodiments, the public cloud providers send billing reports directly to the cloud reseller machines 1630, as shown by dashed lines 1652.

The cloud reseller machines 1630 in some embodiments uses the usage statistics provided by the VNP machines 1625 to charge its customers for the virtual networks. In some embodiments, the VNP machines 1625 not only deploy network infrastructure but also deploy compute infrastructure for the cloud reseller 1630. In some of these embodiments, the usage statistics reflects the used compute resources and the cloud reseller machines 1630 use these statistics to charge the reseller's customers. In some embodiments, the cloud reseller does not use the collected statistics to charge its customers, but rather charges its customers based on the compute and/or network configuration that the customer requested for deployment.

Figure 17:
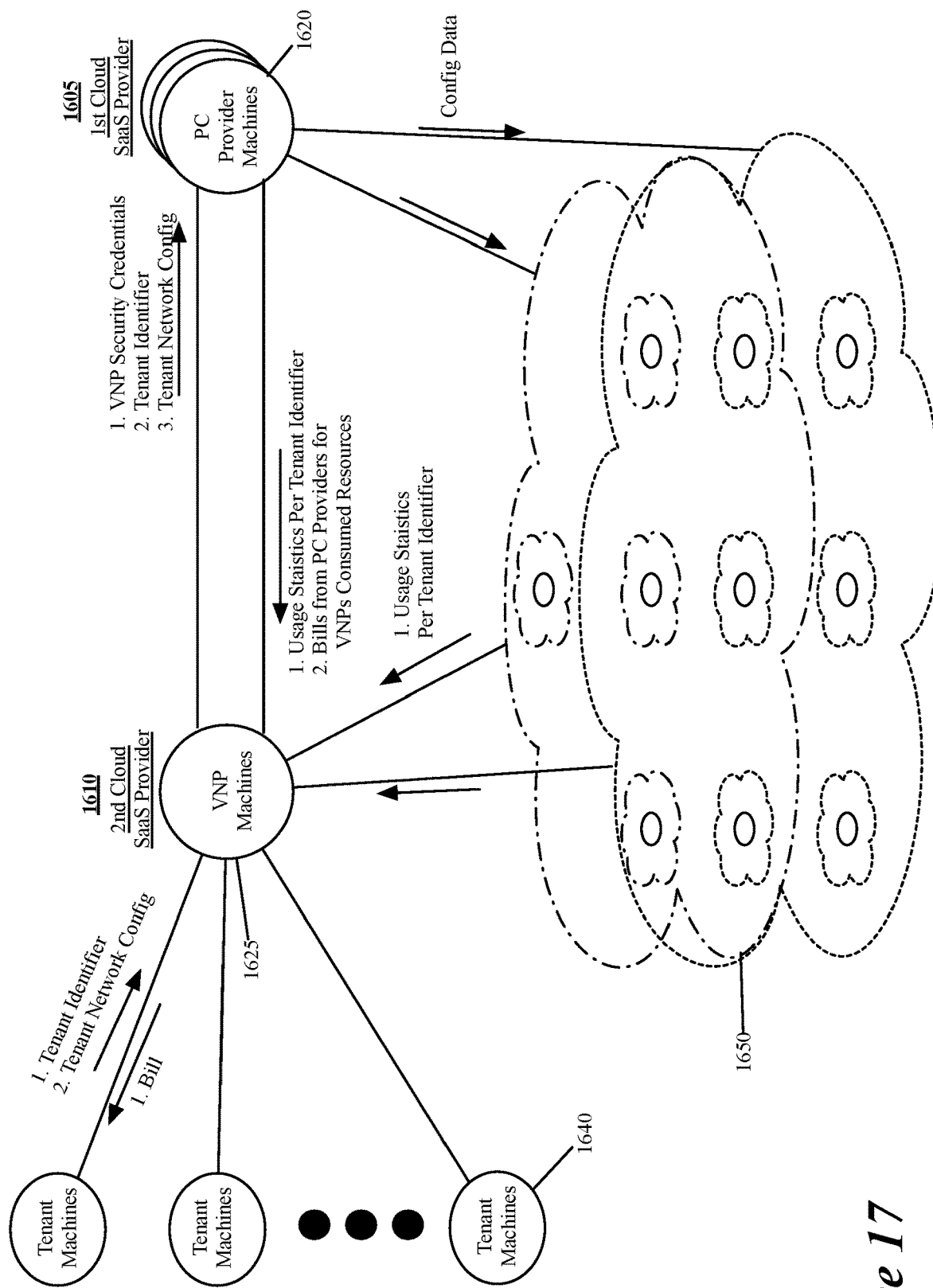
FIG. 17 illustrates a two-layer SaaS deployment model of some embodiments.

To further illustrate the differences between the three-layer SaaS deployment model of FIG. 16, FIG. 17 illustrates a similar diagram for the two-layer SaaS deployment model that was previously described above. This two-layer model of FIG. 17 does not have any cloud reseller 1615. Rather, in this two-layer model, the VNP's customers are entities that have the VNP deploy a dedicated virtual network just for them, or use a shared virtual network that the VNP has deployed for several customers. As described above, different customers can securely share the components the define the shared virtual network over one or more public clouds, as each customers network traffic is securely segregated from the network traffic of other customers. In some embodiments, multiple virtual networks are defined for multiple customers over the shared virtual network by using tenant identifiers to segregate the traffic of the different customers, as described above.

In the two-layer model of FIG. 17, the first SaaS layer 1605 is provided by one or more public cloud providers 1620 that provide compute and network infrastructure in multiple different public clouds 1650, while the second SaaS layer 1610 is provided by the VNP 1625, which provides the tools for deploying virtual networks across multiple public clouds 1650 for several of its customers. As shown, the VNP machines 1625 provide to the public cloud providers the VNP security credentials for the public clouds.

The VNP machines receive for each customer (associated with a tenant identifier) tenant network configuration data, and based on this data, deploy and/or configure the virtual network components (e.g., the MFNs, etc.) of the virtual network for each of its customers. As shown, the VNP machines 1625 deploy and configure the virtual networks and/or virtual network components through the public cloud provider machines 1620. In some embodiments, VNP and and public cloud machines 1620 and 1625 communicate with each other through their respective API interfaces and intervening network fabric (e.g., the Internet).

As further shown, the VNP machines 1625 collect per tenant statistics from the deployment virtual network components (e.g., routing statistics from the CFEs and gateways, etc.), and aggregate the collected statistics. The VNP machines 1625 periodically send billing reports to each of the VNP customers to collect fees for services performed by the VNP. As mentioned above, these fees in some embodiments include the fees that the public cloud providers charged the VNP for the resources (e.g., compute and/or network resources) consumed by the customer's virtual network, plus a certain markup percentage. The VNP machines identify the amount of resources by each customer's virtual network based on the statistics that these machines collect and aggregate for the customer's associated identifier. In other embodiments, the VNP machines pass through to each customer each public cloud provider's charge for the resources consumed by the customer's virtual network, plus a charge for each customer's use of VNP resources.

Some embodiments connect a multi-machine compute node (e.g., a branch office or datacenter) of a tenant to the tenant's public cloud virtual network through multiple connection links to multiple public clouds (e.g., multiple public cloud datacenters) of one or more public cloud providers. Having multiple links between the multi-machine compute node (MMCN) and the public cloud virtual network allows the virtual network to be highly available, as it can withstand the failure of one or more connection links. In some embodiments, one link is a primary link while each other link is a failover link. This approach also allows the best route to be established from each MMCN to each other MMCN or SaaS provider datacenter by selecting the best ingress node for entering the virtual network from the MMCN for the best routing path through the virtual network to the egress node for exiting the virtual network to another MMCN or SaaS provider datacenter.

The discussion below uses the term multi-homed MMCN to refer to a multi-machine compute node of a tenant that connects to the tenant's public cloud virtual network through multiple connection links to multiple public clouds of one or more public cloud providers. The discussion below also uses the term multi-homed SaaS datacenter to refer to a SaaS datacenter to which a virtual network associates multiple MFNs in one or more public clouds (e.g., multiple public cloud datacenters) of one or more public cloud providers. These MFNs in some embodiments are candidate egress nodes for routes that traverse through the virtual network to reach a SaaS provider. The use of two or more egress nodes to connect the virtual network of a SaaS datacenter is also advantageous in that it enables link failover support and it allows for the use of optimal routes between different pairs of external computer node (e.g., remote computer or MMCN) and SaaS provider datacenter.

In some embodiments, a SaaS datacenter does not need to initiate routes to multiple MFNs of the virtual network in multiple public cloud datacenters, even when the virtual network controllers 160 associate multiple MFNs with the SaaS datacenter. On the other hand, multi-homed MMCNs in some embodiments need to actively initiate routes through different links to the virtual network. To do this, providing a fallback capability is facilitated in a multi-homed MMCN by having an appropriate router with failover capabilities (e.g., by using a Cisco 2800 series).

For optimal routing, the multi-homed MMCN includes in some embodiments one or more computers or appliances that execute measurement processes to measure the performance (delay, loss etc.) between the MMCN and the different public cloud datacenters to which the MMCN can connect. In addition, the MMCN in some embodiments performs its overall routing operations based on routes that are defined by the centralized controller cluster (e.g., controller cluster 160) that defines the virtual network for an entity (e.g., for a tenant). To accomplish this, the multi-homed MMCN is equipped with SD-WAN capabilities (such as Velocloud and Viptela appliances) that operate as a part of the centralized control plane for deploying the virtual network. As mentioned above, the centralized control plane is implemented by a cluster of two or more controllers in some embodiments.

Figure 18:
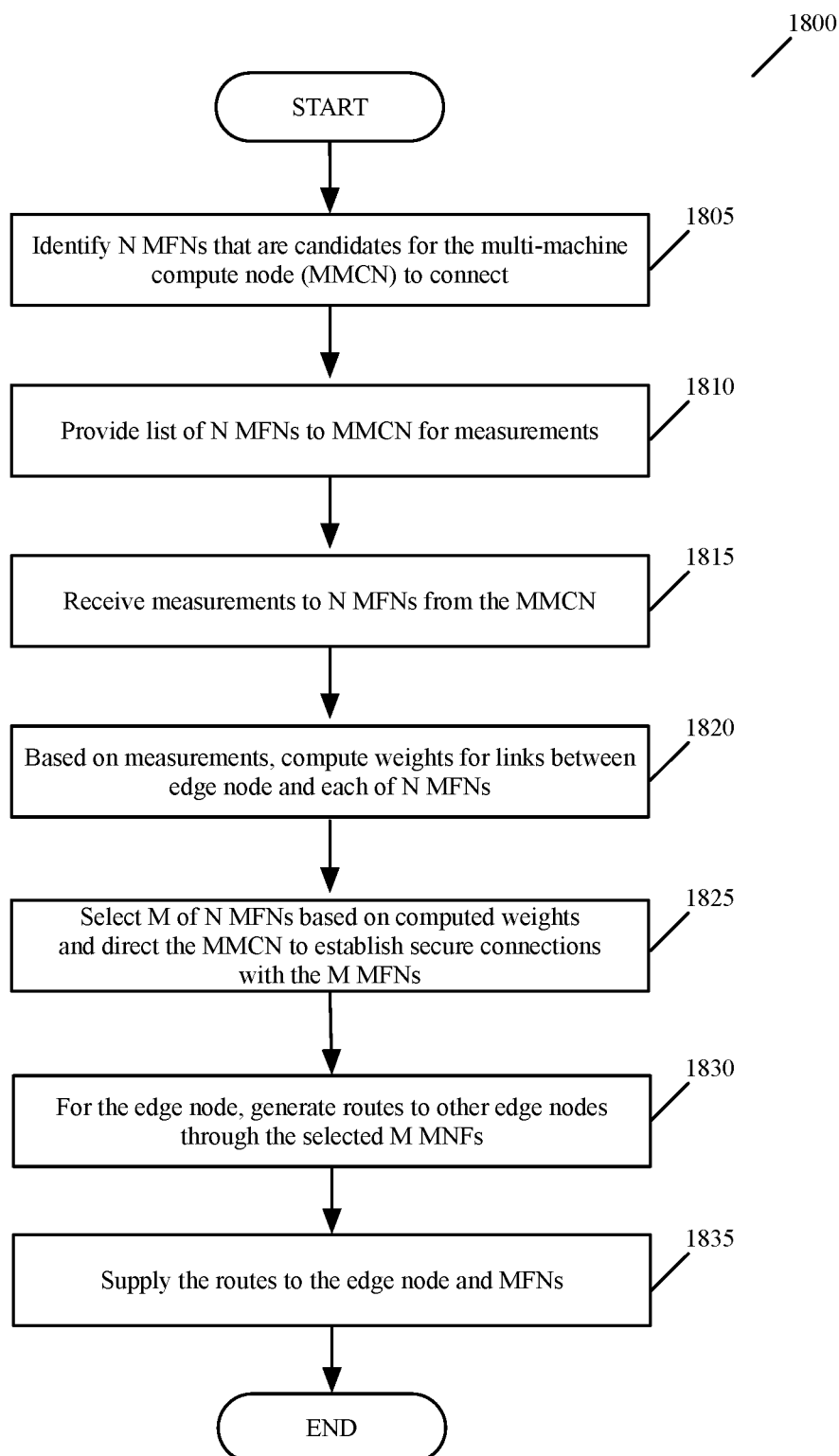
FIG. 18 illustrates a process used by the central controller cluster of some embodiments to define routes for a multi-homed, multi-machine compute node (MMCN).

FIG. 18 illustrates a process 1800 used by the central controller cluster of some embodiments to define routes for a particular multi-homed MMCN. This process uses a specialized router in the particular multi-homed MMCN to use the defined routes to perform routing operations that forward data messages from the MMCN to the virtual network through the multiple connection links. The specialized router is a software router or a cluster of software routers in some embodiment, while it is a routing appliance (e.g., SD-WAN appliance) in other embodiments. The specialized router or router cluster in the MMCN is referred to as the edge node of the MMCN in the discussion below. In some embodiments, the central controller cluster remotely controls the edge nodes of the MMCNs through the Internet.

As shown, the central controller cluster initially identifies (at 1805) a subset of N MFNs (e.g., 10 to 12) from N different cloud regions that are the closest to the particular MMCN edge node according to a DNS server service and the edge node IP address. The N MFNs in some embodiments have at least one candidate MFN from each cloud provider within a certain distance of the particular MMCN. Also, in some embodiments, each of the N MFNs includes a gateway (e.g., a branch gateway 225) to establish a secure connection link with the particular MMCN edge node.

Also, as mentioned above, the DNS server service in some embodiments is a service machine, or a cluster of several service machines, that operates in one or more public clouds and that provides DNS information to DNS servers of the MMCNs of an entity. In some of these embodiments, the DNS servers are operated by the virtual network provider or by another entity. In other embodiments, the DNS server service is a geo-IP service (e.g., of a third party) that resides outside of the public clouds that implement the virtual network and that can identify edge nodes in the public clouds that are near the particular MMCN for which the process 1800 is performed.

Next, at 1810, the controller cluster downloads the identified list to N nodes to the particular MMCN's edge node so that the MMCN's edge node can take measurements that quantify the quality of connections to each of the N MFNs in the list. In some embodiments, each MMCN edge node has a measurement agent (e.g., a process executing on one of the MMCN computers) that generates such measurements. This measurement agent generates measurement values differently in different embodiments. In some embodiments, the measurement agent sends pinging messages (e.g., UDP echo messages) periodically (e.g., once every second, every N seconds, every minute, every M minutes, etc.) to each of the measurement agents of the N MFNs in the list. Based on the speed of the reply messages that it receives, the MMCN measurement agent computes and updates measurement metric values, such as network-connection throughput speed, delay, loss, and link reliability. In some embodiments, multiple MFNs share one measurement agent (e.g., in the same datacenter or nearby datacenter of the public cloud provider hosting the MFNs).

In some embodiments, the particular MMCN's measurement agent periodically performs these measurements, and periodically sends the new measurements to the controller cluster so that the controller cluster can update its weight computations and route generations, as further described below by reference to 1820-1835. Also, whenever new MFNs are added in newly added or previously used public cloud datacenters, the controller cluster in some embodiments generates update lists of N candidate MFNs.

At 1815, the controller cluster receives the measurements taken by the particular MMCN's edge node. Based on these measurements, the centralized controller cluster computes (at 1820) a link weight for each connection link that connects the particular MMCN's edge node to each of the N MFNs. For instance, in some embodiments, the central controller computes each link's weight by using an exponential filter on the delay measurements and using the loss parameter as weight multiplier (e.g., doubling the weight for each 1% of loss).

Based on the computed weights, the central controller then identifies (at 1825) a subset of the M (e.g., 5 or 6) MFNs as the "home" nodes to which the edge node will be connected. In some embodiments, the M nodes are the nodes with the lowest weight values. In other embodiments, the M nodes are the nodes with the lowest weight values, but at least one representative MFN in each cloud provider is included in the M nodes. The list of M nodes may change with time and MFNs can be dropped and added to the list as new MFNs are added and/or as new measurements are received from the particular MMCN edge node. The controller cluster in some embodiments uses a "hysteresis" process to avoid frequent changes in the list of M MFNs. The hysteresis process in some embodiments uses previous state (i.e., previous members) of the MFN list to reduce the rate of adding/removing members to/from the MFN list. Also, in some embodiments, the controller cluster will not drop an MFN from the list unless another MFN has a 10% smaller average weight for a window (e.g., a time period) of measurements.

As mentioned above, the particular MMCN edge node in some embodiments maintains a secure connection (e.g., an IPsec connection) to the virtual network gateway of each of the M MFNs. In some embodiments, the controller cluster directs (at 1825) the particular MMCN edge node to establish secure connections with each of the M MFNs. At 1830, the controller cluster uses the computed weights of the selected M MFNs to identify optimal routes and failover routes for connecting the particular MMCN edge node with each other possible nodes for data message flows to traverse between the particular MMCN edge node and other MMCN edge nodes or SaaS provider datacenters through the virtual network. To generate such routes, the controller cluster in some embodiments uses shortest path route-identification processes, as described above.

In some embodiments, the controller cluster repeats its route identification process periodically, or whenever the computed weight values change (e.g., based on new measurements or addition/deletion of MFNs in the list of M MFNs). In some embodiments, the controller cluster performs the route identification operation (at 1830) for the particular MMCN edge node along with the route identification operation for other multi-homed MMCNs and/or multi-homed SaaS providers together, as multiple connection links to other MMCNs and to the SaaS providers would be relevant in identifying optimal routes to and from the particular MMCN. These computed routes also account for routes to/from virtual network MFNs that are candidates for connecting to remote devices (e.g., remote laptops, desktops, or mobile devices, such as smartphones, tablets, etc.).

After identifying these routes, the controller cluster supplies (at 1835) forwarding records for one or more routes to the particular MMCN edge node and the MFNs. For instance, in some embodiments, the controller cluster provides forwarding records (e.g., routing records that specify the next hop, routing records that specify the virtual network egress node, etc.) to particular MMCN edge node and to the MFN CFEs. By using these forwarding records to perform their routing operations, the particular MMCN edge node and MFN CFEs implement the optimal and failover routes defined (at 1830) by the controller cluster. In some embodiments, the controller cluster supplies new routing records to the particular MMCN edge node and the MFN CFEs whenever it identifies new optimal or failover routes.

In this manner, the process 1800 of FIG. 18 bases its routing computations on computed weight values that express the quality of the connection between the particular MMCN and each of its several connections to the virtual network. Under this approach, a different virtual-network ingress/egress node pair can be selected for the particular MMCN edge node and different MMCNs, different SaaS nodes and/or different remote devices. Because of this, the controller cluster in some embodiments performs the route identification operation (i.e., operation 1830) for one or more multi-homed MMCNs and/or multi-homed SaaS providers together, as mentioned above.

Figure 19:
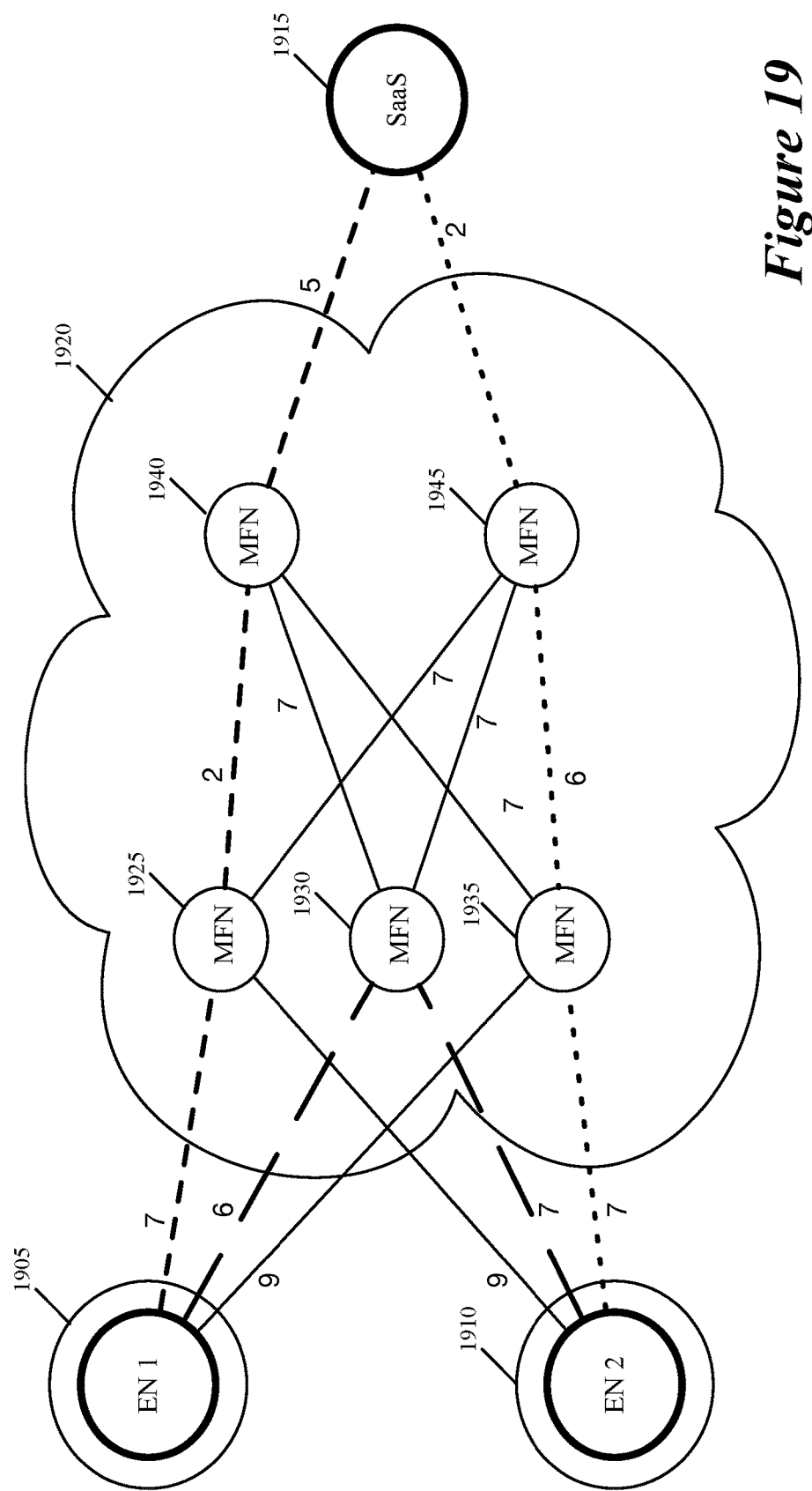
FIG. 19 presents an example of two branch nodes of two MMCNs and a SaaS datacenter.

FIG. 19 presents an example of two branch nodes EN1 and EN2 of two MMCNs 1905 and 1910 and a SaaS datacenter 1915. Each of the branch nodes connects to the virtual network 1920 through virtual-network MFNs 1925-1935 that are defined in three public cloud datacenters of two or three public cloud providers. The SaaS datacenter 1915, on the other hand, can be accesses through virtual-network MFNs 1940 and 1945. The weight measured between the relevant branch nodes EN1 and EN2, MFNs 1925-2545 and SaaS datacenter 1915 are depicted on the links between these nodes. In this example, it is assumed that other weights, like between nodes 1925 and 1935 are much higher (e.g. 10), so that no shortest path routing algorithm will use them in the best cost path.

As can be seen from this example, the best path from EN1 to the SaaS datacenter traverses nodes 1925 and 1940 as this path has a weight sum of 14, which is smaller than other weight costs of other paths. For instance, going through node 1930 will incur a smaller weight in the first hop but will result in a total minimal weight of 15. The optimal route from branch node EN2 will be through router 1935 and 1945 with a total weight of 15. Consequently, the two branches will use two different routes to reach the SaaS datacenter. To communicate between EN1 and EN2, the best route will be through MFN 1930 with a total weight of 13.

As mentioned above, some embodiments associate two or more virtual-network MFNs with each SaaS provider's datacenter. SaaS is a software distribution model in which a third-party provider hosts applications and makes them available to customers over the Internet. SaaS removes the need for organizations to install and run applications on their own computers or in their own datacenters. This eliminates the expense of hardware acquisition, provisioning and maintenance, as well as software licensing, installation and support. Also, rather than purchasing software to install, or additional hardware to support it, customers subscribe to a SaaS offering. Generally, they pay for this service on a monthly basis using a pay-as-you-go model. Transitioning costs to a recurring operating expense allows many businesses to exercise better and more predictable budgeting. Users can also terminate SaaS offerings at any time to stop those recurring costs.

SaaS offer high scalability, which gives customers the option to access more, or fewer, services or features without a need to provision or buy more computers. When there is a need to update the software, rather than purchasing new version or update the version the customer own, customers can rely on a SaaS provider to automatically perform updates and patch management. This further reduces the burden on in-house IT staff. Since SaaS applications are delivered over the Internet, users can access them from any Internet-enabled device and location. These advantages have made SaaS a very popular alternative to packaged software that is installed on customer premises using customer hardware. The SaaS providers may host the service on one or more servers in its private datacenter(s) or on one or more servers residing in one or more regions in the public cloud.

Typically, the SaaS provider is identified by the domain name of its service (e.g. www.myworkday.com). Often, there is a different domain name associated with the servers that run public web page of the SaaS provider (www.workday.com) than the ones that runs the SaaS application (www.myworkday.com). This domain name can be resolved through a DNS query to provide the IP address of the SaaS application server.

In case there are multiple servers, the DNS server may return a different IP address to two different requests that can be associated with different servers. The logic of the different name is from a location basis. If the SaaS provider has several regions in the world where it owns server, each requester will get back an IP server that is closer to it. Inside the same region, the DNS service can still select different servers according to a load balancing point of view; the IP address that is returned is associated with a different server in the same region. This latter case will return IP addresses for different servers who usually share the same IP subnet.

The controller cluster of the virtual network in some embodiments keeps a table of known IP SaaS addresses. When the virtual network gets packets from a customer, the destination IP can be of three different types. First, the packet can be associated with a private location of the entity (i.e., has a destination address in the private IP space of the entity). In this situation, the virtual network in some embodiments routes the packets to the corresponding compute node of the entity that is associated with the packet's destination address.

Second, the packet has a destination addressed that is a public (not private) IP address that is not known to virtual network. These IP addresses are referred to as generic public IP addresses. The virtual network in some embodiments sends such a packet to the Internet from the ingress virtual network node. Third, the packet has a destination addressed that is a public (not private) IP address known to virtual network to be an IP address of a SaaS provider. Such IP addresses are referred to as SaaS IP addresses. In some embodiments, such a packet will be routed from a first virtual-network node (e.g., first CFE of a first MFN) to a second virtual-network node (e.g., second CFE of a second MFN) from where it is provided to the SaaS IP in the shortest possible way in some embodiments.

Figure 20:
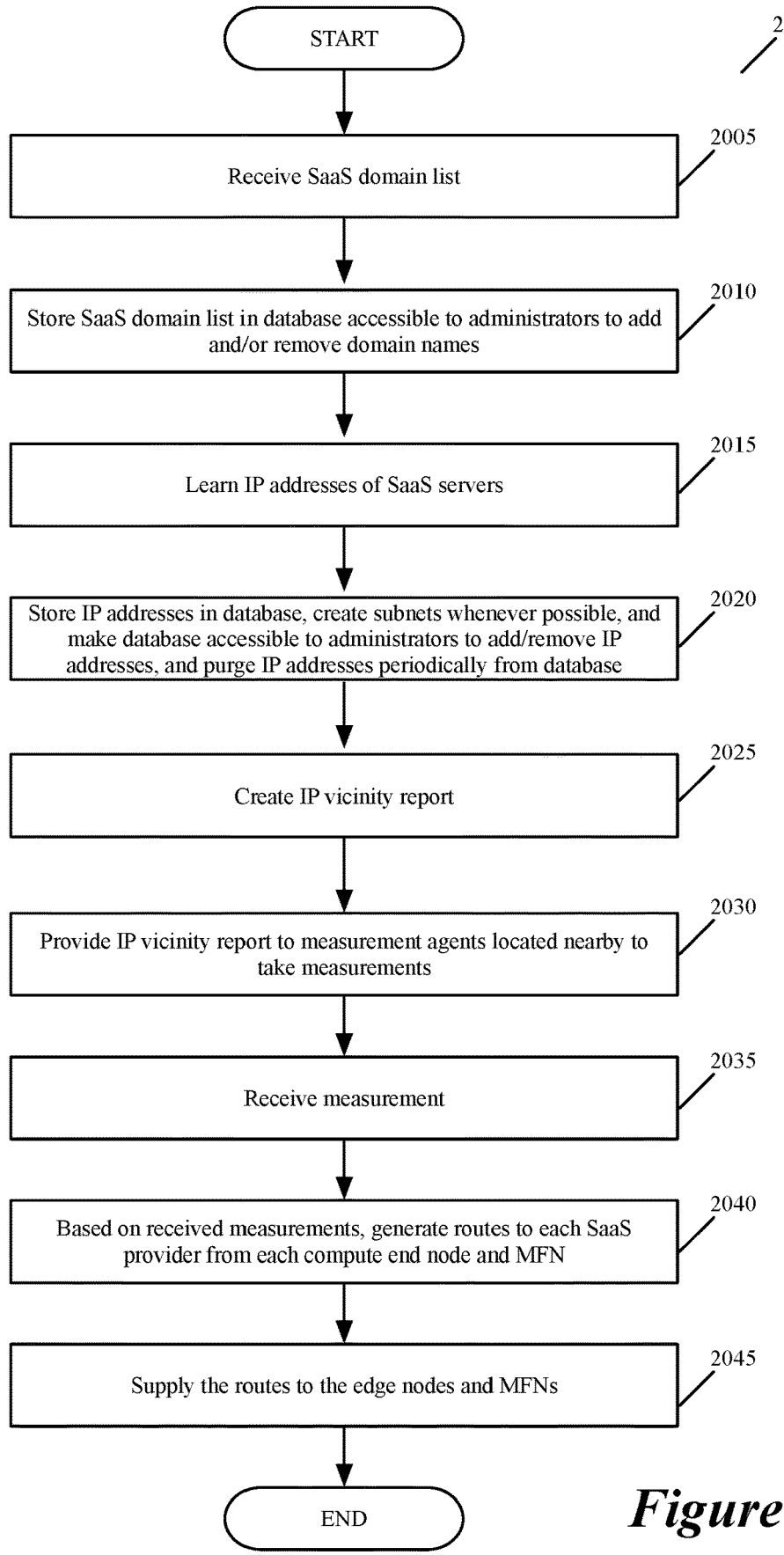
FIG. 20 illustrates a process used by the central controller cluster of some embodiments to define routes for multi-homed SaaS providers.

FIG. 20 illustrates a process 2000 used by the central controller cluster of some embodiments to define routes for multi-homed SaaS providers. This process identifies the various IP addresses associated with a SaaS service and identifies the shortest possible routes from different compute end nodes to one or more SaaS provider datacenters. As shown, the process 2000 starts (at 2005) in some embodiments when the controller cluster receives a SaaS domain name list. In some embodiments, the SaaS domain list is provided by the administrator of the public cloud virtual network provider, while in other embodiments this list is provided by an administrator of the entity for which the public-cloud virtual network is defined by the virtual network provider. The table below provides an example of such a SaaS list.

| | Name |
|---|---|
| 1. | login.adaptiveinsights.com |
| 2. | adobeid-na1.services.adobe.com |
| 3. | athenanet.athenahealth.com |

| | Name |
|---|---|
| 4. | login.bws.birst.com |
| 5. | account.box.com |
| 6. | centrify.com |
| 7. | identity.citrix.com |
| 8. | login.constantcontact.com |
| 9. | account.docusign.com |
| 10. | login.github.com |
| 11. | secure.gooddata.com |
| 12. | app.hubspot.com |
| 13. | login.huddle.net |
| 14. | hub.insidesales.com |
| 15. | login.marketo.com |
| 16. | system.netsuite.com |
| 17. | login.newrelic.com |
| 18. | login.microsoftonline.com |
| 19. | login.okta.com |
| 20. | login.oracle.com |
| 21. | myapps.paychex.com |
| 22. | login.salesforce.com |
| 23. | servicemax.cloudforce.com |
| 24. | hi.service-now.com |
| 25. | auth.tableausoftware.com |
| 26. | login.ultimatesoftware.com |
| 27. | support.veeva.com |
| 28. | login.xero.com |
| 29. | www.zendesk.com |

At 2010, the controller cluster stores the SaaS domain list in a database. In some embodiments, this database is accessible through one or more interfaces (e.g., web server interface and/or API interface) to administrators of the virtual network provider and/or of an entity (e.g., a tenant) for which the virtual network is deployed. Through this interface, an administrator can add or remove SaaS providers and/or associated domain names to the list.

Next, at 2015, the controller cluster learns as many possible IP addresses of SaaS servers associated with the domain on its list of domain names. To that end, the controller cluster in some embodiments directs different measurement agents 205 in the public clouds (that are deployed by the VNP for one or more virtual networks deployed over different public clouds) to execute DNS query for each domain name on the list. Such a query is repeated periodically (e.g. every 30 minutes). The measurement agents 205 transfer back (at 2015) to the controller cluster the IP addresses that they learn for each domain name.

Different measurement agents may return different IP addresses as many SaaS are using geographical DNS service to match an adjacent server with the client. The SaaS providers typically use Authoritative DNS Servers that have lists of SaaS servers and their locations. When such a DNS server gets a DNS request, it receives the measurement agent's IP address, and uses this IP address to Geo-IP map to identify the location of the measurement agent and returns the IP address of the "best" server for the measurement agent. In some embodiments, the measurement agent also provides the IP address of an end-compute node of the virtual network, and the DNS server used by the SaaS provider provides an IP address based on the end-compute node's IP address.

The controller cluster stores (at 2020) in a database the returned IP addresses along with their associated domain names. When at least some number of IPs (e.g., 5) belong to the same IP subnet (e.g., class C subnet that includes 255 or less different addresses), the controller cluster adds the subnet itself to the database. In some embodiments, this database is accessible through one or more interfaces (e.g., web server interface and/or API interface) to administrators of the virtual network provider and/or of an entity (e.g., a tenant) for which the virtual network is deployed. Through this interface, an administrator can add or remove IP addresses. This interface also allows the addition/removal of records associated with domain names that are added/removed by an administrator. Also, in some embodiments, the controller cluster purges IP addresses that are not reported as being used for a duration of time (e.g., every day, every several days, every week or every several weeks, etc.).

After 2020, the central controller identifies (at 2025) for each reported IP address that is received from the reporting measurement agents in one or more public clouds (reporting regions), a set of public clouds (nearby regions) that are near (i.e., within a threshold distance of) the reporting region. In some embodiments, the nearness of two regions are determined in terms of network distances that are measured separately between the regions. In some embodiments, the process 2000 uses third party DNS services to identify an approximate location for each IP address, and then uses the identified locations of the IP addresses to quantify a distance between two IP addresses. The list of the set of regions identified for all the reported IP address is referred to as IP vicinity report. When such operation is not done, the IP vicinity report will define all the virtual network regions as being near each IP address.

At 2030, the central controller provides the IP vicinity report to the deployed measurement agents 205 that are deployed by the VNP for one or more virtual networks deployed over different public clouds. Each measurement agent then periodically measures (e.g., once every several minutes or several hours) the distance between the measurement agent and each SaaS provider IP address that is identified as being near the measurement agent in the IP vicinity report. In some embodiments, the measurement agent computes this distance to an IP address in terms of the delay for initiating a TCP connection with a server at this IP address. When the server, having this IP address is responding, the time to that response is measured. Once a first response is accounted, the measurement agent actively terminates the TCP connection in some embodiments. In some embodiments, the measurement agent also counts the number of successful TCP connection events and/or lost packets. The measurement agent in other embodiments uses other measurement techniques, such as any one of the measurement techniques that were described above.

At 2035, the controller cluster receives the distance measurements from the measurement agents. Next, at 2040, the controller cluster uses the returned measurements (e.g., the delay and loss numbers reported from each measurement agent) to identify routes to each SaaS provider (e.g., to each SaaS IP address) from each possible ingress MFN and/or from each possible MMCN. To identify the routes, the controller cluster performs shortest path route-identification process in some embodiments that relies on the weight values that are computed based on the measurements to the different SaaS IP addresses, between different MFNs and to the different MMCNs.

In some embodiments, the controller cluster repeats its route identification process periodically, or whenever the computed weight values change (e.g., based on new measurements or addition/deletion of MFNs and SaaS IP addresses). In some embodiments, the controller cluster performs the route identification operation (at 2040) for the multiple MMCNs and SaaS IP addresses together, as multiple egress nodes associated with MMCNs and SaaS providers would be relevant in identifying optimal routes to any one SaaS provider.

After identifying these routes, the controller cluster supplies (at 2045) these routes to the MMCN edge nodes and the MFNs. For instance, in some embodiments, the controller cluster provides forwarding records (e.g., routing records that specify the next hop, routing records that specify the virtual network egress node, etc.) to the MMCN edge nodes and to the MFN CFEs. By using these forwarding records to perform their routing operations, the particular MMCN edge nodes and MFN CFEs implement the optimal routes defined (at 2040) by the controller cluster. In some embodiments, the controller cluster supplies new routing records to the MMCN edge nodes and the MFN CFEs whenever it identifies new routes.

In some embodiments, the SaaS IP addresses that are discovered by the above process are assumed to have a zero routing distance to the virtual network node to which they connect (i.e., are assumed to be virtually located in a public cloud region of the virtual network). In other embodiments, the routing links between public cloud regions and SaaS IP addresses have weights associated with them (as reflected in the example of FIG. 19), and these weights reflect the cost (e.g., measured delay and/or loss) associated with the path from those public cloud regions to the SaaS IP addresses. Under this approach, the best regions to connect to a particular IP address are the regions from which the computed weight values (i.e., the cost measured in terms of packet delay and loss) are small.

One rational for associating a SaaS IP address with more than one MFN CFE in more than one public cloud region is that the distance of the SaaS server to multiple regions is much smaller than the typical distance between regions. In addition, it might cost less to route traffic that is originating in one public cloud so it will stay till the egress node in the same cloud. In this case, the controller cluster in some embodiments binds each SaaS IP to at least one region in each public cloud as long as the cost (e.g., the delay and loss) from the nearest region is below some cost (e.g., the delay and loss) threshold. When the route identification process needs to calculate a shortest path to a certain IP address, it first looks to which regions this IP address is bound, then it computes the shortest path from each egress node to the bound region. In some embodiments, the routing tables themselves in the routers do not need to include the external IP address as the data message will be carried in the tunnels until the destination egress node, which then will look up to the IP address in the tunnel.

As mentioned above, the computed weight value in some embodiments accounts for the cost of packet delay and/or loss in a link between two public clouds regions, between a public cloud region and a SaaS provider datacenter, or between a public cloud region and a tenant's compute end node. In other embodiments, the computed weight value for each such link is computed in terms of other types of parameters, such as the data throughput costs that are charged by the public cloud providers and/or the compute cost (for the compute elements used to implement the MFN components in the public cloud) that are charged by the public cloud providers.

In some embodiments, an entity can provide the VNP with input regarding which public clouds to use to deploy the entity's virtual network. This input in some embodiments is also accompanied with a request for the VNP to create a dedicated virtual network for the entity (e.g., for the VNP's tenant) over one or more public clouds of one or more public cloud providers. In some embodiments, the entity's input specifies the public cloud providers to use and/or the public cloud regions in which the virtual network should be defined. Conjunctively, or alternatively, this input in some embodiments specifies actual public cloud datacenters (PCDs) to use. The VNP in some embodiments supplements the set of public cloud datacenters identified for an entity through the entity's input with one or more PCDs that the VNP identifies as desirable datacenters to add to the entity's set of datacenters.

Figure 21:
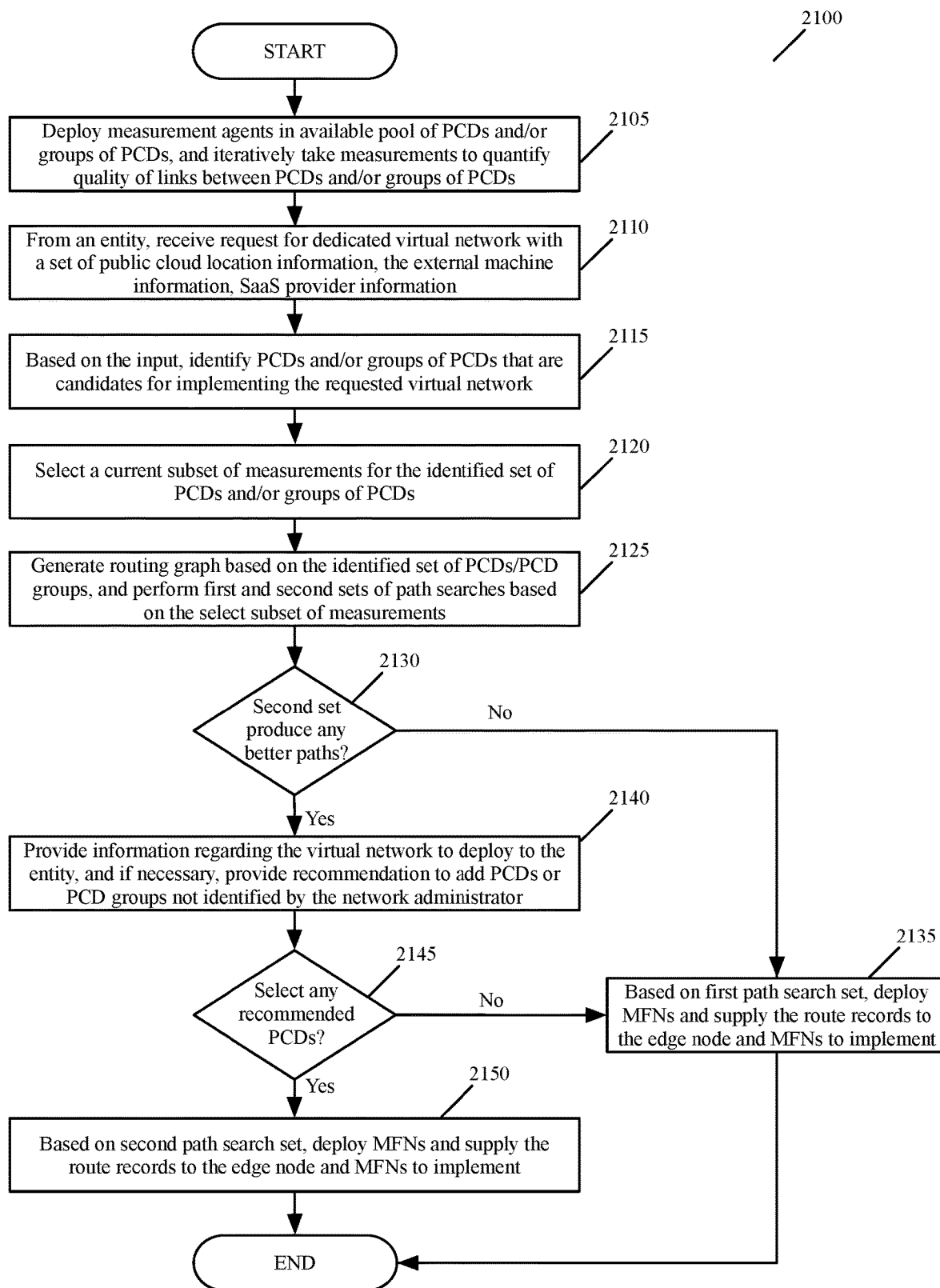
FIG. 21 illustrates a process that the VNP uses in some embodiments to deploy and configure dedicated MFNs to establish a dedicated virtual network for an entity that requests such a network to be deployed over a particular set of public cloud providers, a particular set of public cloud regions, and/or a particular set of public cloud datacenters.

FIG. 21 illustrates a process 2100 that the VNP uses in some embodiments to deploy and configure dedicated MFNs to implement a dedicated virtual network for an entity that requests such a network to be deployed over a particular set of public cloud providers, a particular set of public cloud regions, and/or a particular set of public cloud datacenters. For the entity, this process (1) identifies a set of public cloud datacenters of one or more public cloud providers to connect a set of machines of the entity, (2) deploys dedicated MFNs for the entity in the identified set of public cloud datacenters, and then (3) configures these MFNs to implement the dedicated virtual network that connects the entity's set of machines across its identified set of public cloud datacenters.

This dedicated virtual network is defined over the compute and network infrastructure of one or more public cloud datacenters. In some embodiments, the dedicated MFNs that are specifically deployed for one entity have the same attributes and perform the same operations (e.g., check for a tenant identifier in performing its forwarding operations) as the shared MFNs that are deployed and used by multiple entities. The only difference between the dedicated and shared MFNs in these embodiments is that the dedicated MFNs are used to process data messages for just one tenant, while the shared MFNs are used to process data messages for multiple entities.

As mentioned above, an MFN in some embodiments is a conceptual grouping of several different components in a public cloud datacenter that with other MFNs (with other groups of components) in other public cloud datacenters establish one or more overlay virtual networks for one or more entities. One of these components is a cloud forwarding element (CFE) that performs the next-hop forwarding needed to implement the paths through the virtual network. Also, in some embodiments, each MFN's group of components execute on different computers in the MFN's public cloud datacenter, while in other embodiments, several or all of an MFN's components execute on one computer of a public cloud datacenter. The components of an MFN in some embodiments execute on host computers that also execute other machines of other tenants, such as virtual machines or containers of the VNP's tenants or other tenants of the public cloud providers.

In some embodiments, the entity's machines that are connected by the virtual network deployed by process 2100 are machines outside of any public cloud. In other embodiments, some of the entity's machines are in a public cloud, while other machines reside outside of the public clouds. Also, in some embodiments, the entity's machines include SaaS provider machines that the entity uses for certain SaaS operations.

Before receiving the entity's input, the process 2100 deploys (at 2105) measurement agents in one or more PCDs and/or PCD groups, and has these agents exchange messages in order to generate network measurements that quantify the quality of network connections between different pairs of PCDs, different pairs of PCD groups (e.g., between different public cloud regions or availability zones), and different pairs of PCD/PCD groups. Examples of network measurements that the process generates for a connection between two PCDs, two PCD groups, and/or a PCD and a PCD group include loss, delay, and jitter experienced on this connection, as well as the reliability and cost of the connection.

As described above, some embodiments measure the delay in a connection link between two PCDs and/or two PCD groups by measuring the round-trip time (RTT) for messages to be exchanged between two measurement agents in the two PCDs and/or PCD groups. Jitter in some embodiments is the derivative of the delay (e.g., of RTT). Loss in some embodiments is derived from the number of packets dropped in a particular time frame. Reliability in some embodiments is derived from loss, e.g., a lossy connection has a poor reliability score.

From the entity's network administrator, the process receives a request (at 2110) to deploy a dedicated virtual network. This request in some embodiments provides information regarding the location (e.g., network addresses) associated with the entity's machines that are located outside and inside of the public clouds that need to be connected through the virtual network. This location information includes the attributes (e.g., name, network address(es), etc.) of any office and datacenter that include multiple machines.

The locations of individual end compute node machines in offices and datacenters are not specifically identified in some embodiments, but rather are identified through their association with the offices and datacenters. The provided location information in some embodiments can also identify the location of one or more groups of one or more machines in the public clouds, as well as the identities (and in some cases the locations) of SaaS providers used by the entity.

In some embodiments, the request received at 2110 also specifies the public cloud providers to use and/or the public cloud regions in which the virtual network should be defined. Conjunctively, or alternatively, this input in some embodiments specifies actual public cloud datacenters to use. This input in some cases can specify multiple different public cloud providers, and/or PCDs and/or PCD groups of different public cloud providers.

Based on the input received at 2110, the process identifies (at 2115) a set of candidate PCDs and/or PCD groups over which the virtual network could be defined. In some embodiments, the identified set of PCDs and/or PCD groups include PCDs and/or PCD groups explicitly identified in the input received at 2110, and/or are PCDs and PCD groups of public cloud providers explicitly identified in this input. The process only includes these explicitly identified PCDs and/or PCD groups in some embodiments.

However, in other embodiments, the process includes (at 2115) in the identified set of candidate PCDs and/or PCD groups, other PCDs and/or PCD groups that might be desirable datacenters for the entity's virtual network. Specifically, to provide recommendation to the entity, the process 2100 in some embodiments supplements the set of public cloud datacenters identified for an entity through the entity's input with one or more other PCDs and/or PCD groups that the process identifies as desirable PCD and/or PCD groups to add to the entity's set of datacenters.

To identify this other PCDs and/or PCD groups, the process in some embodiments uses pre-configured rules that identify desirable PCDs and/or PCD groups for certain locations and/or regions (e.g., for the locations and/or regions specified by the entity and/or in which the entity's office and datacenters reside). These rules are defined in some embodiments based on previously deployed virtual networks for other entities and/or based on measurements continuously taken by the measurement agents that the VNP deploys in the different PCDs and/or PCD groups.

From the current set of network measurement generated by the measurement agents for all the public clouds in which they are deployed, the process selects (at 2120) the subset of network measurements that are for the PCDs and/or PCD groups identified at 2115. In some embodiments, any one network measurement (e.g., delay) for a connection link at any given time is a weight-blended average of measurement values (e.g., delays) generated for that connection link over a past duration of time (e.g., over the past few seconds, minutes, hours, days, etc.). Such an average smooths out the measurement values to ensure that the measurement values used are not too dependent on transient network conditions at any one given point in time.

Next, based on the identified PCDs and PCD groups, the process generates (at 2125) a routing graph by using one or more of the techniques described above by reference to FIGS. 3-5. At 2125, the process uses the routing graph to perform path searches that use the measurements selected at 2120 to identify a set of paths connecting the entity's machines (including SaaS machines to use) across the identified set of PCDs. To account for mobile device connections, the path searches also identify paths between all possible PCD pairs that can serve as ingress and egress nodes for paths across the dedicated virtual network.

To identify the paths, the process in some embodiments uses the measurements selected at 2120 to perform shortest path searches. In some embodiments, the process 2100 performs two sets of paths searches. A first set of path searches only considers the PCDs and PCD groups explicitly identified in or through the entity's request received at 2110. Another set of path searches in these embodiments not only considers the explicitly identified PCDs and PCD groups, but also includes the PCDs and PCD groups that the process identifies as potentially desirable at 2115.

As described above, the shortest path searches are based on weights assigned to links of the routing graph, with the weights being derived from the generated network measurements. Given that different network measurements are used in different embodiments, the shortest path searches are smallest-cost searches that identify optimal paths between machine endpoints (or between edge nodes) in the virtual network based on any one or more of different criteria (such as delay, jitter, loss, reliability, etc.). As mentioned above, the cost search criteria in some embodiments also includes one or more financial costs (e.g., compute cost, storage cost, networking cost) charged by the public cloud providers.

Some embodiments allow different entities to direct the process to use different combination of different types of criteria to cost the paths while it performs its path searches, e.g., one entity can direct the process to minimize message delay, another entity can direct the process to minimize message jitter, still another entity can direct the process to minimize loss and delay, etc. For each entity, the process in some embodiments custom configures its path search operations to optimize a set of criteria specified by the entity.

At 2130, the process determines whether the second set of path searches (that used both PCDs/PCD groups explicitly identified through the entity request received at 2110 and the other PCDs/PCD groups that the process identified at 2115 as potentially desirable) resulted in any path that was better for connecting two of the entity's machine endpoints (including endpoints for connecting to mobile devices) than any path produced by the first set of path searches (that only used PCDs/PCD groups explicitly identified through the entity request received at 2110).

If not, the process deploys (at 2135) dedicated MFNs for the entity in the PCDs and PCD groups that are used by the paths generated by the first set of path searches. These dedicated MFNs in some embodiments only forward data message flows for that entity. In some embodiments, the dedicated MFNs do not forward data message flows for any other entity other than the entity for which the process 2100 is performed. In other embodiments, these MFNs also carry VNP data message flows that the VNP needs to send and receive in order to manage the virtual network for the particular entity. In some embodiments, the process deploys one MFN for the entity in each PCD or PCD group used by the paths generated by the first set of paths searches. In other embodiments, the process can deploy more than one MFN for the entity in a PCD or PCD group when additional MFNs are needed to handle the traffic load.

To deploy an MFN in a PCD/PCD group of a public cloud provider, the process 2100 in some embodiments uses the APIs of the PCD's public cloud provider to direct the provider's server to add one or more machines that implement the different components of the MFN (e.g., its CFE, etc.). Similarly, other processes described herein deploy MFNs in PCDs/PCD groups by also using such APIs.

The process 2100 also configures (at 2135) these MFNs (e.g., the forwarding elements of these MFNs) to implement these paths by (1) using the identified paths to define forwarding rules (e.g., next hop records) that configure the MFNs and edge nodes (in multi-machine compute nodes of the entity) to forward data message flows along the different paths, and (2) distributing these forwarding rules to the MFNs and the edge nodes. To distribute the forwarding rules, the process in some embodiments provides the rules to a set of controllers, which then distribute them to the MFNs and edge nodes. In some embodiments, the process configures the edge nodes by communicating with these edge nodes (e.g., through service APIs or some other mechanism), or by using Border Gateway Protocol (BGP) when the edge nodes are not directly accessible by the VNP managers/controllers. After 2135, the process ends.

When the process 2100 determines (at 2130) that the second set of path searches resulted in at least one better path that uses one of the other PCDs/PCD groups that the process identifies as being potentially desirable at 2115, the process generates (at 2140) a report for display through a UI (user interface) management console or other interfaces (e.g., email, etc.), to provide a recommendation to the entity administrator to add other PCDs and/or PCD groups to the list of public clouds, PCDs or PCD groups explicitly identified by the entity in its request. In some embodiments, the recommended PCDs/PCD groups can belong to different public cloud providers than those specified by the entity, and/or can be in different regions than the PCDs/PCD groups specified by the entity.

The process 2100 in some embodiments also generates a report for display in a user interface even before deploying the MFNs at 2135 when the second set of searches do not produce any better paths, so that the entity administrator can review information about the virtual network that is to be deployed and provide modifications. In other embodiments, the process 2100 does not generate any such report before deploying the virtual network that it identifies based on the paths generated at 2125, but provides this report after the virtual network has been deployed. Also, in some embodiments, the process 2100 does not provide recommendations before deploying the dedicated virtual network, but only provides recommendations after deploying the dedicated virtual network to span the PCDs and/or PCD groups identified through the input received at 2110.

At 2145, the process determines whether the entity's administrator accepted any recommendation that the report presented at 2140. If not, the process transitions to 2135 to deploy and configure dedicated MFNs for implementing the paths generated through the first set of path searches. On the other hand, when the entity's administrator accepts one or more of the recommendations to add one or more PCDs/PCD groups, the process deploys (at 2150) dedicated MFNs for the entity in the PCDs and PCD groups used by the paths generated by the second set of path searches. In some embodiments, the process deploys one MFN in each PCD or PCD group traversed by a path identified through the second set of path searches. In other embodiments, the process can deploy more than one MFNs in such a PCD or PCD group when additional MFNs are needed to handle the traffic load.

The process 2100 configures (at 2150) the deployed MFNs (e.g., the CFEs of the MFNs) to implement the paths generated by the second set of path searches. To configure these MFNs, the process (1) uses the identified second search-set paths to define forwarding rules (e.g., next hop records) that configure the MFNs and edge nodes (in multi-machine compute nodes of the entity) to forward data message flows along the different paths, and (2) distributes these forwarding rules to the MFNs (e.g., the CFEs of the MFNs) and the edge nodes (e.g., the forwarding elements of these MFNs and edge nodes).

To distribute the forwarding records, the process in some embodiments provides the forwarding records to a set of controllers, which then distribute them to the MFNs and edge nodes. In some embodiments, the process configures the edge nodes by communicating with these edge nodes (e.g., through service APIs or some other mechanism), while in other embodiments it uses BGP or other routing protocols when the edge nodes are not directly accessible by the VNP managers/controllers. After 2150, the process ends.

In some embodiments, the VNP processes use the same forwarding scheme for both dedicated and shared virtual networks that they deploy. For instances, in some embodiments, these processes use the same double encapsulating approach for both dedicated and shared virtual networks. Other embodiments, however, use different forwarding schemes for dedicated virtual networks. For instance, when deploying a dedicated virtual network that spans the PCDs/PCD groups of one public cloud provider, some embodiments do not use the IP-based double encapsulation approach described above, but rather route the data messages by using a single encapsulation header as the tenant identifier is no longer used for the dedicated MFNs in some embodiments.

Figure 22:
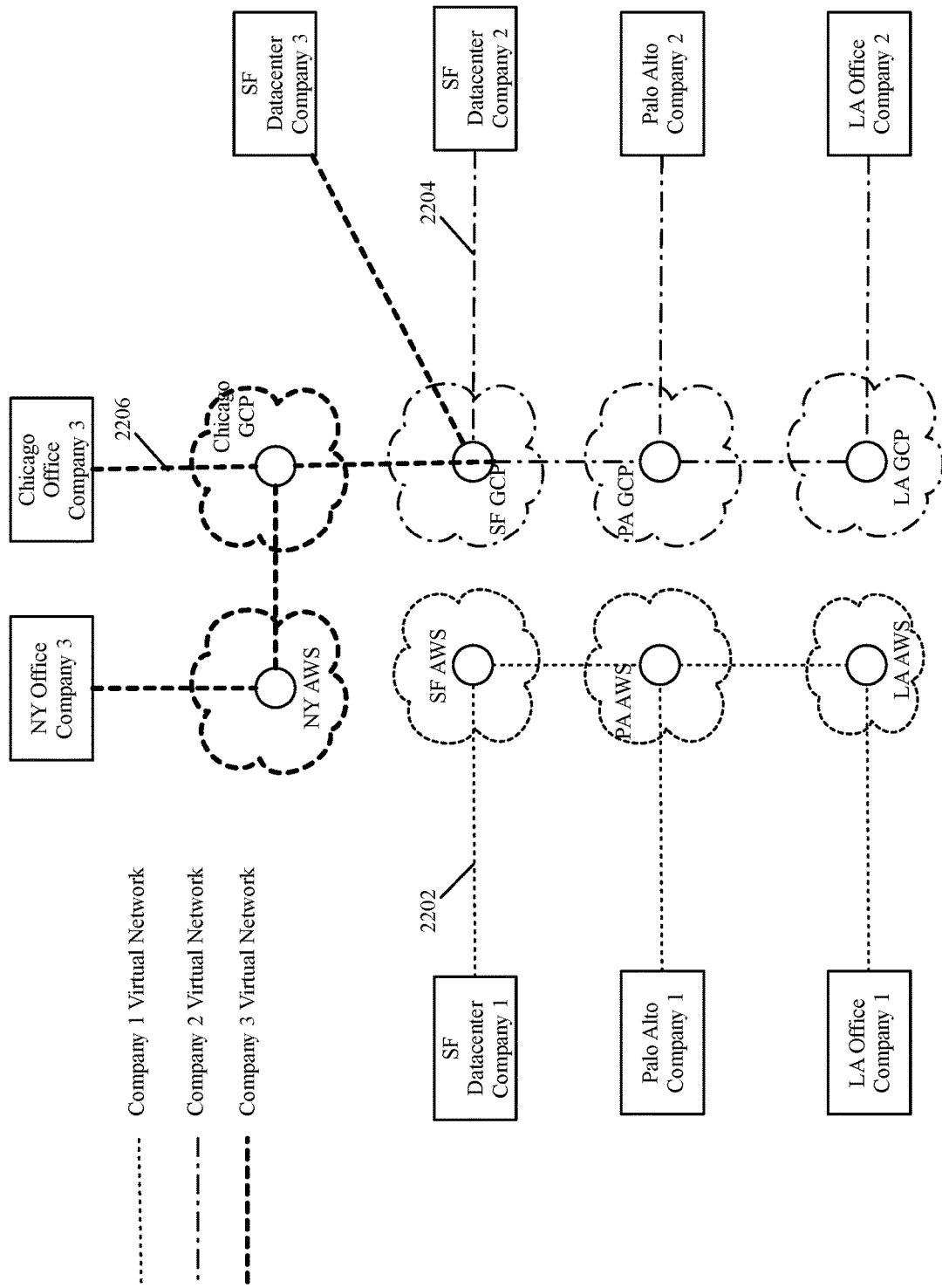
FIG. 22 presents an example that illustrates three different virtual networks deployed over several public clouds in the United States for three different companies.

When performed for different entities, the process 2100 can produce very different virtual networks for these entities as a starting input of this process is each entity's request to use a particular set of public cloud providers, a particular set of PCDs or groups of PCDs. FIG. 22 presents an example that illustrates three different virtual networks 2202, 2204 and 2206 deployed over several public clouds in the United States for three different companies. In this example, the first two companies have offices only in San Francisco, Palo Alto and Los Angeles, but they end up with two very different virtual networks 2202 and 2204 that span different datacenters as one picks Amazon's public cloud infrastructure, while the other Google's public cloud infrastructure. The third company in this example has its dedicated virtual network 2206 span San Francisco and Chicago Google PCDs and New York Amazon PCD.

Even after completing the process 2100 for an entity, one or more VNP processes monitor the network conditions and the virtual network deployed for the entity, and adjust or recommend adjustments to the virtual network that may be needed. For instance, in some embodiments, these processes repeatedly check the network measurements that the measurement agents iteratively generate. These network measurements are needed as the quality of the connections between and to the public clouds may change over time.

With new measurements, the VNP processes perform new path searches, which might result in new preferred paths through the public clouds, and/or deployment of new dedicated MFNs, for an entity. In some embodiments, the VNP processes make these changes automatically. In other embodiments, these processes generate recommendations to use these new paths and/or deploy new MFNs, and provide these recommendations for presentation through a UI management console or other interfaces (e.g., email, etc.) to the network administrators of the entity.

The VNP processes also perform new path searches, adjust the virtual network and/or generate new recommendations based on statistics that they collect from the dedicated MFNs that are deployed for an entity. In some of these embodiments, the VNP processes perform the new path searches based on both the collected statistics from the MFNs and new measurements from the measurement agents. Based on these new path searches, the VNP processes in some embodiments provide recommendation to add one or more public clouds, PCDs and/or PCD groups. Based on the analysis of the collected statistics and/or new measurements, the VNP processes in some embodiments also recommend removal of underutilized public clouds, PCDs and/or PCD groups.

Figure 23:
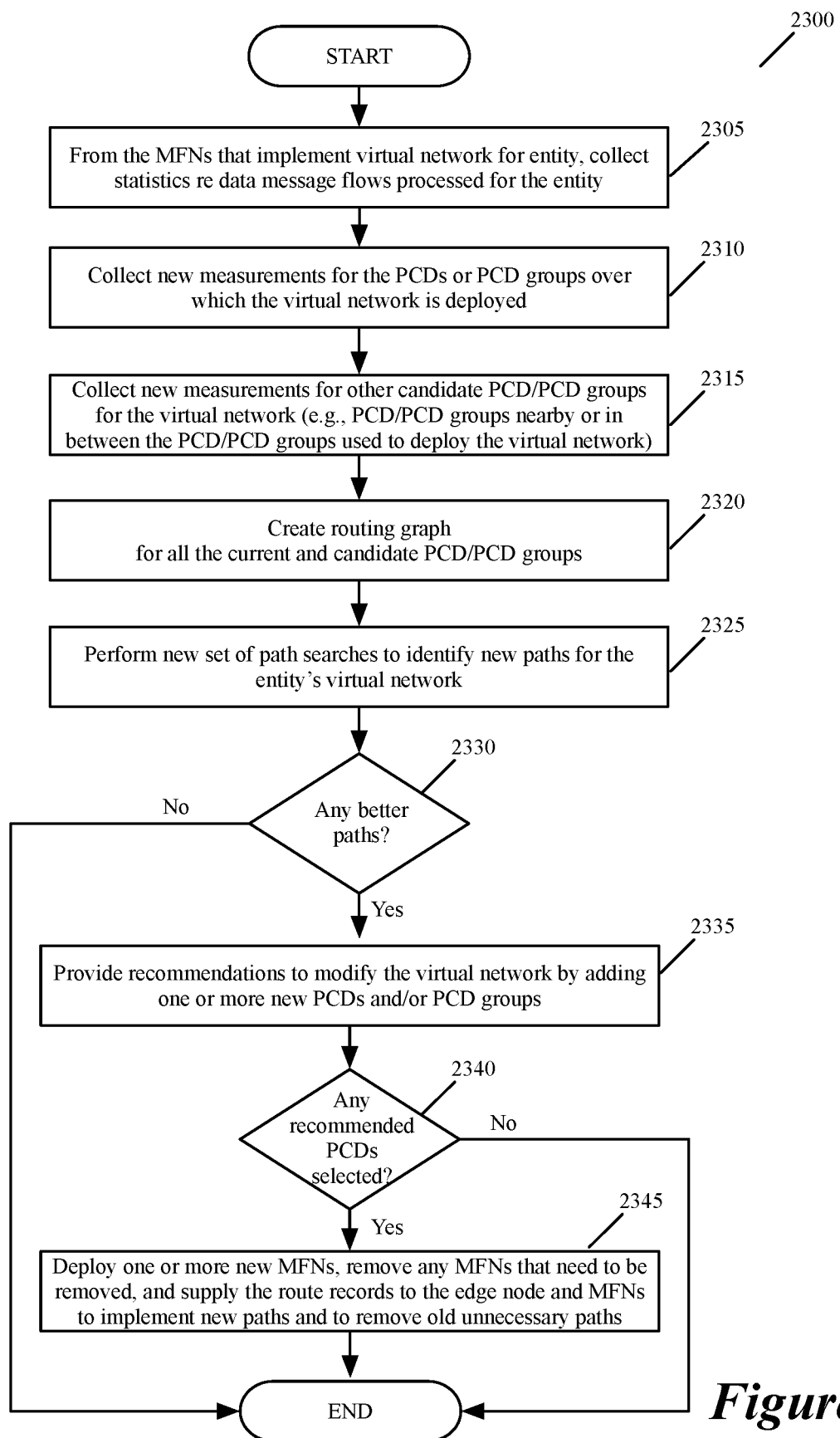
FIG. 23 conceptually illustrates a VNP process that produces recommendations to add MFNs based on collected statistics and new measurements.

FIG. 23 conceptually illustrates a VNP process 2300 that produces recommendations to add MFNs based on collected statistics and new measurements. In some embodiments, this process is performed iteratively (e.g., once every hour, few hours, a day, etc.) for each deployed virtual network of each entity. As shown, the process 2300 initially collects (at 2305) statistics from the MFNs and edge nodes that implement the virtual network of the entity. The collected statistics relate to the forwarding of the data message flows (e.g., number of data messages, number of bytes, delay in transmission of data messages, etc.) by the MFNs and edge nodes.

Next, at 2310, the process collects new measurement values generated by the measurement agents deployed in the PCDs or PCD groups in which the virtual network's MFNs are deployed (i.e., in the PCDs or PCD groups over which the virtual network currently spans). These measurements are network measurements for the connection between and to these PCDs and/or PCD groups. As mentioned above, any one network measurement (e.g., delay) for a connection link at any given time in some embodiments is a weight-blended average of measurement values (e.g., delays) generated for that connection link over a past duration of time (e.g., over the past few seconds, minutes, hours, days, etc.).

At 2315, the process identifies one or more candidate PCDs and/or PCD groups to add to current PCDs and/or PCD groups used to implement the virtual network, and collects network measurements that the measurement agents have generated for these new candidate PCDs and/or PCD groups. These measurements are network measurements for the connection between and to these PCDs and/or PCD groups.

In some embodiments, the candidate PCDs and/or PCD groups are PCDs and/or PCD groups that are nearby or in between the PCDs and/or PCD groups that are currently used to implement the virtual network. The candidate PCDs and/or PCD groups in some embodiments are identified from a look-up table that associates each PCD or PCD group (e.g., PCD or PCD group currently used by the virtual network) with other candidate PCD or PCD groups, or each connected pair of PCD and/or PCD groups (where each PCD/PCD group in a pair has an MFN exchange data message flows with an MFN in the other PCD/PCD group in the pair) with other candidate PCD or PCD groups. In these or other embodiments, the candidate PCDs and/or PCD groups are identified by identifying all PCDs and/or PCD groups that are within a threshold distance of PCDs and/or PCD groups currently used by the virtual network.

In some embodiments, the process 2300 does not identify new candidate PCDs/PCD groups for each current PCD/PCD group used by the virtual network. Rather, in these embodiments, the process 2300 only identifies candidate replacement PCDs/PCD groups for existing PCDs/PCD groups that are over congested, performing poorly, or on paths that are performing poorly. The process 2300 in some embodiments does not identify candidate PCDs or PCD groups that the entity has previously specifically rejected for the virtual network.

Based on the existing and candidate PCDs/PCD groups, the process creates (at 2320) a routing graph by using one of the approaches described above by reference to FIGS. 3-5. Next, at 2325, the process performs a new set of path searches to identify paths for connecting the entities machine endpoints (e.g., branch office, datacenters, mobile device access locations, etc.). To identify these paths, the process 2300 uses the path search techniques described above.

At 2330, the process 2300 determines whether the new set of path searches resulted in any path that is better for connecting two of the entity's machine endpoints than any path currently used by the virtual network. One path is better than another path in some embodiments if it has a better cost (e.g., smaller delay, fewer dropped packets, less jitter, more reliable, financial cost, etc.). The cost in some embodiments is a blended cost generated by blending multiple metric values (e.g., delay, dropped packets, jitter, reliability, financial cost, etc.). The metric values used in some embodiments are selected by the VNP processes, while in other embodiments they are specified by the entity. Also, some embodiments use the statistics collected at 2305 as the metric values or to generate the metric values for the current paths, while using the measurement generated by the measurement agents to generate the metric values for one or more portion of the newly identified paths. Some embodiments also use the measurements of the measurement agents to generate at least partially the metric values of the current paths.

When the process 2300 determines (at 2330) that each newly identified path is worse than its corresponding current path for connecting the same two entity machine endpoints, the process ends. Otherwise, the process generates (at 2335) a report for display through a UI (user interface) management console or other interfaces (e.g., email, etc.), to provide a recommendation to the entity administrator to add one or more candidate PCDs and/or PCD groups that improves the virtual network performance as gauged by the evaluated metric score.

The metric score in some embodiments includes the cost of the virtual network deployment. In other embodiments, the metric score does not include the cost. However, even in some such embodiments, the process 2300 provides (at 2335) a cost estimate for the virtual network with the recommendation that it provides to the network administrator of the entity. At 2335, the recommended PCDs/PCD groups can belong to different public cloud providers than those specified by the entity, and/or can be in different regions than the PCDs/PCD groups specified by the entity.

At 2340, the process determines whether the entity's administrator accepted any recommendation that the report presented at 2335. If not, the process ends. On the other hand, when the entity's administrator accepts one or more of the recommendations to add one or more PCDs/PCD groups, the process deploys (at 2345) new dedicated MFNs for the entity in the newly added PCDs and/or PCD groups. In some embodiments, the process deploys one MFN in each such PCD or PCD group. In other embodiments, the process can deploy more MFNs in a PCD or PCD group when additional MFNs are needed to handle the traffic load.

The process 2300 configures (at 2345) the newly deployed MFNs (e.g., the CFEs of the newly deployed MFNs) to implement one or more of the newly identified paths that were better than one or more previously used paths. It also reconfigures (at 2345) previously deployed MFNs (e.g., the CFEs of the previously deployed MFNs) to remove the older paths being replaced. To configure the newly deployed MFNs and reconfigure the previously deployed MFNs, the process (1) defines forwarding rules (e.g., next hop records) that configure the MFNs and edge nodes (in multi-machine compute nodes of the entity) to forward data message flows along the desired old and new paths, and (2) distributes these forwarding rules to the old and new MFNs and the edge nodes.

To distribute the forwarding rules (e.g., next hop records), the process in some embodiments provides the forwarding rules to a set of controllers, which then distribute them to the MFNs and edge nodes. When one or more old paths are removed, one or more previously deployed MFNs may no longer be needed. In such a case, the process terminates the operations of the unnecessary MFN(s). After 2345, the process ends.

Figure 24:
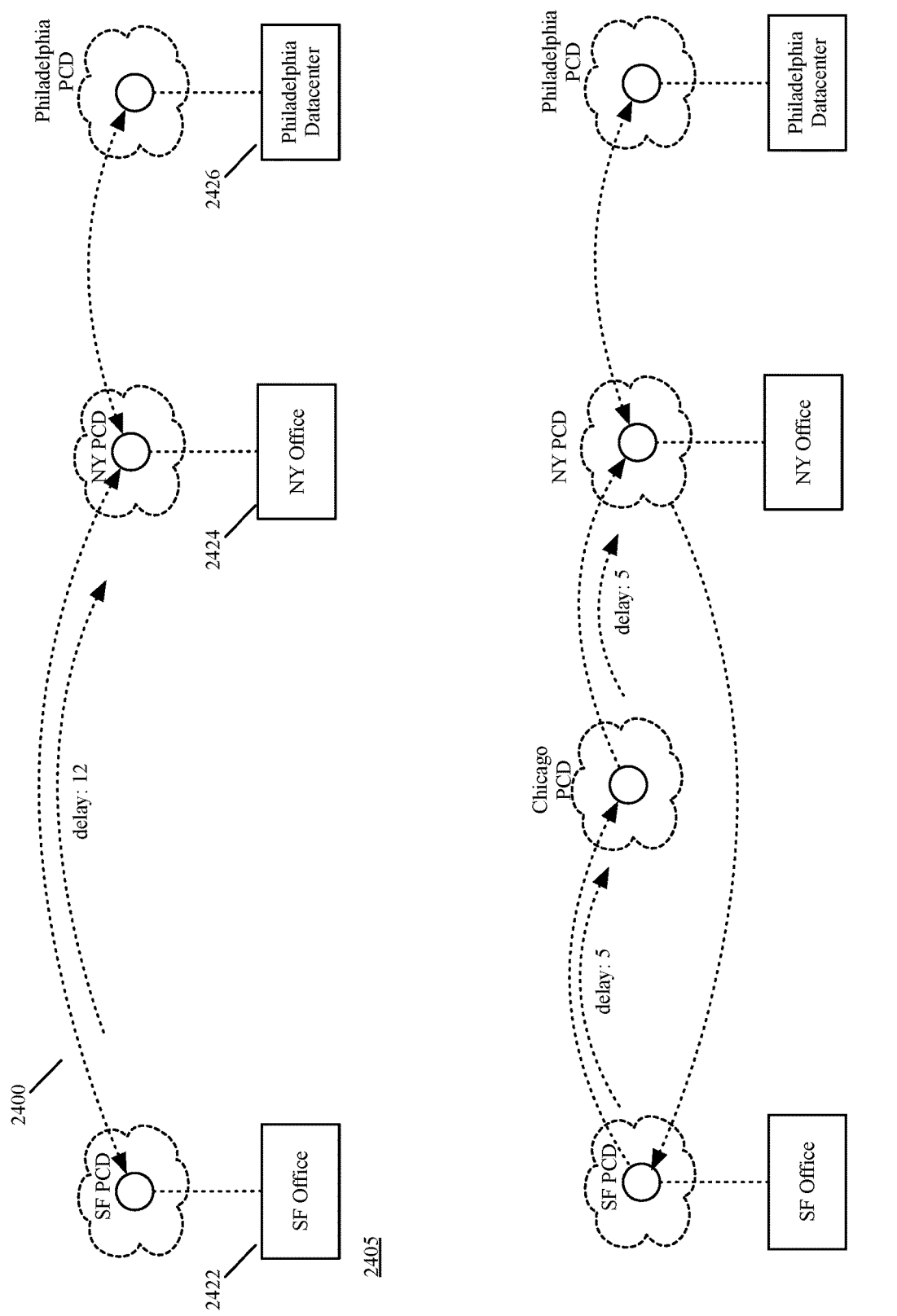
FIG. 24 illustrates an example of adding a new PCD to a virtual network to improve its performance.

FIG. 24 illustrates an example of adding a new PCD to a virtual network 2400 to improve its performance. This figure shows two operational stages 2405 and 2410 of the virtual network 2400. The first operational stage 2405 shows that after its initial deployment, the virtual network 2400 spans three PCDs of two public cloud providers in three cities, San Francisco, N.Y. and Philadelphia. This virtual network connects two branch offices 2422 and 2424 and one datacenter 2426 of a corporation.

The second operational stage 2410 shows the virtual network 2400 after it has been modified to add a fourth PCD in Chicago. This PCD has been added to improve the performance of the path between the San Francisco branch office 2422 and the New York branch office 2424. As shown in the first stage 2405, the point-to-point path between the San Francisco and New York PCDs has a weight value (e.g., a delay value) of 12, while the path from San Francisco to Chicago PCDs and the path from Chicago to New York PCDs has a combined weight value of 10. Hence, in this example, the Chicago PCD is added after the virtual networks deployment to improve the connection between the San Francisco and New York offices. However, in this example, the virtual network 2400 continues using the direct connection between New York and San Francisco offices for flows from New York to San Francisco.

Figure 25:
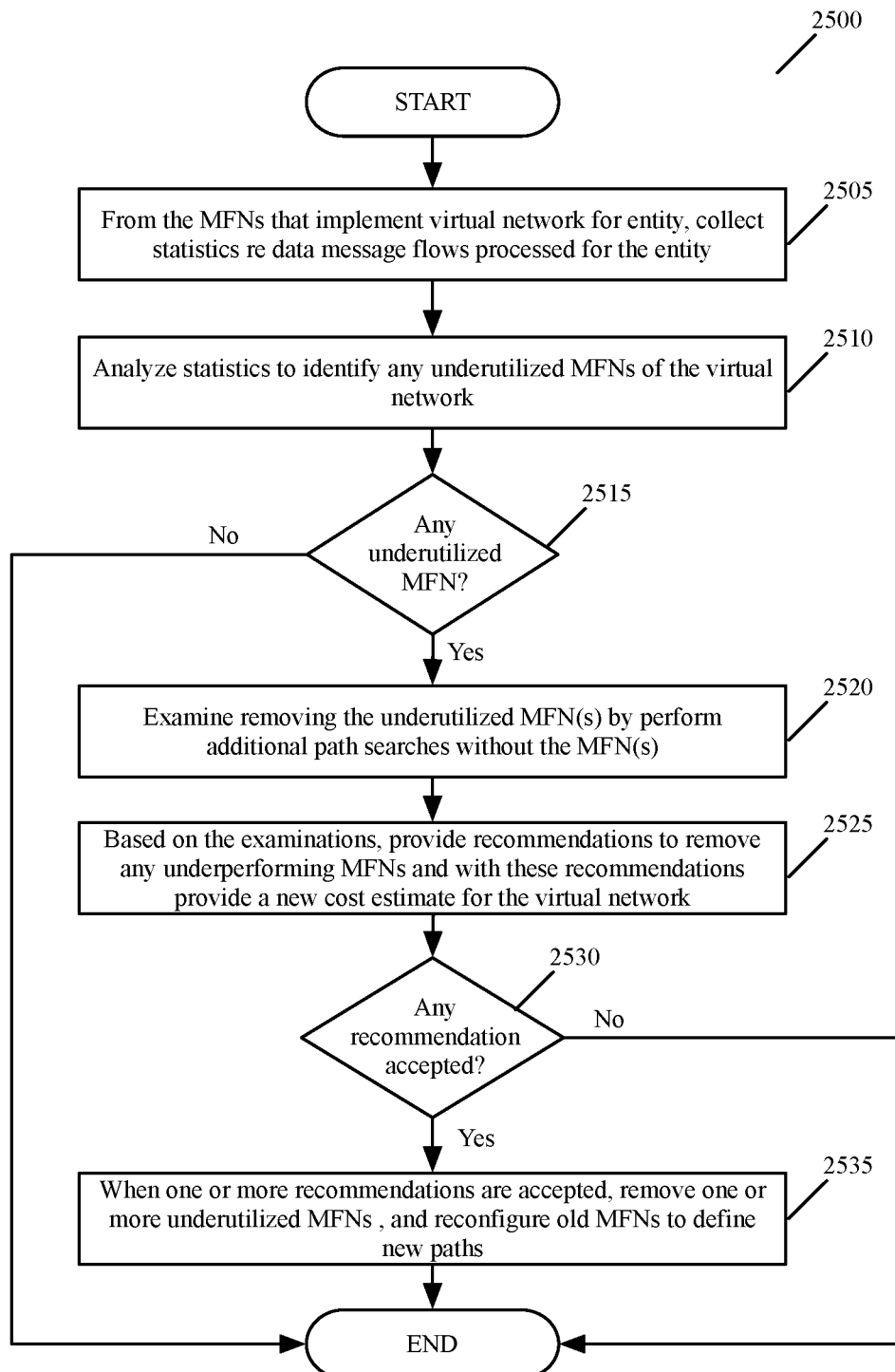
FIG. 25 conceptually illustrates a VNP process that produces recommendations to remove one or more underutilized MFNs.

As mentioned above, the VNP processes in some embodiments also recommend removal of underutilized public clouds, PCDs and/or PCD groups based on the analysis of the collected statistics and/or new measurements. FIG. 25 conceptually illustrates a VNP process 2500 that produces recommendations to remove one or more underutilized MFNs. In some embodiments, this process is performed periodically (e.g., once every hour, few hours, a day, etc.) or iteratively for each deployed virtual network of each entity. In some embodiments, the process 2500 is also performed iteratively based on other events, e.g., significant changes in data traffic, operation outage of a PCD, etc.

As shown, the process 2500 initially collects (at 2505) statistics from MFNs that implement the virtual network of the entity. The collected statistics relate to the forwarding of the data message flows (e.g., number of data messages, number of bytes, delay in transmission of data messages, etc.) by the MFNs during a particular time period. At 2510, the process 2500 analyzes the collected statistics to identify any underutilized MFNs of the virtual network. In some embodiments, an underutilized MFN is an MFN that, in the particular time period, processes a number of data message flows that fall below a certain threshold. In other embodiments, an underutilized MFN is an MFN that, in the particular time period, forwards less than a threshold amount of data (e.g., threshold amount of bits per second).

At 2515, the process then determines whether it identified any underutilized MFN at 2510. If not, the process ends. Otherwise, the process examines (at 2520) removing the identified underutilized MFN(s) by performing path searches without the identified MFN(s). When more than one underutilized MFN is identified, the process in some embodiments performs just one set of path searches by removing all the underutilized MFNs and identifying a set of optimal paths without any of the removed MFNs. In such cases with multiple underutilized MFNs, the process 2500 in other embodiments performs different sets of path searches with different combinations of one or more utilized MFNs removed. These different path searches enable the process to provide different recommendations based on different combinations of underutilized MFNs being removed.

Next, based on the path searches performed at 2520, the process generates (at 2525) a report for display through a UI (user interface) management console or other interfaces (e.g., email, etc.), to provide one or more recommendations to the entity administrator to remove one or more existing PCDs and/or PCD groups that improved the virtual network performance (as gauged by the evaluated metric score) or improve the virtual network cost.

In the embodiments that deploy one MFN in each PCD/PCD group, the PCD(s) and/or PCD group(s) identified in each recommendation are PCD(s) and/or PCD group(s) in which an underutilized MFN is deployed. In other embodiments, each recommendation in some embodiments is provided by reference to removing a specific MFN (e.g., when more than one MFN can be deployed in each PCD/PCD group). In some embodiments, the process 2500 not only recommends removal of underutilized MFNs, but also recommends removal of other MFNs based on other criteria. For instance, in some embodiments, removal of an intermediate MFN might result in better speed or delay performance of the virtual network as the intermediate MFN slows down its performance.

In some embodiments, each provided recommendation (at 2525) is accompanied with a cost estimate and/or one or more expected performance metric for the virtual network if the recommendation is accepted. For instance, a recommendation could say that if the recommendation is accepted and the virtual network is deployed based on this recommendation, the virtual network would cost $X less per month, but the one or more paths between one or more pairs of machine endpoints would worsen by a certain percentage as gauged by one metric (e.g., slower by as much as Y % more). When more than one path is affected by the removal of a particular combination of one or more MFNs in a particular recommendation, the recommendation also expresses how each one of these paths is affected (e.g., by providing for each path a metric score percentage that expresses how much the path would be worse or better).

At 2530, the process determines whether the entity's administrator accepted any recommendation that the report presented at 2525. If not, the process ends. On the other hand, when the entity's administrator accepts one or more of the recommendations to remove one or more PCDs/PCD groups, the process removes (at 2535) any MFN that is designated for removal in the selected recommendation. When the removed MFN is implemented by one or more machines that are deployed in a PCD, the process 2500 removes the MFN by using the API of the PCD's public cloud provider to direct the provider's server to remove the MFN.

At 2535, the process also reconfigures the remaining deployed MFNs (e.g., the CFEs of these MFNs) and/or edge nodes to implement one or more new paths (identified at 2520) to connect one or more machine endpoints each of which was previously connected by a prior path that used a removed MFN. Like the other above-described processes, the process 2500 in some embodiments reconfigures the MFNs and/or edge nodes by defining and distributing next hop forwarding rules (e.g., next hop records) to one or more remaining MFNs. After 2535, the process ends.

Figure 26:
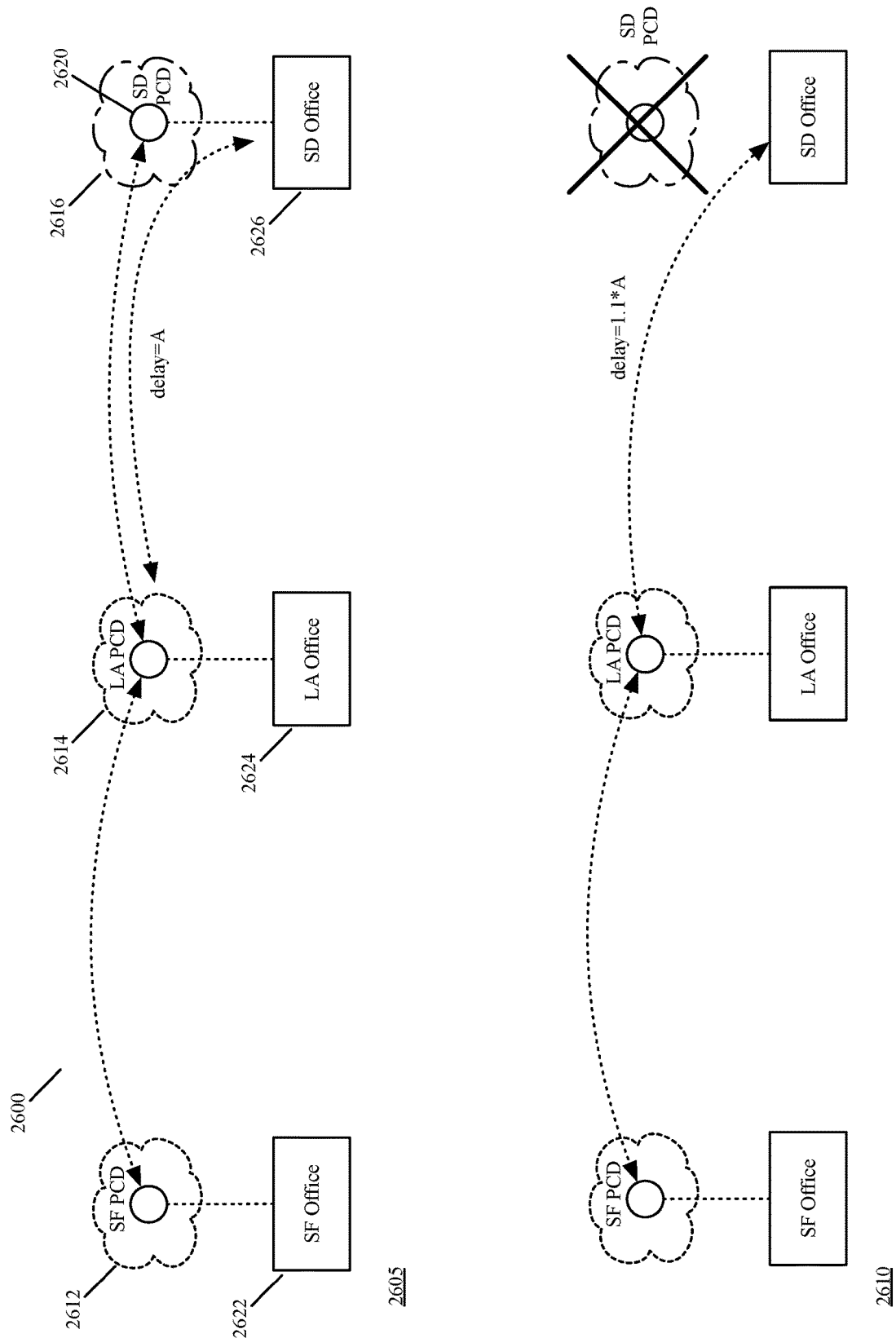
FIG. 26 illustrates an example of removing a PCD from a virtual network in order to remove an underutilized MFN in this PCD.

FIG. 26 illustrates an example of removing a PCD 2616 from a virtual network 2600 in order to remove an underutilized MFN 2620 in this PCD. This figure shows two operational stages 2605 and 2610 of the virtual network 2600. The first operational stage 2605 shows that after its initial deployment, the virtual network 2600 spans three PCDs 2612, 2614, and 2616 of two public cloud providers in three cities, San Francisco, Los Angeles and San Diego. This virtual network connects three branch offices 2622, 2624, 2626 of a corporation.

The second operational stage 2610 shows the virtual network 2600 after it has been modified to remove the PCD 2616 in San Diego. This PCD has been removed as its MFN 2620 is underutilized. With this PCD removed, the San Diego office 2626 connects to the PCD 2614 in Los Angeles. As shown in the second stage 2610, the path between the Los Angeles and San Diego offices 2624 and 2626 is 10% slower, but the monthly cost of the virtual network has been reduced by 30%. This is an acceptable tradeoff given the small number of data message flows to and from the San Diego office.

The VNP processes of some embodiments allows an entity with a dedicated virtual network to use other MFNs that have not been specifically deployed for the entity under certain circumstances. These other MFNs in some embodiments are shared MFNs as they are used to deploy different virtual networks for different entities, as opposed to the dedicated MFNs that are specifically deployed for the single entity to deploy just the dedicated virtual network for this entity. One example of using shared MFNs for an entity with a dedicated virtual network is for alleviating congestion at a particular location in the dedicated virtual network.

Specifically, the VNP processes of some embodiments allow for temporary usage of one or more shared MFNs when a portion of the entity's dedicated virtual network (e.g., one or more dedicated MFNs of the entity) appears congested or is expected to be congested. In some embodiments, these shared MFNs are part of a shared virtual network that the VNP provider deploys to handle traffic overflow for all dedicated virtual networks that it has deployed. In other embodiments, the shared MFNs not only handles the overflow data traffic of one or more entities with dedicated virtual networks, but are also used to defined multiple separate virtual networks for multiple other entities, with each of these virtual networks passing the primary data message traffic of its associated entities. Examples of such shared virtual networks were described above by reference to FIGS. 1-20.

Many embodiments are described above by reference to processes and operations of a virtual network provider. One of ordinary skill will realize that many of the above-described processes and operations are performed in other embodiments by one public cloud provider to define a virtual network that spans multiple of its PCDs and/or PCD groups. Alternatively, in some embodiments, each entity will operate network managers/controllers that perform these processes and operations to deploy the entity's virtual network over one or more PCDs/PCD groups of one or more PCPs.

For such network managers/controllers, some embodiments do not deploy and configure MFNs to implement virtual networks. Instead, these embodiments provide measurements that quantify connections between PCDs or PCD groups to other processes that deploy and configure MFNs. Some embodiments provide these measurements to other processes that perform other cloud-based operations, such as processes that deploy application machines in the public clouds and use the measurements to identify the best locations for such deployments. Other processes (e.g., an entity's network managers/controllers) use these measurements to perform other cloud-based operations itself (e.g., deploying application machines in the public clouds and using the measurements to identify the best locations for such deployments).

Figure 27:
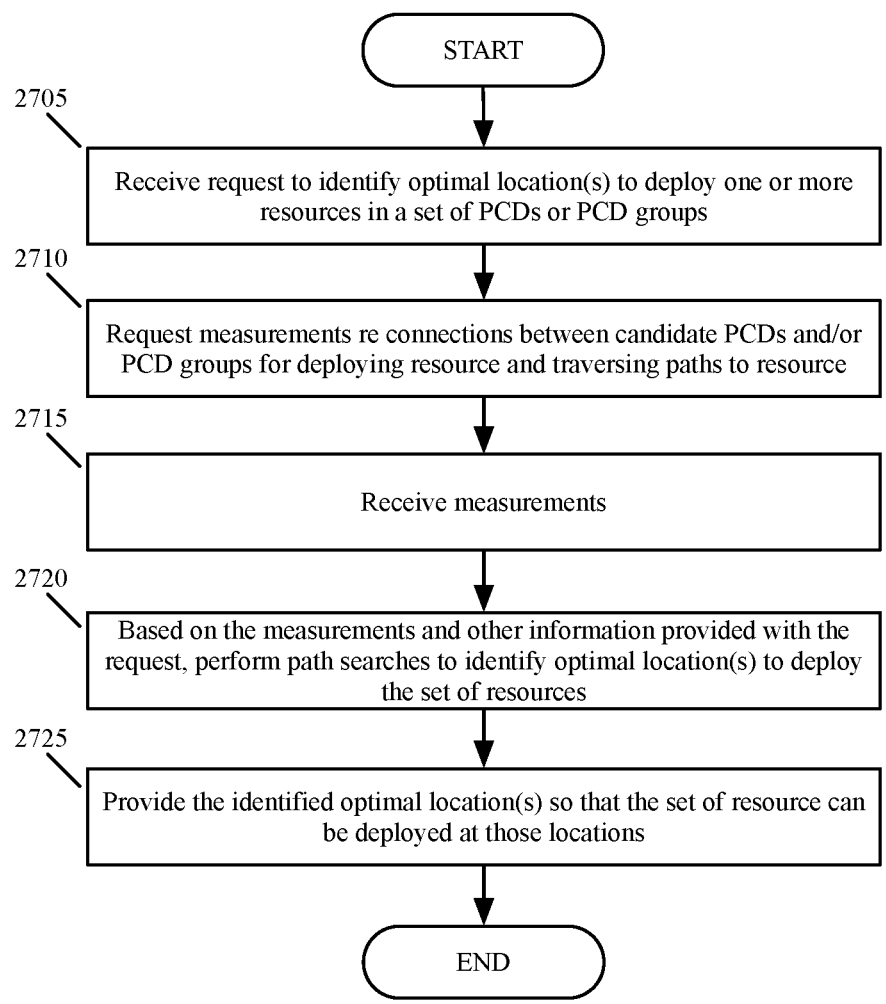
FIG. 27 illustrates a process that some embodiments use to deploy a set of one or more resource in optimal locations in the public clouds based on measurements generated by the measurement infrastructure of some embodiments.
Figure 28:
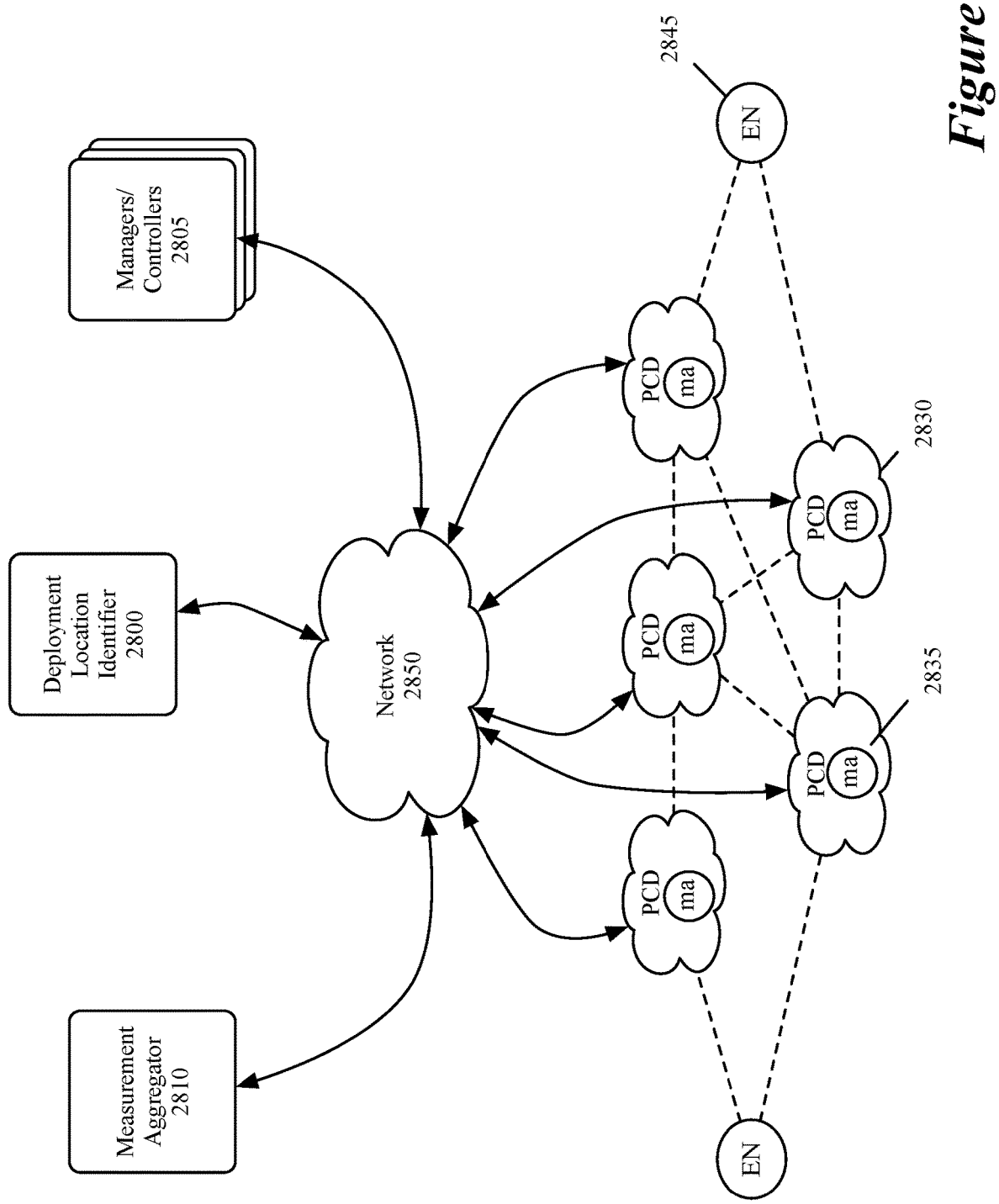
FIG. 28 several components that some embodiments use to identify optimal locations in public clouds.

FIG. 27 illustrates a process 2700 that some embodiments use to deploy a set of one or more resource in optimal locations in the public clouds based on measurements generated by the measurement infrastructure of some embodiments. The deployed set of resources can include any type of resource, such as compute resources (e.g., VMs, containers, servers, etc.), network resources (e.g., routers, switches, gateways, etc.) or service resources (e.g., any middlebox service machine or appliance, e.g., firewall, load balancer, etc.). However, in several examples provided below, the deployed resource is machine that executes an application or set of applications. In some embodiments, the process 2700 is performed by a deployment-location identifier 2800 illustrated in FIG. 28.

As shown in FIG. 27, the process 2700 starts when the deployment-location identifier 2800 receives (at 2705) a request for a server in a server set 2805 for an optimal location for deploying a machine (e.g., VM or container) to execute a particular application or a set of applications in one PCD among various possible candidate PCDs 2830. The server set 2805 in some embodiments is a set of one or more compute managers or controllers, which communicate with the deployment-location identifier 2800 through a network 2850 (e.g., a LAN, WAN or the Internet).

The received request in some embodiments provides (1) a list of candidate PCDs, PCD groups and/or PCP providers and/or (2) the locations (e.g., network addresses) of an entity's edge nodes 2845 that would access the machine that is to be deployed. In some embodiments, all or part of this information (i.e., the list of candidate PCDs, PCD groups and/or PCP providers, and/or the edge-node locations) is not provided with the request because the information was previously provided for an entity and hence is stored in a configuration database for the entity. To optimize machine location deployments for mobile device access locations, some embodiments define edge-node locations as locations of PCDs or PCD groups to which the mobile device typically connect. Also, the edge nodes in some embodiments are communicatively connected through a virtual network that is defined to span multiple of the PCDs and/or PCD groups. In other embodiments, no such virtual network is defined for connecting the edge nodes.

At 2710, the deployment-location identifier 2800 sends a request through the network 2850 to a measurement aggregator 2810 for a set of network-connection measurements between different pairs of PCDs and/or PCD groups that are candidate PCDs and/or PCD groups (1) for deploying the requested resource set or (2) for traversing to reach the deployed resource set. In the embodiments in which the request at 2705 does not provide the list of candidate PCDs and/or PCD groups (e.g., the request simply provides a list of PCP providers and/or network addresses of nodes for connecting to the PCDs), the process 2700 has to first identify the list of candidate PCDs and/or PCD groups before requesting the measurements at 2710.

To identify the candidate PCDs and/or PCD groups in such situations, the process 2700 in some embodiments uses a set of inputs that it receives with the request at 2705 to filter the list of available PCDs and/or PCD groups to discard PCDs and/or PCD groups that are not appropriate. For example, the server set 2805 in some embodiments provides two PCPs as acceptable PCPs and providers network addresses associated with offices in Northern California for accessing the deployed resource. In such a case, the deployment-location identifier would discard all PCDs and/or PCD groups that are not operated by the two acceptable PCPs, and then would discard the PCDs and/or PCD groups of these two acceptable PCPs that are outside of Northern California.

At 2710, the request that the deployment-location identifier 2800 sends to the measurement aggregator 2810 also requests in some embodiments a set of network-connection measurements that relate to the network connections between the different PCDs/PCD groups and the edge node locations of the entity (e.g., the MMCN locations of the entity). These measurements are used in some embodiments to express costs of links between the PCDs/PCD groups and the entity edge nodes. In some of these embodiments, the measurement agents not only ping other measurement agents in other PCDs/PCD groups, but also ping forwarding elements in the entity edge nodes to generate measurements between the PCDs/PCD groups and the entity edge nodes.

At 2715, the deployment-location identifier 2800 receives the measurements requested for the candidate PCDs and/or PCD groups from the measurement aggregator 2810. As described above, the measurement apparatus of some embodiments includes measurement agents 2835 in each of numerous PCDs and/or PCD groups 2830, and each such measurement agent continuously generates network measurements to quantify the quality of the network connections between its respective PCD or PCD group and PCDs/PCD groups of other measurement agents. The generation of such network measurements (e.g., delay measurements, jitter measurements, loss measurements, reliability measurements, etc.) was described above. In some embodiments, the measurement agents are deployed by the measurement aggregator. In other embodiments, the measurement agents are deployed by controllers and/or managers of the virtual network provider or another entity.

The measurement agents 2835 provide the network-connection measurements that they generate to the measurement aggregator 2810. In some embodiments, the measurement agents 2835 periodically push (forward) these measurements to the aggregator 2810, while in other embodiments periodically pulls (retrieves) these measurements from the agents 2835. The reporting periods are configurable in some embodiments, but typically are set for every hour, few hours (e.g., 6 or 12 hours), every day, etc.

In some embodiments, the measurement aggregator uses a weighted aggregation formulation (e.g., a weighted sum) to blend a new measurement for a network connection between a PCDs/PCD group pair (e.g., two PCDs, a PCD and a PCD group, or two PCD groups) in order to ensure that a new measurement does not solely define the quality of a network connection between the pair. The measurement aggregator 2810 is used in other embodiments as well, e.g., in the embodiments that deploy and configure MFNs to define virtual networks that span multiple PCDs/PCD groups for entities.

After receiving (at 2715) the network measurements, the process uses (at 2720) the received measurements to identify an optimal PCD or PCD group in which the requested set of resources should be deployed. To do this, the process 2700 performs a set of path searches to identify the deployment location that results in the best overall set of paths to the deployed location from all the locations that have to access the deployed set of resources. To identify the best overall set of paths, the process 2700 costs the paths based on one type of measurements (e.g., connection speeds) in some embodiments, while in other embodiments it costs the paths based on multiple types of measurements (e.g., connection speeds and packet loss).

To perform these path searches, the process 2700 in some embodiments not only uses the measurements regarding the network connections between PCDs/PCD groups, but also uses measurements regarding the network connections between PCDs/PCD groups and the locations (e.g., network addresses) of the entity that will access the deployed resource. For instance, in the example of FIG. 28, the deployment-location identifier 2800 uses the received set of measurements and the locations of the edge nodes 2845 to perform a set of path searches to identify an optimal PCD or PCD group in which the requested machine (for executing an application or application set) should be deployed for the edge node 2856.

Figure 29:
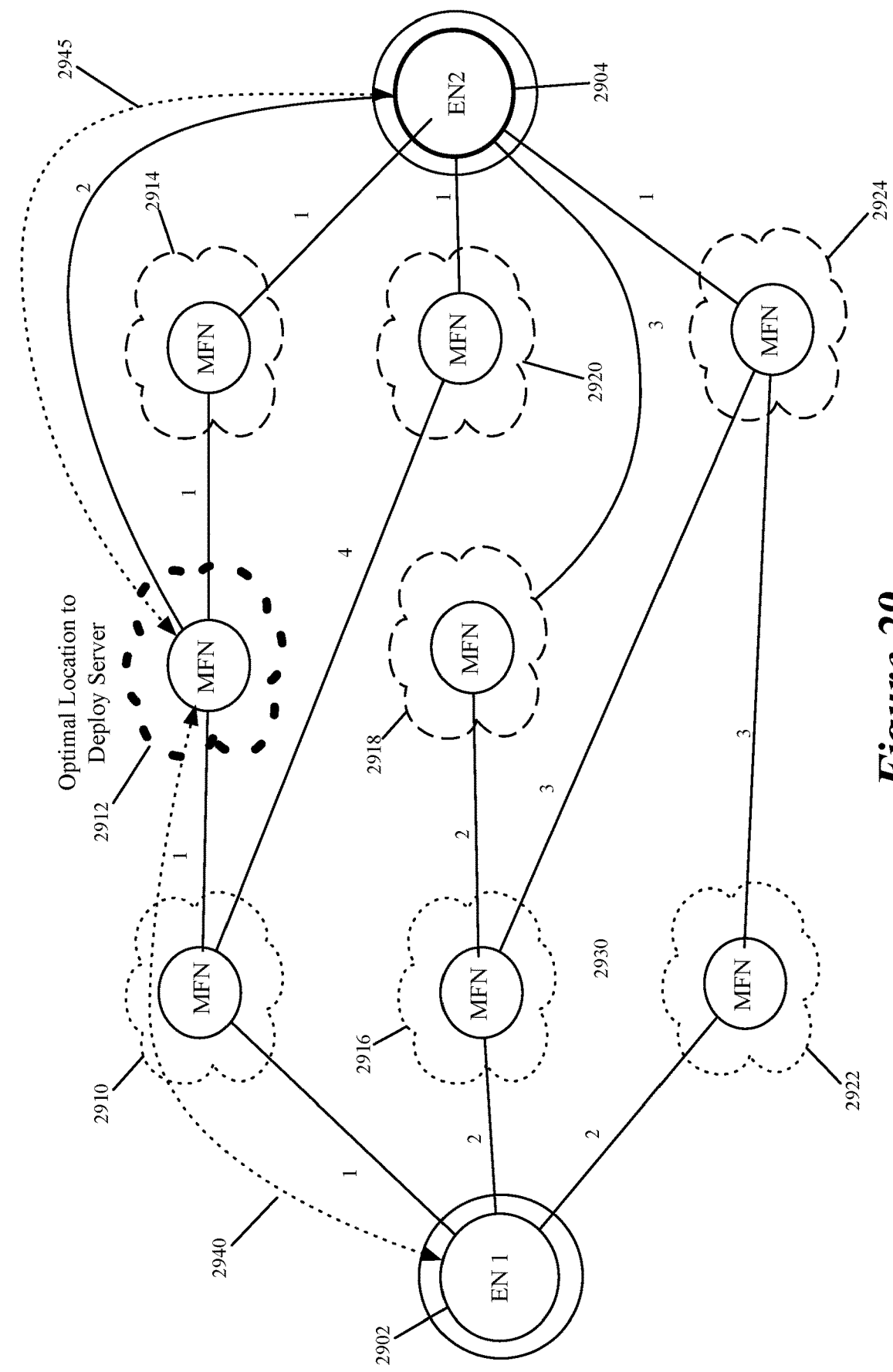
FIG. 29 presents an example that illustrates an optimal location for deploying a machine for a particular entity with a particular set of edge nodes that need to access the machine.

FIG. 29 presents an example that further illustrates an optimal location for deploying a machine for a particular entity with a particular set of edge nodes that need to access the machine. In this example, there are eight PCDs 2910-4426 that are candidate PCDs in which the machine can be deployed for access by two machines in two edge nodes 2902 and 2904. Also, in this example, it is assumed that at least one MFN #1530 can be deployed in each PCD to allow the data message flows to travel between the machines at the edge nodes and the deployed machine.

FIG. 29 also displays connection links between different pairs of PCDs and the cost of each link next to the link. In some embodiments, the cost of each connection link between two PCDs is derived from the network connection measurement that the measurement agents in these two PCDs generate for quantifying the quality of the network connection between the two PCDs. For example, the cost of 3 between PCDs 2922 and 2924 signifies that the network connection between these two PCDs is much worse than the cost of 1 between PCDs 2910 and 2912.

For this example, the deployment-location identifier 2800 would explore various paths for each edge node 2902 or 2902 to one of the PCDs. The deployment-location identifier then identified the PCD that results in the lowest cost sum of the two paths from the two edge nodes. In FIG. 29, this identified PCD is PCD 2912 as the sum of the costs of the path 2940 from edge node 2902 and the path 2945 from edge node 2904 is the smallest overall cost of any other pair of paths to any other PCD from the edge nodes 2902 and 2904. The overall costs for all path pairs are listed in Table 1 below:

TABLE 1

| Candidate PCD | Cost From 2902 | Cost From 2904 | Total |
|---|---|---|---|
| 4410 | 1 | 3 | 4 |
| 4416 | 2 | 4 | 6 |
| 4422 | 2 | 4 | 6 |
| 4412 | 2 | 2 | 4 |
| 4418 | 3 | 3 | 6 |
| 4414 | 5 | 1 | 6 |
| 4420 | 5 | 1 | 6 |
| 4424 | 5 | 1 | 6 |

In this example, PCDs 2910 and 2912 have the same overall cost as indicated in Table 1, but the PCD 2912 is selected based on other criteria (e.g., based on cost, based on physical proximity to both edge nodes 2902 and 2904, etc.).

In the example illustrated in FIG. 29, each edge node is treated the same as the other edge node. In practice, one edge node might need to access the deployed machine much more frequently than the other edge node. To facilitate this, some embodiments use weights to differentiate the access cost of the different edge nodes. For instance, if a first edge node will have 80% of access while the second edge node has 20% of access, some embodiments will multiple the path cost of the first edge node by 0.8 while multiplying the path cost of the second edge node by 0.2, before adding the resulting path cost values.

After identifying an optimal PCD or PCD group for deploying the resource set, the process 2725 provides the identity of the optimal PCD or PCD group to the server that called the process. This resource can then be deployed at the identified PCD/PCD group (e.g., deployed and configured by a compute manager/controller). After providing the optimal location, the process 2700 ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

FIG. 30 conceptually illustrates a computer system 3000 with which some embodiments of the invention are implemented. The computer system 3000 can be used to implement any of the above-described hosts, controllers, and managers. As such, it can be used to execute any of the above described processes. This computer system includes various types of non-transitory machine readable media and interfaces for various other types of machine readable media. Computer system 3000 includes a bus 3005, processing unit(s) 3010, a system memory 3025, a read-only memory 3030, a permanent storage device 3035, input devices 3040, and output devices 3045.

The bus 3005 collectively represents all system, peripheral, and chipset buses that communicatively connect the numerous internal devices of the computer system 3000. For instance, the bus 3005 communicatively connects the processing unit(s) 3010 with the read-only memory 3030, the system memory 3025, and the permanent storage device 3035.

From these various memory units, the processing unit(s) 3010 retrieve instructions to execute and data to process in order to execute the processes of the invention. The processing unit(s) may be a single processor or a multi-core processor in different embodiments. The read-only-memory (ROM) 3030 stores static data and instructions that are needed by the processing unit(s) 3010 and other modules of the computer system. The permanent storage device 3035, on the other hand, is a read-and-write memory device. This device is a non-volatile memory unit that stores instructions and data even when the computer system 3000 is off. Some embodiments of the invention use a mass-storage device (such as a magnetic or optical disk and its corresponding disk drive) as the permanent storage device 3035.

Other embodiments use a removable storage device (such as a floppy disk, flash drive, etc.) as the permanent storage device. Like the permanent storage device 3035, the system memory 3025 is a read-and-write memory device. However, unlike storage device 3035, the system memory is a volatile read-and-write memory, such a random access memory. The system memory stores some of the instructions and data that the processor needs at runtime. In some embodiments, the invention's processes are stored in the system memory 3025, the permanent storage device 3035, and/or the read-only memory 3030. From these various memory units, the processing unit(s) 3010 retrieve instructions to execute and data to process in order to execute the processes of some embodiments.

The bus 3005 also connects to the input and output devices 3040 and 3045. The input devices enable the user to communicate information and select commands to the computer system. The input devices 3040 include alphanumeric keyboards and pointing devices (also called "cursor control devices"). The output devices 3045 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 30, bus 3005 also couples computer system 3000 to a network 3065 through a network adapter (not shown). In this manner, the computer can be a part of a network of computers (such as a local area network ("LAN"), a wide area network ("WAN"), or an Intranet, or a network of networks, such as the Internet. Any or all components of computer system 3000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, several of the above-described examples illustrate virtual corporate WANs of corporate tenants of a virtual network provider. One of ordinary skill will realize that in some embodiments, the virtual network provider deploys virtual networks over several public cloud datacenters of one or more public cloud providers for non-corporate tenants (e.g., for schools, colleges, universities, non-profit entities, etc.). These virtual networks are virtual WANs that connect multiple compute endpoints (e.g., offices, datacenters, computers and devices of remote users, etc.) of the non-corporate entities.

Several embodiments described above include various pieces of data in the overlay encapsulation headers. One of ordinary skill will realize that other embodiments might not use the encapsulation headers to relay all of this data. For instance, instead of including the tenant identifier in the overlay encapsulation header, other embodiments derive the tenant identifier from the addresses of the CFEs that forward the data messages, e.g., in some embodiments in which different tenants have their own MFNs deployed in the public clouds, the tenant identity is associated with the MFN's that process the tenant messages.

Also, several figures conceptually illustrate processes of some embodiments of the invention. In other embodiments, the specific operations of these processes may not be performed in the exact order shown and described in these figures. The specific operations may not be performed in one continuous series of operations, and different specific operations may be performed in different embodiments. For instance, for an entity, some embodiments deploy some or all of the MFNs in PCDs/PCD groups before paths are generated for the entity, even though some of the above-described figures illustrate the deployment of the MFNs after the path searches. Furthermore, the process could be implemented using several sub-processes, or as part of a larger macro process.

Several embodiments described above allow a dedicated virtual network that is deployed for one entity to use one or more shared MFNs when a portion of the entity's dedicated virtual network (e.g., one or more dedicated MFNs of the entity) appears congested or is expected to be congested. Other embodiments deal with such congestions differently. For instance, some embodiments deploy additional dedicated MFNs (i.e., redundant MFNs) to portions of the dedicated virtual network that are congested or expected to be congested. Some of these embodiments then configure forwarding elements (e.g., frontend load balancers) in the PCDs, edge nodes at MMCNs, and other dedicated MFNs to distribute load among a cluster of duplicate (e.g., redundant) MFNs. Thus, one of ordinary skill in the art would understand that the invention is not to be limited by the foregoing illustrative details, but rather is to be defined by the appended claims

The invention claimed is:

1. A method of deploying software-defined wide area networks (SD-WANs) across public cloud datacenters, the method comprising:
generating measurements regarding network connections between different pairs of public cloud datacenter sets;
in response to a first request from a first set of one or more route-identifying servers of a first entity, providing a first set of measurements relevant for deploying SD-WAN routes for the first entity over a first group of the public cloud datacenters, the first set of route-identifying servers using the first set of measurements to define a first set of SD-WAN routes across a first group of public cloud datacenters to connect a first set of machines that are associated with the first entity and that are outside of the first group of public cloud datacenters; and
in response to a second request from a second set of one or more route-identifying servers of a second entity, providing a second set of measurements relevant for deploying SD-WAN routes for the second entity over a second group of the public cloud datacenters, the second set of route-identifying servers using the second set of measurements to define a second set of SD-WAN routes across a second group of public cloud datacenters to connect a second set of machines that are associated with the second entity and that are outside of the second group of public cloud datacenters.

2. The method of claim 1, wherein each set of route-identifying servers of each entity uses a lowest cost path search to identify lowest cost paths across a group of public cloud datacenters and uses the identified paths as at least a set of routes to connect the set of machines of the entity.

3. The method of claim 2, wherein the generated measurements comprise at least one of speed measurements and packet-loss measurements, and the identified lowest cost paths are paths with lowest aggregated speed or packet-loss costs.

4. The method of claim 1, wherein generating measurements comprises:

for each entity, generating measurements regarding network connections between different pairs of public cloud datacenter sets and at least one edge forwarding element located at a multi-machine compute node of the entity; and including the measurements regarding network connections to the entity's edge forwarding element in the set of measurements provided to the entity.

5. The method of claim 4 further comprising receiving a set of one or more network addresses associated with the edge forwarding element of each entity in order to generate measurements regarding network connections to the edge forwarding element.

6. The method of claim 1, wherein each public cloud datacenter set only has one public cloud datacenter.

7. The method of claim 1, wherein at least one public cloud datacenter set has more than one public cloud datacenter.

8. The method of claim 1, wherein the generated measurements comprise speed of connections between different pairs of public cloud datacenter sets.

9. The method of claim 8, wherein the generated measurements further comprise a packet-loss attribute quantifying amount of lost packets along a network connection between different pairs of public cloud datacenter sets.

10. The method of claim 1, wherein the generated measurements comprise a packet-loss attribute quantifying amount of lost packets along a network connection between different pairs of public cloud datacenter sets.

11. The method of claim 1 further comprising deploying measurement agents in each of a plurality of public cloud datacenter sets and configuring the measurement agents to repeatedly generate measurements regarding the network connections.

12. The method of claim 11 further comprising aggregating the measurements generated by the deployed measurement agents and identifying different subsets of the aggregated measurements as the first set of measurements and the second set of measurements.

13. The method of claim 12 further comprising repeatedly directing the measurement agents to provide the measurements generated by the agents.

14. The method of claim 12 further comprising repeatedly receiving from the measurement agents the measurements generated by the agents.

15. A non-transitory machine readable medium storing a program for execution by at least one processing unit, the program for facilitating deployment of software-defined wide area networks (SD-WANs) across public cloud datacenters, the program comprising sets of instructions for:

generating measurements regarding network connections between different pairs of public cloud datacenter sets;

in response to a first request from a first set of one or more route-identifying servers of a first entity, providing a first set of measurements relevant for deploying SD-WAN routes for the first entity over a first group of the public cloud datacenters, the first set of route-identifying servers using the first set of measurements to define a first set of SD-WAN routes across a first group of public cloud datacenters to connect a first set of machines that are associated with the first entity and that are outside of the first group of public cloud datacenters; and in response to a second request from a second set of one or more route-identifying servers of a second entity, providing a second set of measurements relevant for deploying SD-WAN routes for the second entity over a second group of the public cloud datacenters, the second set of route-identifying servers using the second set of measurements to define a second set of SD-WAN routes across a second group of public cloud datacenters to connect a second set of machines that are associated with the second entity and that are outside of the second group of public cloud datacenters.

16. The non-transitory machine readable medium of claim 15, wherein the set of instructions for generating measurements comprises sets of instructions for:

generating, for each entity, measurements regarding network connections between different pairs of public cloud datacenter sets and at least one edge forwarding element located at a multi-machine compute node of the entity; and including the measurements regarding network connections to the entity's edge forwarding element in the set of measurements provided to the entity.

* * * * *